United States Patent
Hayakawa et al.

(10) Patent No.: US 11,667,731 B2
(45) Date of Patent: Jun. 6, 2023

(54) STABILIZED UV ACTIVE ORGANOPALLADIUM COMPOUNDS AS VINYL ADDITION CATALYSTS

(71) Applicants: PROMERUS, LLC, Akron, OH (US); SUMITOMO BAKELITE CO., LTD., Tokyo (JP)

(72) Inventors: Shun Hayakawa, Tokyo (JP); Guodong Deng, Akron, OH (US); Larry F Rhodes, Akron, OH (US)

(73) Assignee: PROMERUS, LLC, Akron, OH (US)

( * ) Notice: Subject to any disclaimer, the term of this patent is extended or adjusted under 35 U.S.C. 154(b) by 0 days.

(21) Appl. No.: 17/854,026

(22) Filed: Jun. 30, 2022

(65) Prior Publication Data

US 2023/0038665 A1    Feb. 9, 2023

Related U.S. Application Data

(60) Provisional application No. 63/216,622, filed on Jun. 30, 2021.

(51) Int. Cl.
| | | |
|---|---|---|
| *C08F 4/80* | (2006.01) | |
| *C08F 32/00* | (2006.01) | |
| *C08F 4/60* | (2006.01) | |
| *C08F 10/14* | (2006.01) | |
| *C08F 32/04* | (2006.01) | |
| *C08F 32/06* | (2006.01) | |
| *C08F 32/08* | (2006.01) | |

(52) U.S. Cl.
CPC ............ *C08F 4/60193* (2013.01); *C08F 4/80* (2013.01); *C08F 10/14* (2013.01); *C08F 32/04* (2013.01); *C08F 32/06* (2013.01); *C08F 32/08* (2013.01)

(58) Field of Classification Search
CPC .. C08F 4/80; C08F 32/00; C08F 32/02; C08F 32/04; C08F 32/06; C08F 32/08
See application file for complete search history.

(56) References Cited

U.S. PATENT DOCUMENTS 7,087,691 B2 *  8/2006  Rhodes .................. C08F 20/12
                                                 526/329
11,299,566 B2 *  4/2022  Hayakawa ................ C08F 2/50

2004/0254318 A1   12/2004  Chun et al.
2021/0198392 A1 *  7/2021  Deng ..................... C08F 232/08
2021/0198393 A1 *  7/2021  Deng ..................... H01L 51/004
2021/0380733 A1 * 12/2021  Byrne .................... C07F 5/022

FOREIGN PATENT DOCUMENTS

| JP | 2010/260916 A | 11/2010 |
|---|---|---|
| WO | WO 1999/22865 A1 | 5/1999 |
| WO | WO 2020/243381 A1 | 12/2020 |

OTHER PUBLICATIONS

Okeya, S et al., "Five-coordinate bis (1, 1,1,5, 5-hexafluoro-2, 4-pentanedionato)(tertiary phosphine) palladium (II) and-platinum (II) complexes. X-Ray crystal and molecular structures and fluxional motions in solution", Bulletin of the Chemical Society of Japan, 1984, vol. 57, No. 2, pp. 395-404.

Written Opinion of the ISA: PCT/US2022/035632, dated Oct. 24, 2022.

* cited by examiner

*Primary Examiner* — Rip A Lee
(74) *Attorney, Agent, or Firm* — Balaram Gupta

(57) ABSTRACT

Embodiments in accordance with the present invention encompass compositions comprising a long shelf stabilized organopalladium compound of formula (I) as described herein. The composition further contains a photoacid generator, a photosensitizer and one or more olefinic monomers as described herein. The shelf life of the compositions can further be extended by employing a stabilizer, such as for example, a hindered amine. The composition undergoes vinyl addition polymerization when it is exposed to a suitable actinic radiation to form a substantially transparent film or a three dimensional object. More specifically, the compositions of this invention are stable at room temperature for several days to several months and can also be stored at higher temperatures from about 40° C. to 60° C. for several days and undergo mass polymerization only when subjected to suitable actinic radiation. The monomers employed therein have a range of optical and mechanical properties, and thus these compositions can be tailored to form films and/or three dimensional objects having various opto-electronic properties. Accordingly, compositions of this invention are useful in various applications, including as coatings, encapsulants, fillers, leveling agents, sealants, adhesives, among others.

20 Claims, No Drawings

STABILIZED UV ACTIVE ORGANOPALLADIUM COMPOUNDS AS VINYL ADDITION CATALYSTS

CROSS REFERENCE TO RELATED APPLICATIONS

This application claims the benefit of U.S. Provisional Application No. 63/216,622, filed Jun. 30, 2021, which is incorporated herein by reference in its entirety.

BACKGROUND OF THE INVENTION

Field of the Invention

Embodiments in accordance with the present invention relate generally to a long shelf life stable organopalladium compounds as vinyl addition catalysts in a single component mass polymerizable polycycloolefin monomer compositions. The compositions exhibit high optical transparency and can be tailored to meet the requirements of various applications, including as layers in optical devices, such as optical sensors, light emitting diodes (LEDs), organic light emitting diode (OLED), among other devices. More specifically, this invention relates to certain organopalladium compounds which can be used in a single component compositions encompassing norbornene (NB) based olefinic monomers, which are very stable at room temperature to about 60° C. and undergo mass vinyl addition polymerization only when exposed to suitable radiation to form solid objects, thus finding use in a variety of opto-electronic applications including as encapsulants, coatings, and fillers.

Description of the Art

Organic light emitting diodes (OLEDs) are gaining importance in a variety of applications, including flat panel televisions and other flexible displays, among other applications. However, conventional OLEDs, particularly, bottom emitting OLEDs suffer from a drawback in that only about half of the generated photons are emitted into the glass substrate out of which 25% are extracted into air. The other half of the photons are wave-guided and dissipated in the OLED stack. This loss of photons is primarily attributed to the refractive index (n) mismatch between the organic layers (n=1.7-1.9) and the glass substrate (n=1.5). By matching the refractive index of the substrate (n=1.8) and organic layers and augmenting the distance of the emission zone to the cathode to suppress plasmonic losses light extraction into the substrate can be increased to 80-90%. See, for example, G. Gaertner et al., Proc. Of SPIE, Vol. 6999, 69992T pp 1-12 (2008).

In addition, OLEDs also pose other challenges; in that OLEDs being organic materials, they are generally sensitive to moisture, oxygen, temperature, and other harsh conditions. Thus, it is imperative that OLEDs are protected from such harsh atmospheric conditions. See for example, U. S. Patent Application Publication No. US2012/0009393 A1.

In order to address some of the issues faced by the art, U.S. Pat. No. 8,263,235 discloses use of a light emitting layer formed from at least one organic light emitting material and an aliphatic compound not having an aromatic ring, and a refractive index of the light emitting from 1.4 to 1.6. The aliphatic compounds described therein are generally a variety of polyalkyl ethers, and the like, which are known to be unstable at high temperatures, see for example, Rodriguez et al., I & EC Product Research and Development, Vol. 1, No. 3, 206-210 (1962).

U.S. Pat. No. 9,944,818 and 10,266,720, disclose a two component mass polymerizable composition which is capable of tailoring to the desirable refractive index and is suitable as a filler and a protective coating material, thus potentially useful in the fabrication of a variety of OLED devices.

U.S. Pat. No. 10,626,198, discloses a single component mass vinyl addition polymerizable composition which is thermally activated and capable of tailoring to the desirable refractive index and is suitable as a filler and a protective coating material, thus potentially useful in the fabrication of a variety of OLED devices.

However, there is still a need for organic filler materials that are stable at ambient conditions to fabricating temperature conditions of various devices and undergo rapid mass polymerization only when exposed to suitable actinic radiation at ambient temperature or at suitable elevated temperatures.

Thus, it is an object of this invention to provide stabilized organopalladium compounds that overcome the gaps faced by the art. More specifically, it is an object of this invention to provide a series of unique organopalladium compounds, which can be employed in a single component composition that remains stable when stored at ambient temperature conditions to higher temperatures up to 60° C. for several days to weeks to months under certain conditions, and yet will mass polymerize instantly when exposed to suitable actinic radiation under the conditions of the fabrications of various opto-electronic devices, such as for example, an OLED device. It is further an object of this invention to provide stable single component mass polymerizable composition with no change in viscosity at or below normal storage conditions but which undergoes mass polymerization only when exposed to suitable actinic radiation.

It is further an object of this invention to provide single component composition that can be used in a variety of other applications including for example 3D printing, ink-jettable coatings, sealants, and the like.

Other objects and further scope of the applicability of the present invention will become apparent from the detailed description that follows.

SUMMARY OF THE INVENTION

Surprisingly, it has now been found that certain of the organopalladium compounds of formula (I) as described herein are very stable at ambient to elevated temperatures of up to 60° C. and can be employed in a single component composition encompassing various olefinic monomers. It has further been observed that employing small amounts of certain hindered amine derivatives and other stabilizing compounds, the compositions of this invention can further be stabilized, thus improving the shelf life stability of the compositions from room temperature up to 60° C. for several days, and can be employed for the fabrication of a variety of devices including for example an OLED device having a transparent optical layer which features hitherto unachievable properties, i.e., high colorless optical transparency, desirable film thickness of the filler layer typically in the range of 10 to 20 μm but can be tailored to lower or higher film thickness depending upon the intended application, compatible with the OLED stack, particularly the cathode layer (a very thin layer on the top of the OLED stack), compatible with polymerization of the formulation on the OLED stack, including fast polymerization time and can be photolytically treated at ambient fabrication conditions, adhesion to both OLED stack and glass cover, and the like. It is also important to note that the compositions of this invention are expected to exhibit good uniform leveling across the OLED layer which typically requires a low viscosity. Further, compositions of this invention are also expected to exhibit low shrinkage due to their rigid polycycloolefinic structure. In addition, as the components of this invention undergo fast mass polymerization upon application they do not leave behind any fugitive small molecules which can damage the OLED stack. Generally, no other small molecule additives need to be employed thus offering additional advantages. Most importantly, the compositions of this invention are stable (i. e., no change in viscosity) at ambient atmospheric conditions including up to 60° C. for several days to weeks and undergo mass polymerization only when exposed to suitable actinic radiation. The compositions undergo mass vinyl addition polymerization very quickly when subjected to such actinic radiation and generally the compositions become solid objects in few minutes, i.e., within 1-10 minutes and more generally in less than one hour.

Accordingly, there is provided a single component composition encompassing a) an organopalladium compound of formulae (I) as described herein; b) one or more olefinic monomers; c) a photoacid generator as described herein; and d) a photosensitizer. The composition of this invention may optionally contain at least one or more of an additive of the formulae (V) to (X) as described herein, which further extends the shelf life stability.

In another aspect of this invention there is also provided a kit encompassing the composition of this invention for forming a three dimensional object, such as for example, a transparent film.

DETAILED DESCRIPTION

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the symbol "〜〜〜" denotes a position at which the bonding takes place with another repeat unit or another atom or molecule or group or moiety as appropriate with the structure of the group as shown.

As used herein, "hydrocarbyl" refers to a group that contains carbon and hydrogen atoms, non-limiting examples being alkyl, cycloalkyl, aryl, aralkyl, alkaryl, and alkenyl. The term "halohydrocarbyl" refers to a hydrocarbyl group where at least one hydrogen has been replaced by a halogen. The term perhalocarbyl refers to a hydrocarbyl group where all hydrogens have been replaced by a halogen.

As used herein, the expression "alkyl" includes specified number of carbon atoms, including methyl and ethyl groups, and straight-chained or branched propyl, butyl, pentyl and hexyl, and so on. Particular alkyl groups are methyl, ethyl, n-propyl, isopropyl and tert-butyl. Derived expressions such as "$(C_1$-$C_4)$alkoxy", "$(C_1$-$C_4)$thioalkyl" "$(C_1$-$C_4)$alkoxy$(C_1$-$C_4)$alkyl", "hydroxy$(C_1$-$C_4)$alkyl", "$(C_1$-$C_4)$alkylcarbonyl", "$(C_1$-$C_4)$alkoxycarbonyl$(C_1$-$C_4)$alkyl", "$(C_1$-$C_4)$alkoxycarbonyl", "diphenyl$(C_1$-$C_4)$alkyl", "phenyl$(C_1$-$C_4)$alkyl", "phenylcarboxy$(C_1$-$C_4)$alkyl" and "phenoxy$(C_1$-$C_4)$alkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "$(C_1$-$C_6)$perfluoroalkyl" means that all of the hydrogen atoms in said alkyl group are replaced with fluorine atoms. Illustrative examples include trifluoromethyl and pentafluoroethyl, and straight-chained or branched heptafluoropropyl, nonafluorobutyl, undecafluoropentyl and tridecafluorohexyl groups. Derived expression, "$(C_1$-$C_6)$perfluoroalkoxy", is to be construed accordingly. It should further be noted that certain of the alkyl groups as described herein, such as for example, "$(C_1$-$C_6)$alkyl" may partially be fluorinated, that is, only portions of the hydrogen atoms in said alkyl group are replaced with fluorine atoms and shall be construed accordingly.

As used herein, the expression "$(C_6$-$C_{10})$aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "$(C_6$-$C_{10})$aryl$(C_1$-$C_4)$alkyl" means that the $(C_6$-$C_{10})$aryl as defined herein is further attached to $(C_1$-$C_4)$alkyl as defined herein. Representative examples include benzyl, phenylethyl, 2-phenylpropyl, 1-naphthylmethyl, 2-naphthylmethyl and the like.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of $(C_1$-$C_6)$alkyl, $(C_2$-$C_6)$alkenyl, $(C_1$-$C_6)$perfluoroalkyl, phenyl, hydroxy, —$CO_2H$, an ester, an amide, $(C_1$-$C_6)$alkoxy, $(C_1$-$C_6)$thioalkyl and $(C_1$-$C_6)$perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "derived" is meant that the polymeric repeating units are polymerized (formed) from, for example, polycyclic norbornene-type monomers in accordance with formulae (IV), (XI) and (XII) wherein the resulting polymers are formed by 2,3 enchainment of norbornene-type monomers as shown below:

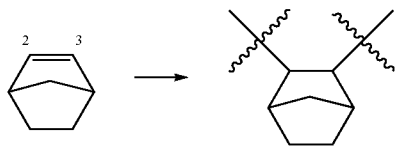

Accordingly, in accordance with the practice of this invention there is provided a single component composition encompassing a) an organopalladium compound selected from the group consisting of a compound of formula (I):

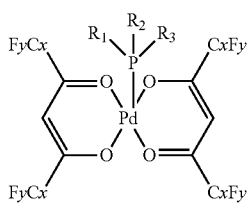

(I)

wherein:

x is from 1 to 6, inclusive;

y is 2x+1;

wherein at least one of $R_1$, $R_2$ and $R_3$ is a tertiary alkyl group selected from the group consisting of tertiary branched $(C_4-C_8)$alkyl, $(C_1-C_4)$alkyl$(C_5-C_7)$cycloalkyl and $(C_8-C_{12})$tricycloalkyl; or wherein at least two of $R_1$, $R_2$ and $R_3$ are the same or different and each independently selected from the group consisting of secondary branched $(C_3-C_8)$alkyl and $(C_5-C_7)$cycloalkyl; and the remaining $R_1$, $R_2$ and $R_3$ is selected from the group consisting of methyl, ethyl, linear or branched $(C_3-C_8)$alkyl and $(C_5-C_7)$cycloalkyl;

c) a photoacid generator selected from the group consisting of:

a compound of the formula (II):

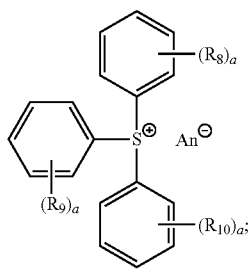

(II)

a compound of the formula (III):

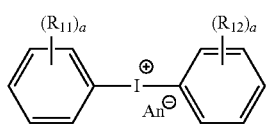

(III)

wherein:

a is an integer from 0 to 5;

An$\ominus$ is selected from the group consisting of Cl$\ominus$, Br$\ominus$, I$\ominus$, BF$_4\ominus$, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)ethyl]-5-(trifluoromethyl)phenyl]borate, tris(trifluoromethanesulfonyl)methide, bis(trifluoromethanesulfonyl)imide, PF$_6\ominus$, SbF$_6\ominus$, n-C$_4$F$_9$SO$_3\ominus$, CF$_3$SO$_3\ominus$ and p-CH$_3$(C$_6$H$_4$)—SO$_3\ominus$;

$R_8$, $R_9$, $R_{10}$, $R_{11}$ and $R_{12}$ are the same or different and each independently selected from the group consisting of halogen, methyl, ethyl, linear or branched $(C_3-C_{20})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$ aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_6-C_{10})$-aryloxy, $(C_6-C_{10})$thioaryl, $(C_1-C_6)$alkanoyl$(C_6-C_{10})$thioaryl, $(C_1-C_6)$alkoxy $(C_6-C_{10})$ aroyl$(C_1-C_6)$alkyl and $(C_6-C_{10})$ thioaryl-$(C_6-C_{10})$diarylsulfonium salt;

d) a photosensitizer.

Surprisingly, it has now been found that a compound of formula (I), where the calculated cone angle higher than 175° particularly provides enhanced stability for the composition of this invention. The "cone angle" as used herein generally refers to Tolman cone angle as reported in the literature. As there is some differences between observed/measured cone angle (e.g., single crystal characterization) verses the computed cone angle, the numbers referred to herein are based on the reported calculated cone angle. The Tolman cone angle is defined as the apex angle of a cone with its origin at the metal center with spreading edges along the van der Waals spheres of the outermost atoms. See, for example, Jover, et al., "Computational assessment on the Tolman cone angles for P-ligands," Dalton Trans., 2019, 48, 15036-15048.

Accordingly, it has now been found that compounds of formula (I) having a cone angle of higher than 175° increases the shelf life stability of the compositions of this invention at least two fold when compared with other similar organopalladium compounds, as apparent from the specific examples that follow. In some embodiments the cone angle of the compounds of formula (I) is from 176° to 185°. In some other embodiments the cone angle of the compounds of formula (I) is from 178° to 184°. In yet some other embodiments the cone angle of the compounds of formula (I) is from 179° to 183°.

In addition, judicious selection of the compounds of formula (I) in suitable amounts as described herein may provide uniquely advantageous benefits in not only stabilizing the composition of this invention but also activate the catalyst only when subjected to suitable actinic radiation as further described hereinbelow. Generally, by employing the compounds of formula (I) the shelf life stability of the compositions of this invention can be increased from several weeks to several months. In some embodiments, the shelf life stability of the compositions is increased by at least thirty days, to sixty days, to ninety days, and longer at ambient storage conditions (i.e., room temperature from 20° C. to 35° C.)

It is also advantageous to extend the shelf life of the compositions of this invention at the fabrication conditions, which may range from ambient temperature to 40° C. or up to 60° C. Accordingly, in some embodiments, the shelf life stability of the compositions is increased by at least thirty days, to sixty days, to ninety days, and longer at fabrication temperature from about 40° C. to 60° C.

In some embodiments, the compositions of this invention are reactive only when subject to suitable actinic radiation and undergoes instantaneous vinyl addition polymerization to form three dimensional objects, such as film. In some other embodiments, the compositions of this invention are reactive upon simultaneous heating to a suitable temperature and subjecting to suitable actinic radiation thus causing instantaneous vinyl addition polymerization to form three dimensional objects, such as film. Such suitable temperatures to activate the compounds of formula (I) may be in the range of 40° C. to 80° C. or higher.

In some embodiments of this invention, the compounds of formula (I) containing a phosphine ligand having two secondary alkyl groups or a cycloalkyl group as described herein and a tertiary alkyl group provides this unique benefit in extending the shelf life of the compositions of this invention. In some other embodiments of this invention, the compounds of formula (I) containing a phosphine ligand having two tertiary alkyl groups and an alkyl group also provides this unique benefit. However, it should be noted that similar other ligands, including various other phosphines as well as other ligands, such as for example, phosphites may also provide similar benefits.

Representative examples of such secondary alkyl include without any limitation, iso-propyl, iso-butyl, iso-amyl, 2-hexyl, 3-hexyl, 2-heptyl, 3-heptyl, 4-heptyl, 2-octyl, 3-octyl, 4-octyl, cyclopentyl, cyclohexyl, cycloheptyl, and the like. Similarly, representative examples of tertiary alkyl includes without any limitation, tert-butyl, 2-ethyl-propyl, 2-methyl-butyl, 2-ethyl-butyl, and all possible branched tertiary pentyl, hexyl, heptyl, octyl groups.

Other such tertiary alkyl groups may also include $(C_1-C_4)$alkyl$(C_5-C_7)$cycloalkyl groups, which may include without any limitation, 1-methyl-cyclopentyl, 1-ethyl-cyclopentyl, n-propyl-1-cyclopentyl, 1-methyl-cyclohexyl, 1-ethyl-cyclohexyl, n-propyl-1-cyclohexyl, 1-methyl-cycloheptyl, 1-ethyl-cycloheptyl, n-propyl-1-cycloheptyl, and the like. Various other cyclic tertiary cycloalkyl groups include of the formula $(C_8-C_{12})$tricycloalkyl. Representative examples of which include without any limitation adamantyl, and the like It should however be noted that various other known asymmetrical phosphines or phosphites which will bring about the intended activity can also be used in this embodiment of the invention.

Various olefinic monomers which undergo vinyl addition polymerization can be employed in the composition of this invention. Such olefinic monomers include without any limitation alicyclic olefins, such as, styrene, methylstyrene, and the like. Other olefinic monomers include cyclo-olefins and bicyclo-olefins, and so on.

In some embodiments of this invention the olefinic monomers which are suitable in the composition of this invention are of the formula (IV):

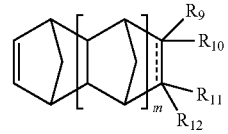
(IV)

wherein:
m is an integer 0, 1 or 2;
----- is a single bond or a double bond;
$R_9$, $R_{10}$, $R_{11}$ and $R_{12}$ are the same or different and each independently selected from the group consisting of hydrogen, halogen, a hydrocarbyl or halohydrocarbyl group selected from methyl, ethyl, linear or branched $(C_3-C_{16})$ alkyl, perfluoro$(C_1-C_{12})$alkyl, $(C_3-C_{12})$cycloalkyl, $(C_6-C_{12})$ bicycloalkyl, $(C_7-C_{14})$tricycloalkyl, $(C_6-C_{10})$aryl, $(C_6-C_{10})$ aryl$(C_1-C_6)$alkyl, perfluoro$(C_6-C_{10})$aryl, perfluoro$(C_6-C_{10})$ aryl$(C_1-C_6)$alkyl, methoxy, ethoxy, linear or branched $(C_3-C_{16})$alkoxy, epoxy$(C_1-C_{10})$alkyl, epoxy$(C_1-C_{10})$alkyloxy $(C_1-C_{10})$alkyl, epoxy$(C_3-C_{10})$cycloalkyl, perfluoro$(C_1-C_{12})$ alkoxy, $(C_3-C_{12})$cycloalkoxy, $(C_6-C_{12})$bicycloalkoxy, $(C_7-C_{14})$tricycloalkoxy, $(C_6-C_{10})$aryloxy, $(C_6-C_{10})$aryl$(C_1-C_6)$ alkoxy, perfluoro$(C_6-C_{10})$aryloxy, perfluoro$(C_6-C_{10})$aryl $(C_1-C_3)$alkoxy, a group of formula (A):

a group of formula (A):

—Z-Aryl (A);

a group of formula (A1):

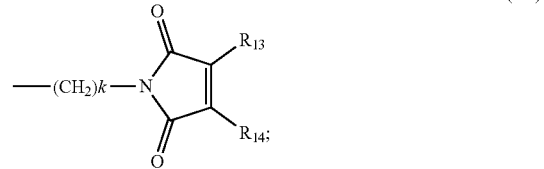
(A1)

a group of formula (A2):

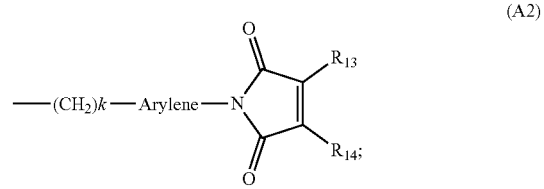
(A2)

a group of formula (A3):

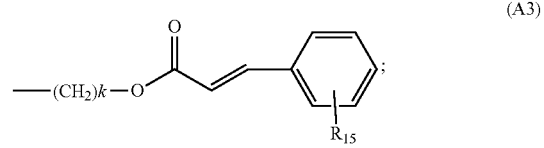
(A3)

and
a group of formula (A4):

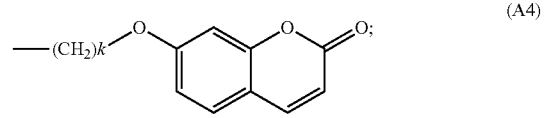
(A4)

wherein:

Z is selected from the group consisting of:
O, CO, C(O)O, OC(O), OC(O)O, S, $(CR_{17}R_{18})_b$, $O(CR_{17}R_{18})_b$, $(CR_{17}R_{18})_bO$, $C(O)(CR_{17}R_{18})_b$, $(CR_{17}R_{18})_bC(O)$, $C(O)O(CR_{17}R_{18})_b$, $(CR_{17}R_{18})_bC(O)O$, $OC(O)(CR_{17}R_{18})_b$, $(CR_{17}R_{18})_bOC(O)$, $(CR_{17}R_{18})_bOC(O)O$, $(CR_{17}R_{18})_bOC(O)O(CR_{17}R_{18})_b$, $OC(O)O(CR_{17}R_{18})_b$, $S(CR_{17}R_{18})_b$, $(CR_{17}R_{18})_bS$, $(SiR_{17}R_{18})_b$, $O(SiR_{17}R_{18})_b$, $(SiR_{17}R_{18})_bO$, where $R_{17}$ and $R_{18}$ are the same or different and each independently selected from hydrogen, methyl, ethyl, linear or branched $(C_3-C_{12})$alkyl, substituted or unsubstituted $(C_6-C_{14})$aryl, methoxy, ethoxy, linear or branched $(C_3-C_6)$alkyloxy, $(C_2-C_6)$acyl, $(C_2-C_6)$acyloxy, and substituted or unsubstituted $(C_6-C_{14})$aryloxy; and b is an integer from 0 to 12, inclusive;

Aryl is selected from the group consisting of substituted or unsubstituted phenyl, substituted or unsubstituted biphenyl and substituted or unsubstituted naphthyl, substituted or unsubstituted terphenyl, substituted or unsubstituted anthracenyl substituted or unsubstituted fluorenyl, wherein said substituents are selected from the group consisting of halogen, methyl, ethyl, linear or branched $(C_3-C_6)$alkyl, perfluoro$(C_1-C_{12})$alkyl, $(C_3-C_{12})$cycloalkyl, $(C_6-C_{10})$aryl, $(C_6-C_{10})$aryl$(C_1-C_6)$alkyl, perfluoro$(C_6-C_{10})$aryl, perfluoro$(C_6-C_{10})$aryl$(C_1-C_6)$alkyl, methoxy, ethoxy, linear or branched $(C_3-C_{16})$alkoxy, perfluoro$(C_1-C_{12})$alkoxy, $(C_3-C_{12})$cycloalkoxy, $(C_6-C_{10})$aryloxy, $(C_6-C_{10})$aryl$(C_1-C_6)$alkoxy, perfluoro$(C_6-C_{10})$aryloxy and perfluoro$(C_6-C_{10})$aryl$(C_1-C_3)$alkoxy;

k is an integer from 1 to 12;

$R_{13}$, $R_{14}$ and $R_{15}$ are the same or different and each independently selected from the group consisting of hydrogen, methyl, ethyl, linear or branched $(C_3-C_{12})$alkyl, perfluoro$(C_1-C_{12})$alkyl, methoxy, ethoxy, linear or branched $(C_3-C_{12})$alkoxy, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_6)$alkyl, perfluoro$(C_6-C_{10})$aryl and perfluoro$(C_6-C_{10})$aryl$(C_1-C_6)$alkyl; or $R_{13}$ and $R_{14}$ taken together with the intervening carbon atoms to which they are attached to form a substituted or unsubstituted $(C_5-C_{14})$cyclic, $(C_5-C_{14})$bicyclic or $(C_5-C_{14})$tricyclic ring; and Arylene is substituted or unsubstituted bivalent $(C_6-C_{14})$aryl;

or one of $R_9$ and $R_{10}$ taken together with one of $R_{11}$ and $R_{12}$ and the carbon atoms to which they are attached to form a substituted or unsubstituted $(C_5-C_{14})$cyclic, $(C_5-C_{14})$bicyclic or $(C_5-C_{14})$tricyclic ring.

More specifically, the Aryl as defined herein is substituted or unsubstituted biphenyl of formula:

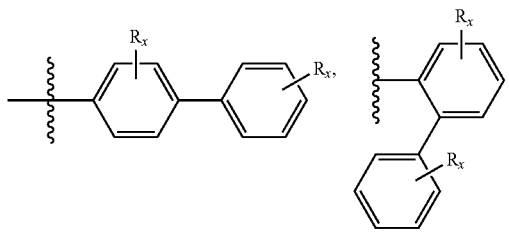

substituted or unsubstituted naphthyl of formula:

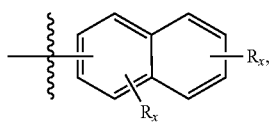

substituted or unsubstituted terphenyl of formula:

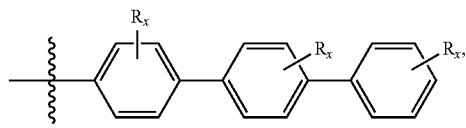

substituted or unsubstituted anthracenyl of formula:

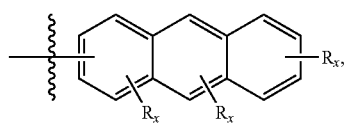

substituted or unsubstituted fluorenyl of formula:

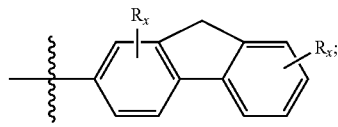

where $R_x$ in each occurrence is independently selected from methyl, ethyl, linear or branched $(C_3-C_{12})$alkyl or $(C_6-C_{10})$aryl;

The monomers of formula (IV) as described herein are themselves known in the literature or can be prepared by any of the known methods in the art to make such or similar types of monomers.

In addition, the monomers as described herein readily undergo mass vinyl addition polymerization, i.e., in their neat form without use of any solvents by vinyl addition polymerization using transition metal procatalysts, such as for example, organopalladium compounds as described herein. See for example, U.S. Pat. No. 7,442,800 B2; and 7,759,439 B2; pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the organopalladium compound of formula (I), a photoacid generator or photosensitizer as described herein or convey the same to the reaction medium. Also, some solvent may be used to reduce the viscosity of the monomer. The amount of solvent that can be used in the reaction medium may be in the range of 0 to 5 weight percent based on the total weight of the monomers employed. Any of the suitable solvents that dissolves the organopalladium compound of formula (I), a photoacid generator or photosensitizer and/or monomers can be employed in this invention. Examples of such solvents include alkanes, cycloalkanes, aromatics, such as toluene, ester solvents such as ethyl acetate, THF, dichloromethane, dichloroethane, and the like.

Advantageously, it has now been found that one or more of the monomers themselves can be used to dissolve the organopalladium compound of formula (I) or a photoacid generator or photosensitizer and thus avoiding the need for the use of solvents. In addition, one monomer can itself serve as a solvent for the other monomer and thus eliminating the need for an additional solvent. For example, if a first monomer of formula (IV) is a solid at room temperature, then a second monomer of formula (IV), which is a liquid at room temperature can be used as a solvent for the first monomer of formula (IV) which is a solid or vice versa. Therefore, in such situations more than one monomer can be employed in the composition of this invention.

In some embodiments, the monomers of formula (IV) employed in the composition of this invention may serve as high refractive index materials imparting high refractive index to the resulting polymeric film upon mass polymerization. In general, the monomers of formula (IV) which are suitable in this invention feature a refractive index of at least 1.5. In some embodiments the refractive index of the monomers of formula (IV) is higher than 1.5. In some other embodiments the refractive index of the monomers of formula (IV) is in the range from about 1.5 to 1.6. In yet some other embodiments the refractive index of the monomers of formula (IV) is higher than 1.55, higher than 1.6 or higher than 1.65. In some other embodiments it may even be higher than 1.7.

In some other embodiments, it is generally contemplated that monomer of formula (IV) may also be used as a viscosity modifier. Accordingly, in general, such a monomer of formula (IV) is a liquid at room temperature and can be used in conjunction with another monomer of formula (IV) which is a solid or a high viscosity liquid.

In a further embodiment of this invention the composition of this invention encompasses at least two different monomers of formula (IV) and is in a clear liquid state having a viscosity below 100 centipoise. In general, the composition of this invention exhibits low viscosity, which can be below 100 centipoise. In some embodiments, the viscosity of the composition of this invention is less than 90 centipoise. In some other embodiments the viscosity of the composition of this invention is in the range from about 5 to 100 centipoise. In yet some other embodiments the viscosity of the composition of this invention is lower than 80 cP, lower than 60 cP, lower than 40 cP, lower than 20 cP. In some other embodiments it may even be lower than 10 cP or lower than 8 cP.

When the composition of this invention contains two monomers, they can be present in any desirable amounts that would bring about the intended benefit, including either refractive index modification or viscosity modification or both or any other desirable property depending upon the intended final application. Accordingly, the molar ratio of first monomer of formula (IV) to second monomer of formula (IV) can be from 0:100 to 100:0. That is, only one monomer of formula (IV) can be employed in certain applications. In other words, any amount of these two monomers can be employed. In some embodiments, the molar ratio of first monomer of formula (IV):second monomer of formula (IV) is in the range from 1:99 to 99:1; in some other embodiments it is from 5:95 to 95:5; it is from 10:90 to 90:10; it is from 20:80 to 80:20; it is from 30:70 to 70:30; it is from 60:40 to 40:60; and it is 50:50, and so on.

In general, the compositions in accordance with the present invention encompass the above described one or more of monomer of formula (IV), as it will be seen below, various composition embodiments are selected to provide properties to such embodiments that are appropriate and desirable for the use for which such embodiments are directed, thus such embodiments are tailorable to a variety of specific applications. Accordingly, in some embodiments the composition of this invention contains more than two distinct monomers of formula (IV), such as for example three different monomers of formula (IV) or four different monomers of formula (IV).

For example, as already discussed above, proper combination of different monomers of formula (IV) makes it possible to tailor a composition having the desirable refractive index, viscosity and optical transmission properties, among other properties. In addition, it may be desirable to include other polymeric or monomeric materials which are compatible to provide desirable optical properties depending upon the end use application. Accordingly, the compositions of this invention can also include other high refractive polymeric materials which will bring about such intended benefit. Examples of such polymers include without any limitation, poly(α-methylstyrene), poly(vinyl-toluene), copolymers of α-methylstyrene and vinyl-toluene, and the like.

Advantageously, it has further been found that the compositions of this invention can also contain additional monomers different from the monomer of formula (XI). In some embodiments, the composition according to this invention may further contain one or more monomers selected from monomer of formula (XI) or monomer of formula (XII).

The monomer of formula (XI) is:

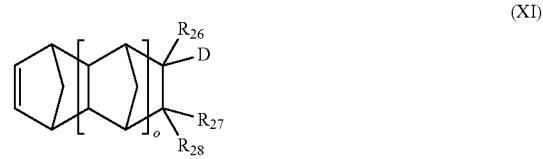

(XI)

wherein:
o is an integer from 0 to 2, inclusive;
D is SiR$_{29}$R$_{30}$R$_{31}$ or a group selected from:

$$—(CH_2)_c—O—SiR_{29}R_{30}R_{31} \quad (E);$$

$$—(CH_2)_c—SiR_{29}R_{30}R_{31} \quad (F); \text{ and}$$

$$—(SiR_{29}R_{30})_c—O—SiR_{29}R_{30}R_{31} (G); \text{ wherein}$$

c is an integer from 1 to 10, inclusive, and where one or more of CH$_2$ is optionally substituted with (C$_1$-C$_{10}$)alkyl or (C$_1$-C$_{10}$)perfluoroalkyl;

R$_{26}$, R$_{27}$ and R$_{28}$ are the same or different and independently of each other selected from hydrogen, halogen and hydrocarbyl, where hydrocarbyl is selected from methyl, ethyl, linear or branched (C$_3$-C$_{12}$)alkyl, (C$_3$-C$_{12}$)cycloalkyl, (C$_6$-C$_{12}$)bicycloalkyl, (C$_7$-C$_{14}$)tricycloalkyl, (C$_6$-C$_{10}$)aryl, (C$_6$-C$_{10}$)aryl(C$_1$-C$_3$)alkyl, (C$_1$-C$_{12}$)alkoxy, (C$_3$-C$_{12}$)cycloalkoxy, (C$_6$-C$_{12}$)bicycloalkoxy, (C$_7$-C$_{14}$)tricycloalkoxy, (C$_6$-C$_{10}$)aryloxy(C$_1$-C$_3$)alkyl or (C$_6$-C$_{10}$) aryloxy; and R$_{29}$, R$_{30}$ and R$_{31}$ are each independently of one another methyl, ethyl, linear or branched (C$_3$-C$_9$)alkyl, substituted or unsubstituted (C$_6$-C$_{14}$)aryl, methoxy, ethoxy, linear or branched (C$_3$-C$_9$)alkoxy or substituted or unsubstituted (C$_6$-C$_{14}$)aryloxy.

In this aspect of the invention, it has now been found that monomers of formula (XI) provides further advantages. Namely, the monomers of formula (XI) depending upon the nature of the monomer may impart high or low refractive index to the composition, thus it can be tailored to meet the need. In addition, the monomers of formula (XI) generally improve the adhesion properties and thus can be used as "adhesion modifiers." Finally, the monomers of formula (XI) may exhibit low viscosity and good solubility for the procatalyst and/or activator, among various other advantages.

The monomer of formula (XII) is:

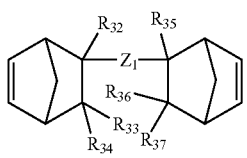

(XII)

wherein:

$Z_1$ is selected from the group consisting of substituted or unsubstituted $(C_1-C_{12})$alkylene, $-(CH_2)_dO(CH_2)_e-$, $-(CH_2)_d(SiR_{38}R_{39})(OSiR_{40}R_{41})_f(CH_2)_e-$ where d, e and f are independently integers from 0 to 6, inclusive, $R_{38}$, $R_{39}$, $R_{40}$ and $R_{41}$ are the same or different and independently of each other selected from methyl, ethyl, linear or branched $(C_3-C_{12})$alkyl, and an arylene selected from the following:

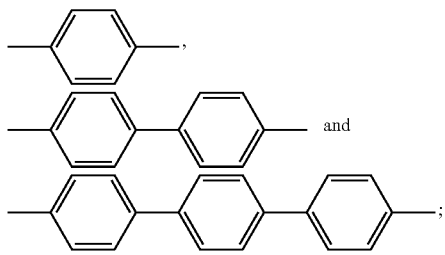

and $R_{32}$, $R_{33}$, $R_{34}$, $R_{35}$, $R_{36}$ and $R_{37}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cyclo alkoxy, $(C_6-C_{12})$bicyclo alkoxy, $(C_7-C_{14})$tricycloalkoxy, $(C_6-C_{10})$aryloxy$(C_1-C_3)$alkyl or $(C_6-C_{10})$-aryloxy.

The monomers of formula (XII) are bifunctional monomers and may exhibit high refractive index especially when $Z_1$ is an arylene group. Accordingly, it is contemplated that incorporation of monomers of formula (XII) into composition of this invention generally increases the refractive index of the composition and also increase crosslinkability with other molecules. Thus, by incorporation of monomers of formula (XII) into the composition of this invention it may be possible to increase compatibility with other materials depending upon the intended application thereby enhancing the properties of the composition of the invention.

In another aspect of this invention it is conceivable that the composition of this invention may contain only one monomer of formula (IV) or formula (XI) or formula (XII). That is, any one of the monomers of formulae (IV), (XI) or (XII) may be sufficient to form a composition of this invention. In some other embodiments the composition of this invention encompasses any two monomers of formulae (IV), (XI) or (XII) and in any desirable proportions. In some other embodiments the composition of this invention encompasses any three monomers of formulae (IV), (XI) or (XII) in any combinations thereof and in any desirable proportions. All such possible permutations and combinations of monomers of formulae (IV), (XI) or (XII) are part of this invention.

Accordingly, any of the monomers within the scope of monomer of formula (IV) can be employed in the composition of the invention. Representative examples of monomer of formula (IV) include the following without any limitations:

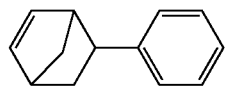 [SMILES: C1=CC2CC1CC2c1ccccc1]

5-phenylbicyclo[2.2.1]hept-2-ene (PhNB);

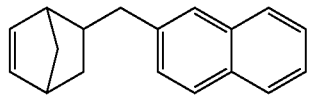 [SMILES: C1=CC2CC1CC2Cc1ccc2ccccc2c1]

2-(bicyclo[2.2.1]hept-5-en-2-ylmethyl)naphthalene;

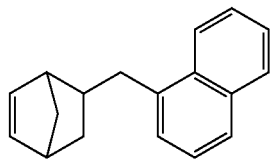 [SMILES: C1=CC2CC1CC2Cc1cccc2ccccc12]

1-(bicyclo[2.2.1]hept-5-en-2-ylmethyl)naphthalene;

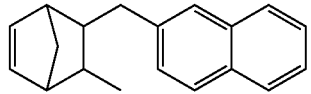 [SMILES: CC1C2C=CC(C2)C1Cc1ccc2ccccc2c1]

2-((3-methylbicyclo[2.2.1]hept-5-en-2-yl)methyl)naphthalene;

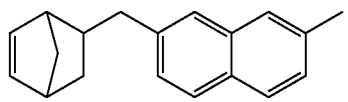 [SMILES: Cc1ccc2ccc(CC3CC4C=CC3C4)cc2c1]

2-(bicyclo[2.2.1]hept-5-en-2-ylmethyl)-7-methylnaphthalene;

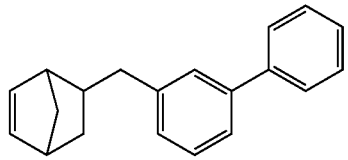 [SMILES: C1=CC2CC1CC2Cc1cccc(-c2ccccc2)c1]

5-([1,1'-biphenyl]-3-ylmethyl)bicyclo[2.2.1]hept-2-ene;

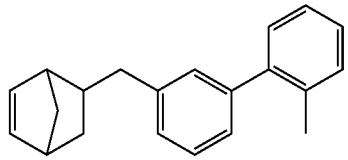 [SMILES: Cc1ccccc1-c1cccc(CC2CC3C=CC2C3)c1]

5-((2'-methyl-[1,1'-biphenyl]-3-yl)methyl)bicyclo[2.2.1]hept-2-ene;

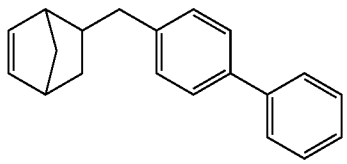 [SMILES: C1=CC2CC1CC2Cc1ccc(-c2ccccc2)cc1]

5-([1,1'-biphenyl]-4-ylmethyl)bicyclo[2.2.1]hept-2-ene:

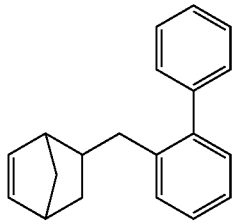 [SMILES: C1=CC2CC1CC2Cc1ccccc1-c1ccccc1]

5-([1,1'-biphenyl]-2-ylmethyl)bicyclo[2.2.1]hept-2-ene;

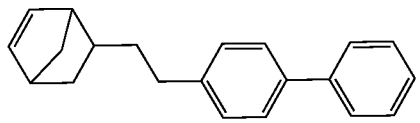

5-(2-([1,1'-biphenyl]-4-ylmethyl)bicyclo[2.2.1]hept-2-ene (NBEtPhPh);

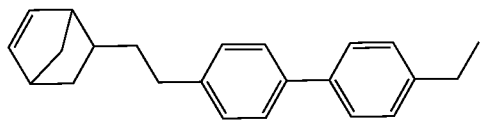

5-(2-(4'-ethyl-[1,1'-biphenyl]-4-yl)ethyl)bicyclo[2.2.1]hept-2-ene;

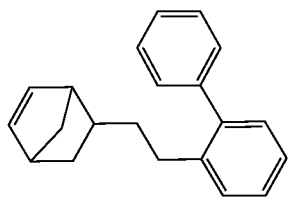 [SMILES: C1=CC2CC1CC2CCc1ccccc1-c1ccccc1]

5-(2-([1,1'-biphenyl]-2-ylmethyl)bicyclo[2.2.1]hept-2-ene;

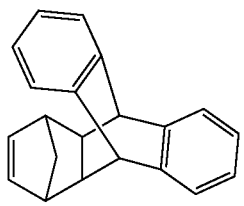 [SMILES: C1=CC2CC1C1C3c4ccccc4C(c4ccccc43)C21]

(9R,10S,11R,12S)-9,10-dihydro-9,10-[2]bicycloanthracene;

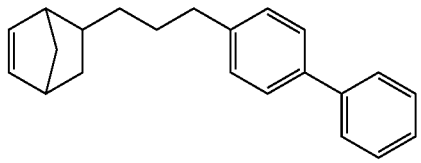 [SMILES: C1=CC2CC1CC2CCCc1ccc(-c2ccccc2)cc1]

5-(3-([1,1'-biphenyl]-4-yl)propyl)bicyclo[2.2.1]hept-2-ene;

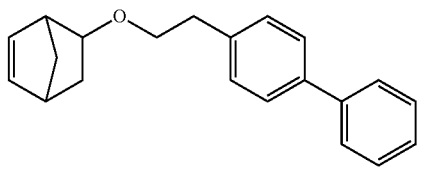 [SMILES: C1=CC2CC1CC2OCCc1ccc(-c2ccccc2)cc1]

5-(2-([1,1'-biphenyl]-4-yl)ethoxy)bicyclo[2.2.1]hept-2-ene;

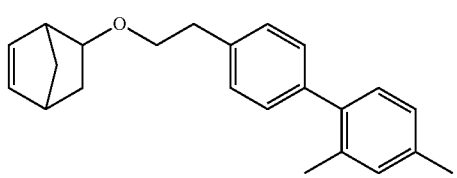 [SMILES: Cc1ccc(-c2ccc(CCOC3CC4C=CC3C4)cc2)c(C)c1]

5-(2-(2',4'-dimethyl-[1,1'-biphenyl]-4-yl)ethoxy)bicyclo[2.2.1]hept-2-ene;

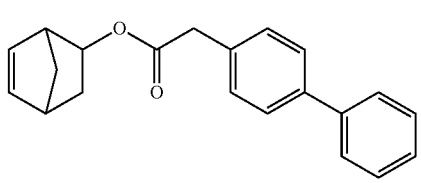 [SMILES: O=C(Cc1ccc(-c2ccccc2)cc1)OC1CC2C=CC1C2]

bicyclo[2.2.1]hept-5-en-2-yl 2-([1,1'-biphenyl]-4-yl)acetate;

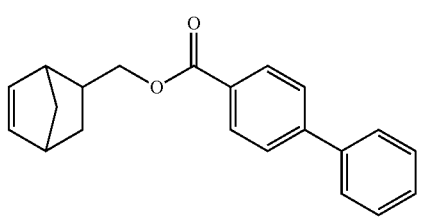 [SMILES: O=C(OCC1CC2C=CC1C2)c1ccc(-c2ccccc2)cc1]

bicyclo[2.2.1]hept-5-en-2-ylmethyl[1,1'-biphenyl]-4-carboxylate;

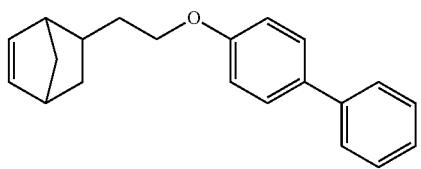 [SMILES: C1=CC2CC1CC2CCOc1ccc(-c2ccccc2)cc1]

5-(2-([1,1'-biphenyl]-4-yloxy)ethyl)bicyclo[2.2.1]hept-2-ene;

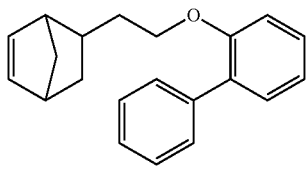 [SMILES: C1=CC2CC1CC2CCOc1ccccc1-c1ccccc1]

5-(2-([1,1'-biphenyl]-2-yloxy)ethyl)bicyclo[2.2.1]hept-2-ene (NBEtOPhPh);

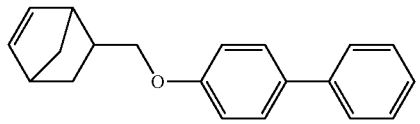

5-(2-([1,1'-biphenyl]-4-yloxy)methyl)bicyclo[2.2.1]hept-2-ene;

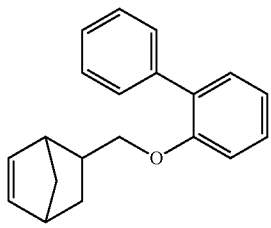 [SMILES: C1=CC2CC1CC2COc1ccccc1-c1ccccc1]

5-(2-([1,1'-biphenyl]-2-yloxy)methyl)bicyclo[2.2.1]hept-2-ene (NBMeOPhPh);

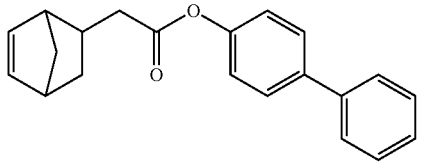 [SMILES: O=C(CC1CC2C=CC1C2)Oc1ccc(-c2ccccc2)cc1]

[1,1'-biphenyl]-4-yl 2-(bicyclo[2.2.1]hept-5-en-2-yl)acetate;

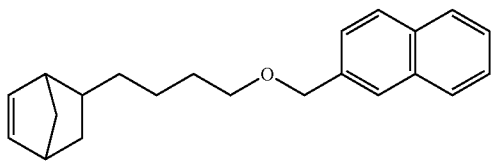 [SMILES: C1=CC2CC1CC2CCCCOCc1ccc2ccccc2c1]

2-((4-(bicyclo[2.2.1]hept-5-en-2-yl)butoxy)methyl)naphthalene;

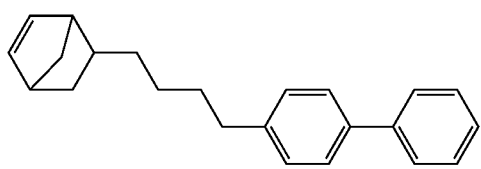 [SMILES: C1=CC2CC1CC2CCCCc1ccc(-c2ccccc2)cc1]

5-(4-([1,1'-biphenyl]-4-yl)butyl)bicyclo[2.2.1]hept-2-ene;

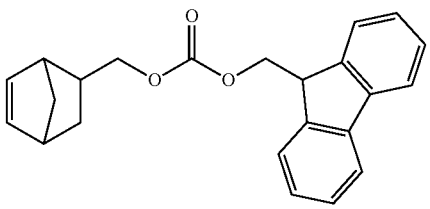 [SMILES: O=C(OCC1c2ccccc2-c2ccccc21)OCC1CC2C=CC1C2]

(9H-fluoren-9-yl)methyl (bicyclo[2.2.1]hept-5-en-2-ylmethyl) carbonate;

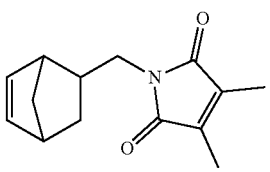 [SMILES: CC1=C(C)C(=O)N(CC2CC3C=CC2C3)C1=O]

1-(4-bicyclo[2.2.1]hept-5-en-2-ylmethyl)-3,4-dimethyl-1H-pyrrole-2,5-dione (MeDMMINB);

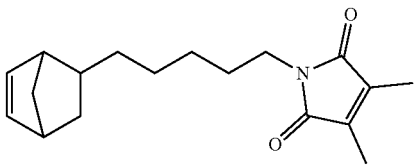 [SMILES: CC1=C(C)C(=O)N(CCCCCC2CC3C=CC2C3)C1=O]

1-(4-bicyclo[2.2.1]hept-5-en-2-ylpentyl)-3,4-dimethyl-1H-pyrrole-2,5-dione (PentylDMMINB);

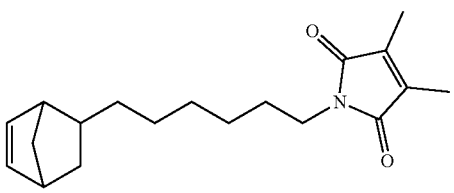 [SMILES: CC1=C(C)C(=O)N(CCCCCCC2CC3C=CC2C3)C1=O]

1-(4-bicyclo[2.2.1]hept-5-en-2-ylhexyl)-3,4-dimethyl-1H-pyrrole-2,5-dione (HxDMMINB);

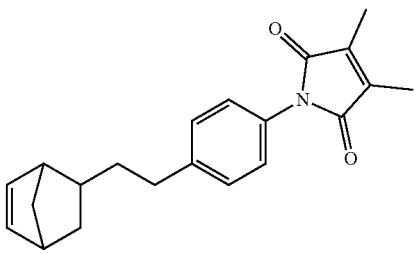 [SMILES: CC1=C(C)C(=O)N(c2ccc(CCC3CC4C=CC3C4)cc2)C1=O]

1-(4-bicyclo[2.2.1]hept-5-en-2-ylethyl)1,4-phenylene-3,4-dimethyl-1H-pyrrole-2,5-dione (EtPhDMMINB);

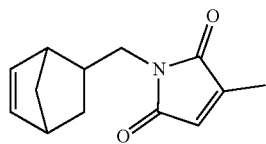 [SMILES: CC1=CC(=O)N(CC2CC3C=CC2C3)C1=O]

1-(4-bicyclo[2.2.1]hept-5-en-2-ylmethyl)-3-methyl-1H-pyrrole-2,5-dione (MeMMINB);

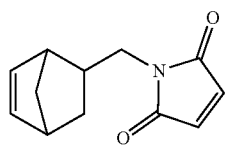 [SMILES: O=C1C=CC(=O)N1CC1CC2C=CC1C2]

1-(4-bicyclo[2.2.1]hept-5-en-2-ylmethyl)-1H-pyrrole-2,5-dione (MeMINB);

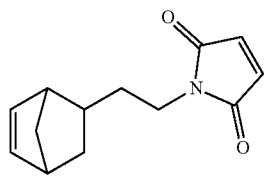 [SMILES: O=C1C=CC(=O)N1CCC1CC2C=CC1C2]

1-(4-bicyclo[2.2.1]hept-5-en-2-ylethyl)-1H-pyrrole-2,5-dione (EtMINB);

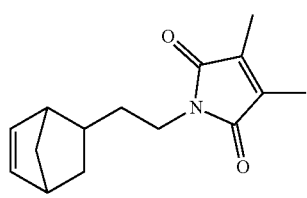 [SMILES: CC1=C(C)C(=O)N(CCC2CC3C=CC2C3)C1=O]

1-(4-bicyclo[2.2.1]hept-5-en-2-ylethyl)-3,4-dimethyl-1H-pyrrole-2,5-dione;

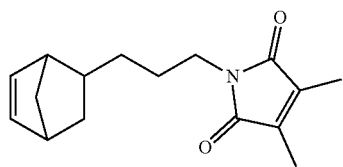 [SMILES: CC1=C(C)C(=O)N(CCCC2CC3C=CC2C3)C1=O]

1-(4-bicyclo[2.2.1]hept-5-en-2-ylpropyl)-3,4-dimethyl-1H-pyrrole-2,5-dione;

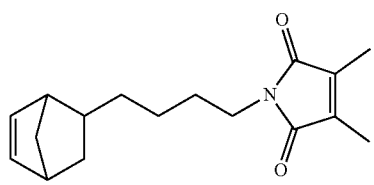 [SMILES: CC1=C(C)C(=O)N(CCCCC2CC3C=CC2C3)C1=O]

1-(4-bicyclo[2.2.1]hept-5-en-2-ylbutyl)-3,4-dimethyl-1H-pyrrole-2,5-dione;

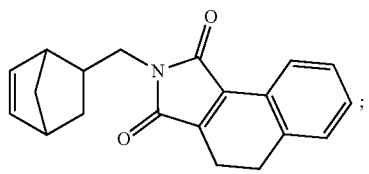

NBDHNMI

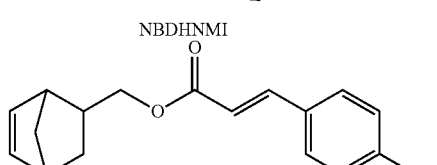

bicyclo[2.2.1]hept-5-en-2-ylmethyl 4-methoxy-cinnamate (NBMeMeOCinn);

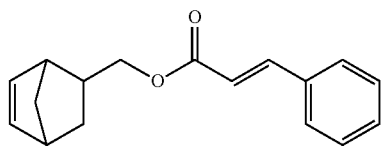 [SMILES: O=C(/C=C/c1ccccc1)OCC1CC2C=CC1C2]

bicyclo[2.2.1]hept-5-en-2-ylmethyl cinnamate (NBMeCinn);

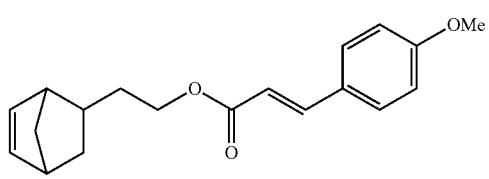 [SMILES: COc1ccc(/C=C/C(=O)OCCC2CC3C=CC2C3)cc1]

bicyclo[2.2.1]hept-5-en-2-ylethyl 4-methoxy-cinnamate (NBEtMeOCinn);

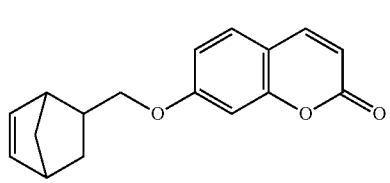 [SMILES: O=c1ccc2ccc(OCC3CC4C=CC3C4)cc2o1]

7-(bicyclo[2.2.1]hept-5-en-2-ylmethoxy)-2H-chromen-2-one (NBMeCoum);

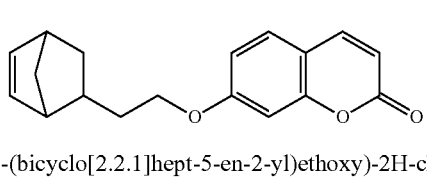

7-(2-(bicyclo[2.2.1]hept-5-en-2-yl)ethoxy)-2H-chromen-2-one (NBEtCoum);

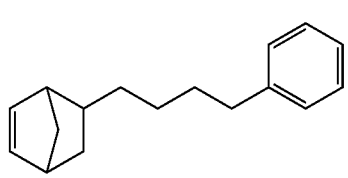 [SMILES: C1=CC2CC1CC2CCCCc1ccccc1]

5-(4-phenylbutyl)bicyclo[2.2.1]hept-2-ene;

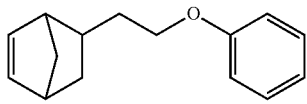 [SMILES: C1=CC2CC1CC2CCOc1ccccc1]

5-(2-phenoxyethyl)bicyclo[2.2.1]hept-2-ene;

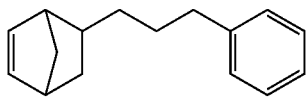 [SMILES: C1=CC2CC1CC2CCCc1ccccc1]

5-(3-phenylpropyl)bicyclo[2.2.1]hept-2-ene;

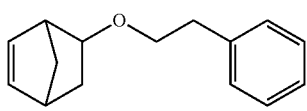 [SMILES: C1=CC2CC1CC2OCCc1ccccc1]

5-phenethoxybicyclo[2.2.1]hept-2-ene;

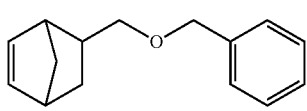 [SMILES: C1=CC2CC1CC2COCc1ccccc1]

5-((benzyloxy)methyl)bicyclo[2.2.1]hept-2-ene;

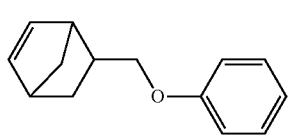

5-(phenoxymethyl)bicyclo[2.2.1]hept-2-ene;

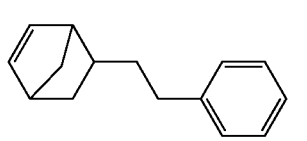

5-phenethylbicyclo[2.2.1]hept-2-ene;

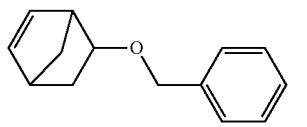

5-(benzyloxy)bicyclo[2.2.1]hept-2-ene;

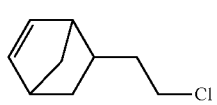

5-(2-chloroethyl)bicyclo[2.2.1]hept-2-ene (NBEtCl);

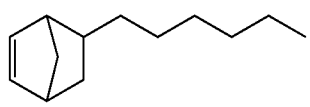

5-hexylbicyclo[2.2.1]hept-2-ene (HexNB);

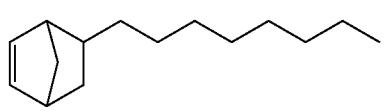

5-octylbicyclo[2.2.1]hept-2-ene (OctNB);

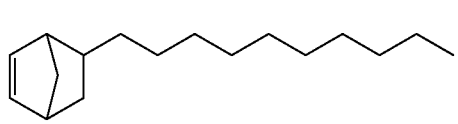 [SMILES: CCCCCCCCCCC1CC2C=CC1C2]

5-decylbicyclo[2.2.1]hept-2-ene (DecNB);

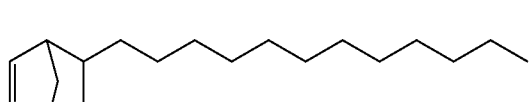

5-dodecylbicyclo[2.2.1]hept-2-ene (DoDecNB);

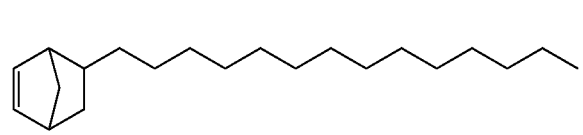 [SMILES: CCCCCCCCCCCCCCC1CC2C=CC1C2]

5-tetradecylbicyclo[2.2.1]hept-2-ene (TetraDecNB);

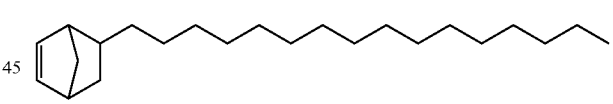

5-hexadecylbicyclo[2.2.1]hept-2-ene (HexadecylNB);

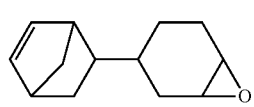

3-(bicyclo[2.2.1]hept-5-en-2-yl)-7-oxabicyclo[4.1.0]heptane (CHEpNB);

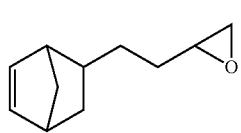 [SMILES: C1=CC2CC1CC2CCC1CO1]

2-(2-(bicyclo[2.2.1]hept-5-en-2-yl)ethyl)oxirane (EBNB);

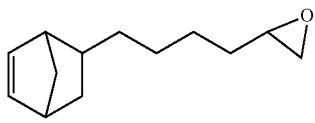 [SMILES: C1=CC2CC1CC2CCCCC1CO1]

2-(4-(bicyclo[2.2.1]hept-5-en-2-yl)butyl)oxirane (EHNB);

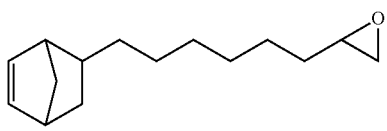 [SMILES: C1=CC2CC1CC2CCCCCCC1CO1]

2-(6-(bicyclo[2.2.1]hept-5-en-2-yl)hexyl)oxirane (EONB);

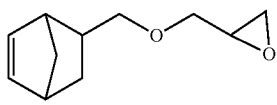 [SMILES: C1=CC2CC1CC2COCC1CO1]

2-((bicyclo[2.2.1]hept-5-en-2-ylmethoxy)methyl)oxirane (MGENB);

tetracyclododecene (TD);

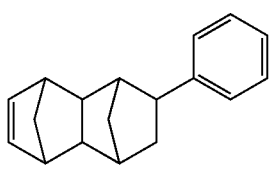 [SMILES: C1=CC2CC1C1C3CC(c4ccccc4)C(C3)C21]

2-phenyl-tetracyclododecene (PhTD);

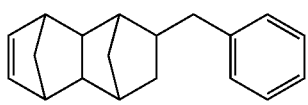 [SMILES: C1=CC2CC1C1C3CC(Cc4ccccc4)C(C3)C21]

2-benzyl-1,2,3,4,4a,5,8,8a-octahydro-1,4:5,8-dimethanonaphthalene;

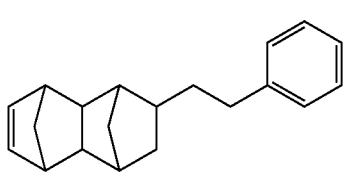 [SMILES: C1=CC2CC1C1C3CC(CCc4ccccc4)C(C3)C21]

2-phenethyl-1,2,3,4,4a,5,8,8a-octahydro-1,4:5,8-dimethanonaphthalene (PETD);

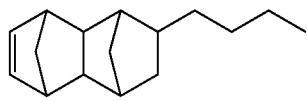 [SMILES: CCCCC1CC2CC1C1C3C=CC(C3)C21]

2-butyl-1,2,3,4,4a,5,8,8a-octahydro-1,4:5,8-dimethanonaphthalene (ButylTD);

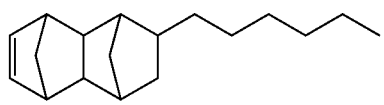 [SMILES: CCCCCCC1CC2CC1C1C3C=CC(C3)C21]

2-hexyl-1,2,3,4,4a,5,8,8a-octahydro-1,4:5,8-dimethanonaphthalene (HexylTD);

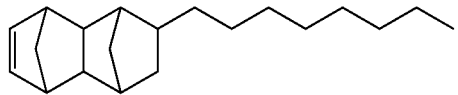 [SMILES: CCCCCCCCC1CC2CC1C1C3C=CC(C3)C21]

2-octyl-1,2,3,4,4a,5,8,8a-octahydro-1,4:5,8-dimethanonaphthalene (OctylTD);

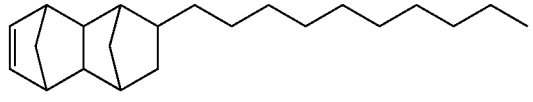 [SMILES: CCCCCCCCCCC1CC2CC1C1C3C=CC(C3)C21]

2-decyl-1,2,3,4,4a,5,8,8a-octahydro-1,4:5,8-dimethanonaphthalene (DecylTD);

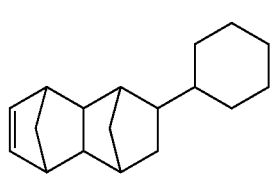 [SMILES: C1=CC2CC1C1C3CC(C4CCCCC4)C(C3)C21]

2-cyclohexyl-tetracyclododecene (CyclohexylTD);

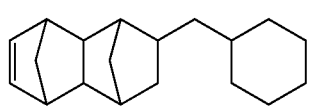 [SMILES: C1=CC2CC1C1C3CC(CC4CCCCC4)C(C3)C21]

2-cyclohexylmethyl-1,2,3,4,4a,5,8,8a-octahydro-1,4:5,8-dimethanonaphthalene;

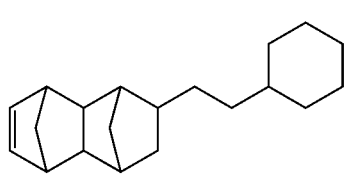 [SMILES: C1=CC2CC1C1C3CC(CCC4CCCCC4)C(C3)C21]

2-cyclohexylethyl-1,2,3,4,4a,5,8,8a-octahydro-1,4:5,8-dimethanonaphthalene; and

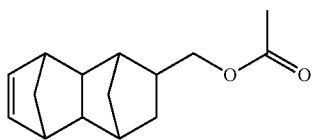 [SMILES: CC(=O)OCC1CC2CC1C1C3C=CC(C3)C21]

(1,2,3,4,4a,5,8,8a-octahydro-1,4:5,8-dimethanonaphthalen-2-yl)methyl acetate (TDMeOAc).

Again it should be noted that any of the aforementioned monomers of formula (IV) can be used as one or more monomers in any combination thereof in the compositions of this invention. All such permissible combinations are part of this invention.

Turning now to monomer of formula (XI) to form the composition of this invention it is contemplated that any monomer within the scope of monomer of formula (XI) can be employed. Exemplary monomers of such type include but not limited to those selected from the group consisting of:

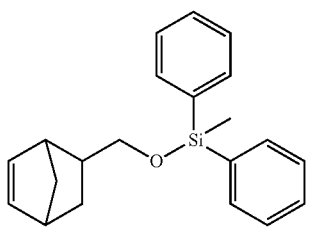 [SMILES: C[Si](OCC1CC2C=CC1C2)(c1ccccc1)c1ccccc1]

(bicyclo[2.2.1]hept-5-en-2-ylmethoxy)(methyl)diphenylsilane (NBCH$_2$OSiMePh$_2$);

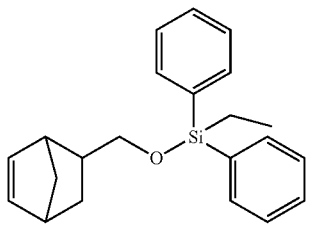 [SMILES: CC[Si](OCC1CC2C=CC1C2)(c1ccccc1)c1ccccc1]

(bicyclo[2.2.1]hept-5-en-2-ylmethoxy)(ethyl)diphenylsilane;

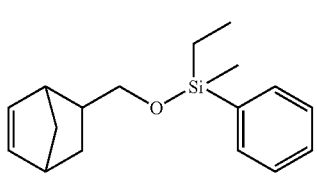 [SMILES: CC[Si](C)(OCC1CC2C=CC1C2)c1ccccc1]

(bicyclo[2.2.1]hept-5-en-2-ylmethoxy)(ethyl)(methyl)(phenyl)silane;

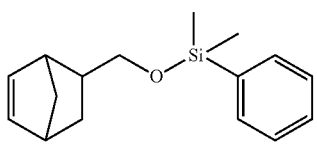 [SMILES: C[Si](C)(OCC1CC2C=CC1C2)c1ccccc1]

(bicyclo[2.2.1]hept-5-en-2-ylmethoxy)dimethyl(phenyl)silane;

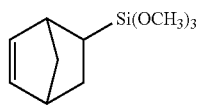

bicyclo[2.2.1]hept-5-en-2-yltrimethoxysilane;

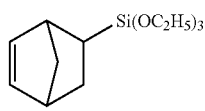

bicyclo[2.2.1]hept-5-en-2-yltriethoxysilane (TESNB, NBSi(OC$_2$H$_5$)$_3$);

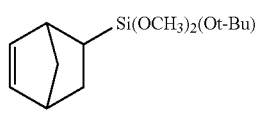

bicyclo[2.2.1]hept-5-en-2-yl(tert-butoxy)dimethoxysilane;

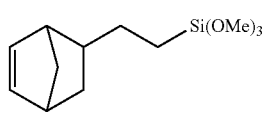

(2-(bicyclo[2.2.1]hept-5-en-2-yl)ethyl)trimethoxysilane;

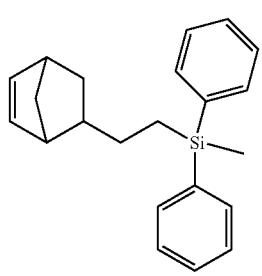 [SMILES: C[Si](CCC1CC2C=CC1C2)(c1ccccc1)c1ccccc1]

(2-(bicyclo[2.2.1]hept-5-en-2-yl)ethyl)(methyl)diphenylsilane; and

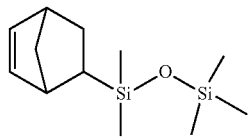

1-(bicyclo[2.2.1]hept-5-en-2-yl)-1,1,3,3,3-pentamethyldisiloxane.

Turning now to monomer of formula (XII) to form the composition of this invention it is contemplated that any monomer within the scope of monomer of formula (XII) can be employed. Exemplary monomers of such type include but not limited to those selected from the group consisting of:

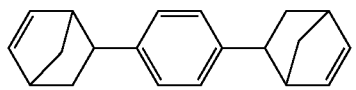 [SMILES: C1=CC2CC1CC2c1ccc(C2CC3C=CC2C3)cc1]

1,4-di(bicyclo[2.2.1]hept-5-en-2-yl)benzene;

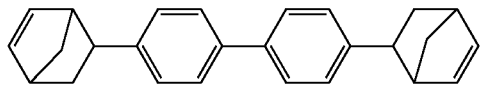 [SMILES: C1=CC2CC1CC2c1ccc(-c2ccc(C3CC4C=CC3C4)cc2)cc1]

4,4'-di(bicyclo[2.2.1]hept-5-en-2-yl)-1,1'-biphenyl;

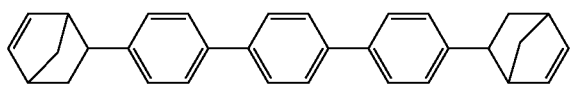

4,4''-di(bicyclo[2.2.1]hept-5-en-2-yl)-1,1':4',1''-terphenyl;

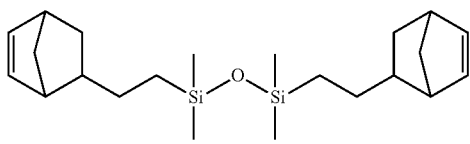 [SMILES: C[Si](C)(CCC1CC2C=CC1C2)O[Si](C)(C)CCC1CC2C=CC1C2]

1,3-bis(norbornenylethyl)-1,1,3,3-tetramethyldisiloxane (BisNBEt-Disiloxane);

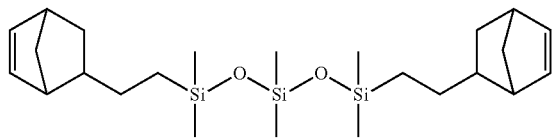 [SMILES: C[Si](C)(CCC1CC2C=CC1C2)O[Si](C)(C)O[Si](C)(C)CCC1CC2C=CC1C2]

1,5-bis(2-(bicyclo[2.2.1]hept-5-en-2-yl)ethyl)-1,1,3,3,5,5-hexamethyltrisiloxane (BisNBEt-Trisiloxane);

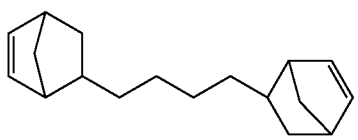 [SMILES: C1=CC2CC1CC2CCCCC1CC2C=CC1C2]

1,4-di(bicyclo[2.2.1]hept-5-en-2-yl)butane;

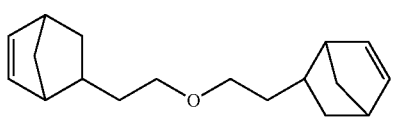 [SMILES: C1=CC2CC1CC2CCOCCC1CC2C=CC1C2]

5,5'-(oxybis(ethane-2,1-diyl))bis(bicyclo[2.2.1]hept-2-ene); and

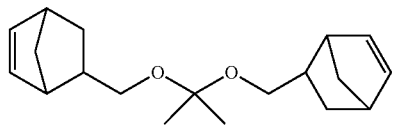 [SMILES: CC(C)(OCC1CC2C=CC1C2)OCC1CC2C=CC1C2]

5,5'-((propane-2,2-diylbis(oxy))bis(methylene))bis(bicyclo[2.2.1]hept-2-ene).

In a further embodiment, the composition of this invention encompasses one or more monomers of formula (IV) and at least one monomer of formula (XI).

In another embodiment, the composition of this invention encompasses one or more monomers of formula (XI) and at least one monomer of formula (XII) and optionally one monomer of formula (IV).

In yet a further embodiment, the composition of this invention encompasses at least one monomer of formula (IV) and at least one monomer of formula (XI), and optionally one monomer of formula (XII).

In yet a further embodiment, the composition of this invention encompasses one monomer of formula (XI), optionally one or more monomers of formula (IV) or one or more monomers of formula (XII).

In yet another embodiment, the composition of this invention may include one or more monomers selected from the following:

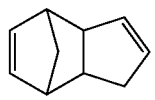

dicyclopentadiene (DCPD);

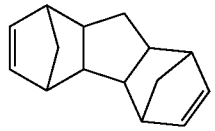 [SMILES: C1=CC2CC1C1CC3C4C=CC(C4)C3C21]

4,4a,4b,5,8,8a,9,9a-octahydro-1H-1,4:5,8-dimethanofluorene (one of trimers of cyclopentadiene, TCPD2);

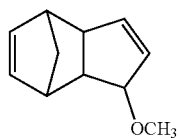

1-methoxy-dicyclopentadiene;

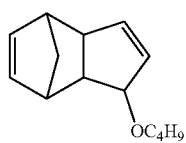

1-(n-butoxy)-dicyclopentadiene;

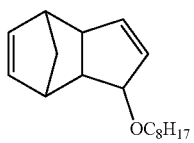

1-(n-octyloxy)-dicyclopentadiene;

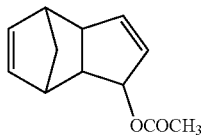

3a,4,7,7a-tetrahydro-1H-4,7-methanoinden-1-yl acetate;

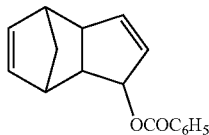

3a,4,7,7a-tetrahydro-1H-4,7-methanoinden-1-yl benzoate;

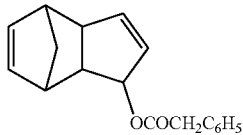

3a,4,7,7a-tetrahydro-1H-4,7-methanoinden-1-yl 2-phenylacetate; and

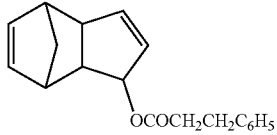

3a,4,7,7a-tetrahydro-1H-4,7-methanoinden-1-yl 3-phenylpropanoate.

In a further embodiment of this invention, the composition contains any of the organopalladium compounds of formula (I) that would bring about the mass polymerization as described herein. The organopalladium compounds of formula (I) that are suitable to be employed in the compositions of this invention can be readily made by any of the known procedures in the art. See for example, U.S. Pat. No. 7,442,800 B2 and 7,759,439 B2, pertinent portions of which are incorporated herein by reference.

Exemplary organopalladium compounds of formula (I) that can be employed in the composition of this invention without any limitation include the following:

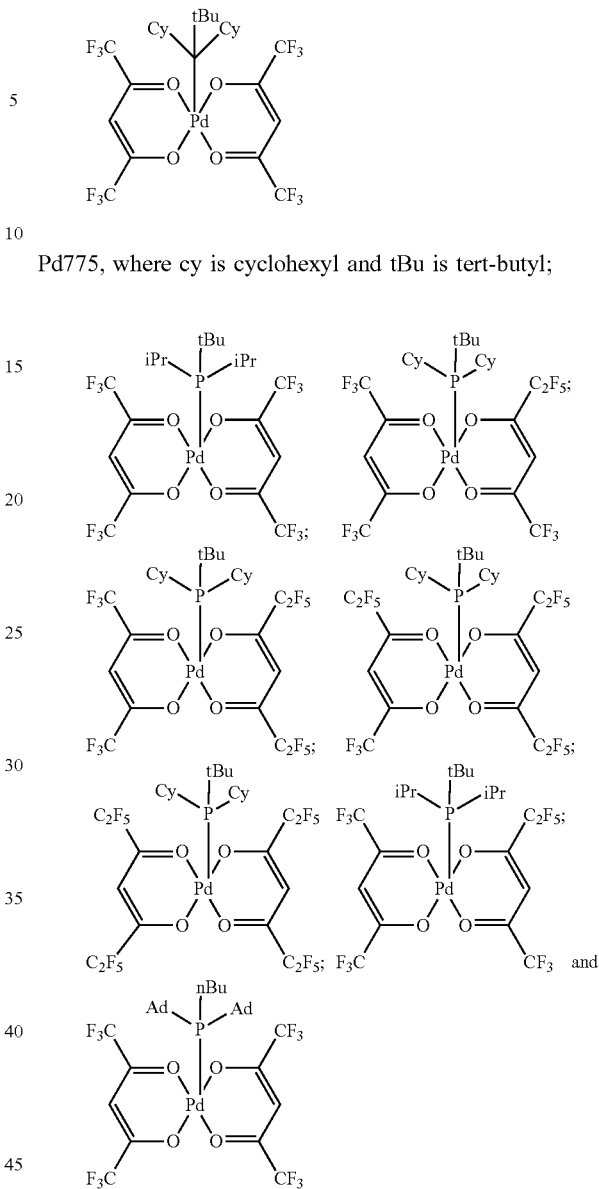

Pd775, where cy is cyclohexyl and tBu is tert-butyl;

Pd879, where Ad is adamantyl, nBu is n-butyl.

As noted, the composition of this invention further contains a photoacid generator which when combined with the organopalladium compound of formula (I) and a photosensitizer will cause mass polymerization of the monomers contained therein when exposed to suitable radiation as described herein. Any of the known photoacid generators can be used in the compositions of this invention, such as for example, certain of the halonium salts.

In some embodiments the photoacid generator of the formula (III$_a$) are employed in the composition of this invention:

$$\text{Aryl}_1\text{-Hal} \oplus \text{-Aryl}_2\text{An} \ominus \quad (\text{III}_a)$$

Wherein Aryl$_1$ and Aryl$_2$ are the same or different and are independently selected from the group consisting of substituted or unsubstituted phenyl, biphenyl and naphthyl; Hal is iodine or bromine; and An$\ominus$ is a weakly coordinating anion (WCA) which is weakly coordinated to the cation complex. More specifically, the WCA anion functions as a stabilizing anion to the cation complex. The WCA anion is relatively inert in that it is non-oxidative, non-reducing, and non-nucleophilic. In general, the WCA can be selected from borates, phosphates, arsenates, antimonates, aluminates, boratobenzene anions, carborane, halocarborane anions, sulfonamidate and sulfonates Representative examples of the compounds of formula (III$_a$) may be listed as follows:

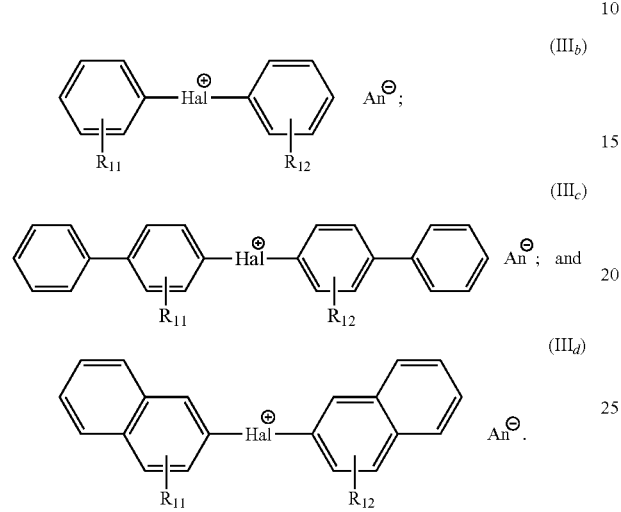

Wherein R$_{11}$ and R$_{12}$ are as defined herein. Similarly various sulfonium salts can be used as photoacid generators, which include broadly compounds of formula (II) as described herein.

Accordingly, non-limiting examples of suitable photoacid generators of formula (II) that may be employed in the composition of this invention are listed below:

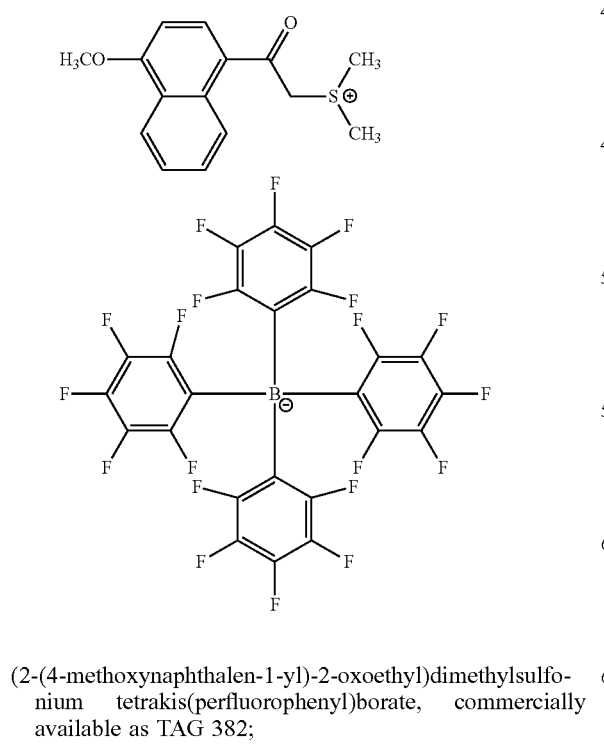

(2-(4-methoxynaphthalen-1-yl)-2-oxoethyl)dimethylsulfonium tetrakis(perfluorophenyl)borate, commercially available as TAG 382;

tris(4-((4-acetylphenyl)thio)phenyl)sulfonium tris((trifluoromethyl)sulfonyl)methanide;

(4-thiophenyl)phenyl-diphenylsulfonium hexafluorophosphate;

bis-(triphenylsulfonium) sulfide bis-hexafluorophosphate;

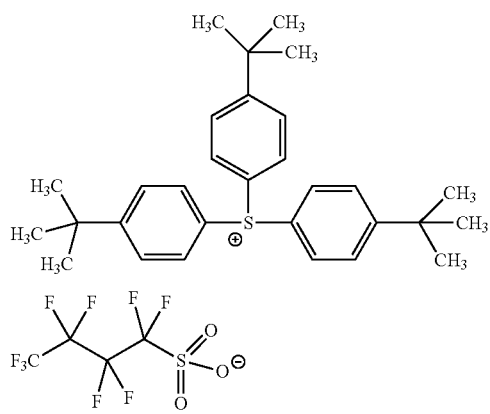

tris(4-tert-butylphenyl)sulfonium perfluoro-1-butane-sulfonate;

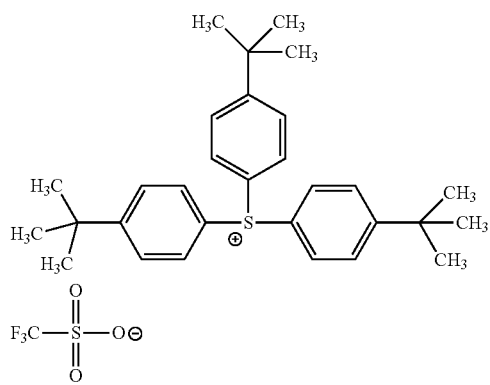

tris(4-tert-butylphenyl)sulfonium triflate;

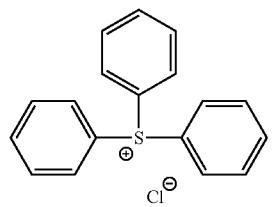 [SMILES: c1ccc([S+](c2ccccc2)c2ccccc2)cc1 ; [Cl-]]

triphenylsulfonium chloride;

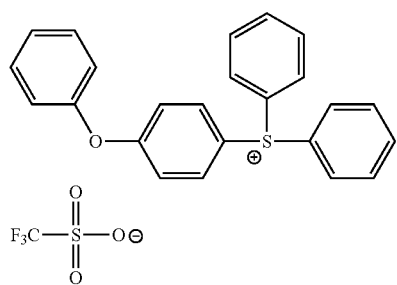

(4-phenoxyphenyl)diphenylsulfonium triflate; and

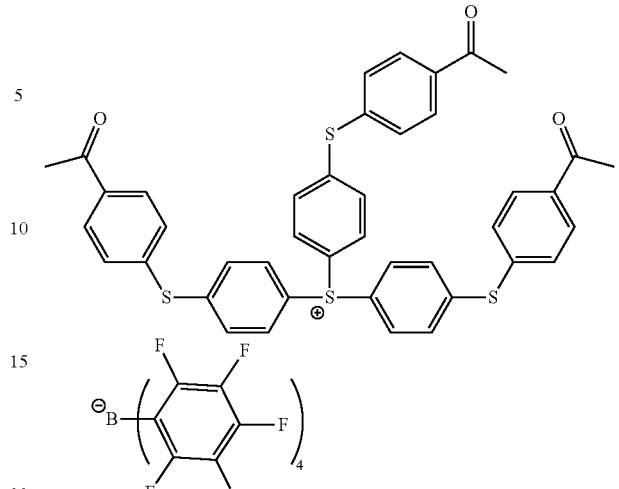

tris(4-((4-acetylphenyl)thio)phenyl)sulfonium tetrakis-pentafluorophenylborate (Irgacure PAG290).

Non-limiting examples of suitable photoacid generators of formula (III) that may be employed in the composition of this invention are listed below:

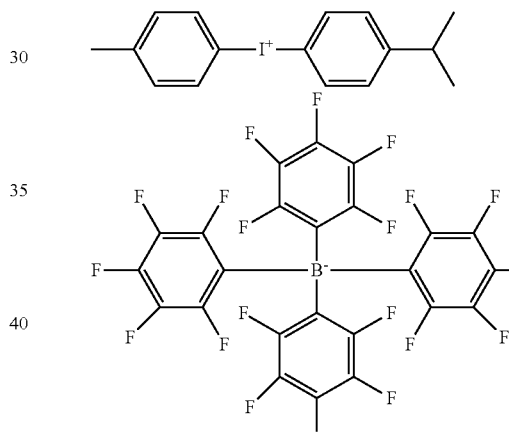

tolylcumyliodonium-tetrakis pentafluorophenylborate, commercially available under the tradename Bluesil PI 2074® from Elkem Silicones;

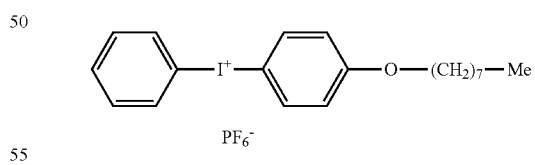

[4-(octyloxy)phenyl]-phenyliodonium (hexafluoro)phosphate (OPPI $PF_6$);

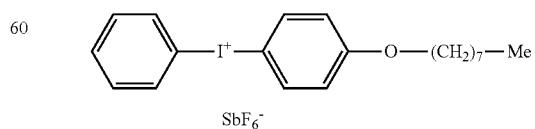

[4-(octyloxy)phenyl]-phenyliodonium (hexafluoro)antimonate (OPPI $SbF_6$);

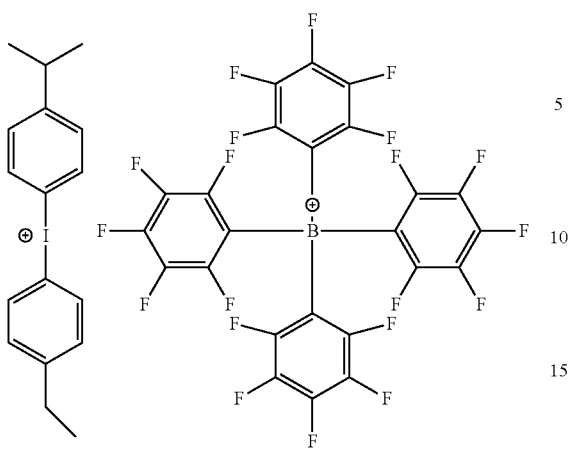

(4-ethylphenyl)(4-isopropylphenyl)iodonium tetrakis(perfluorophenyl)borate;

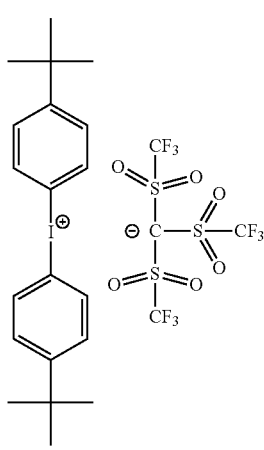 [SMILES: CC(C)(C)c1ccc([I+]c2ccc(C(C)(C)C)cc2)cc1 ; O=S(=O)([C-](S(=O)(=O)C(F)(F)F)S(=O)(=O)C(F)(F)F)C(F)(F)F]

di-(p-t-butylphenyl)iodonium tris(trifluoromethanesulfonyl) methanide;

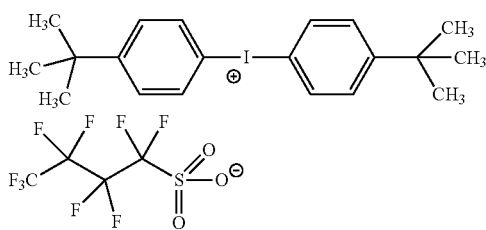

bis(4-tert-butylphenyl)iodonium perfluoro-1-butanesulfonate;

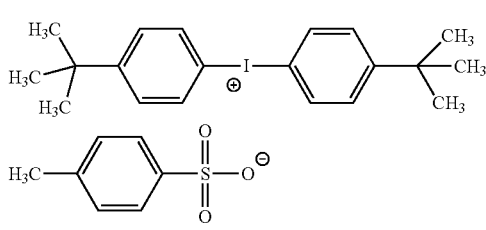

bis(4-tert-butylphenyl)iodonium p-toluenesulfonate;

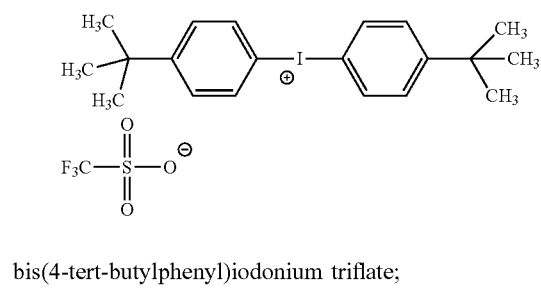

bis(4-tert-butylphenyl)iodonium triflate;

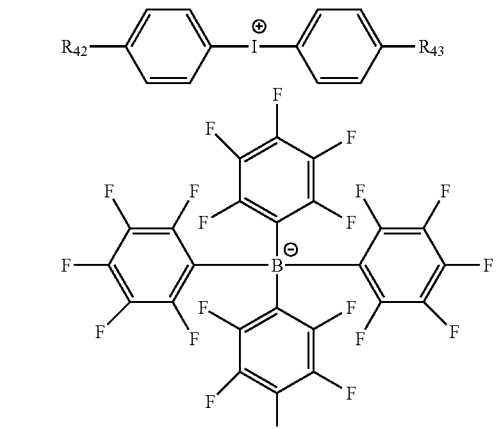

where $R_{42}$ and $R_{43}$ are the same or different and each independently selected from linear or branched ($C_{10}$-$C_{13}$) alkyl, for example iodonium, diphenyl-, 4,4'-di-$C_{10}$-$C_{13}$-alkyl derivatives, tetrakis(2,3,4,5,6-pentafluorophenyl)borates (PAG1) are commercially
available under the tradename SILCOLEASE UV CATA 243; and

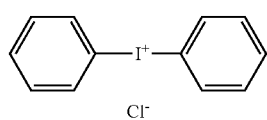 [SMILES: c1ccc([I+]c2ccccc2)cc1 ; [Cl-]]

diphenyliodonium chloride.

Other exemplary PAGs that may be suitable in the composition of this invention include the following:

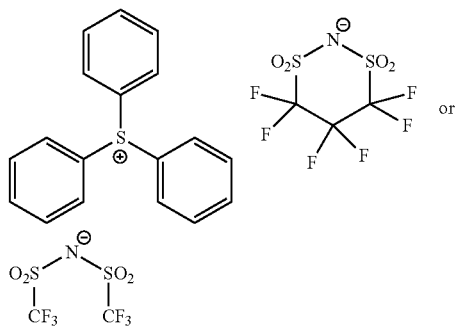

triphenylsulfonium 4,4,5,5,6,6-hexafluoro-1,3,2-dithiazinan-2-ide 1,1,3,3-tetraoxide or bis((trifluoromethyl)sulfonyl)amide;

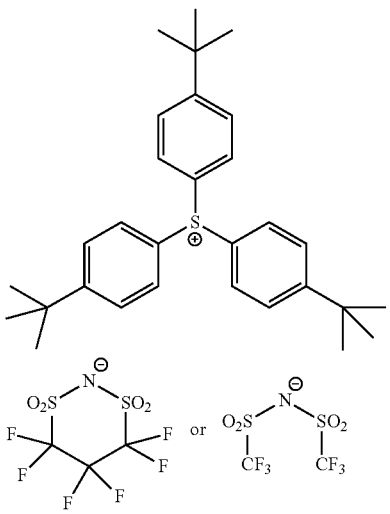

tris(4-(tert-butyl)phenyl)sulfonium 4,4,5,5,6,6-hexafluoro-1,3,2-dithiazinan-2-ide 1,1,3,3-tetraoxide or bis((trifluoromethyl)sulfonyl)amide;

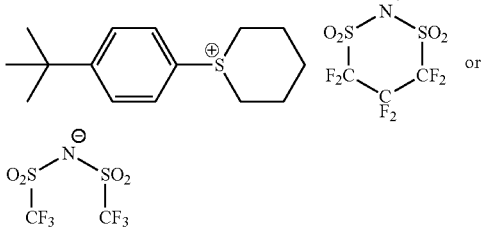

1-(4-(tert-butyl)phenyl)hexahydrothiopyrylium 4,4,5,5,6,6-hexafluoro-1,3,2-dithiazinan-2-ide 1,1,3,3-tetraoxide or bis((trifluoromethyl)sulfonyl)amide;

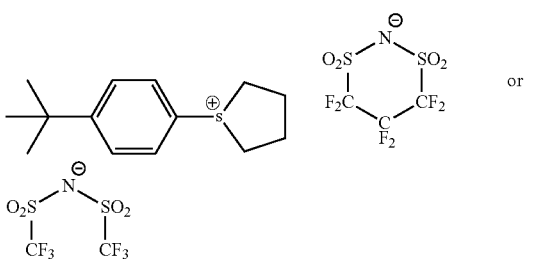

1-(4-(tert-butyl)phenyl)tetrahydro-1H-thiophen-1-ium 4,4,5,5,6,6-hexafluoro-1,3,2-dithiazinan-2-ide 1,1,3,3-tetraoxide or bis((trifluoromethyl)sulfonyl)amide; and

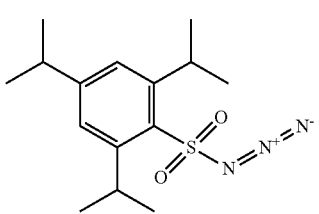 [SMILES: CC(C)c1cc(C(C)C)c(S(=O)(=O)N=[N+]=[N-])c(C(C)C)c1]

2,4,6-triisopropylbenzenesulfonyl azide.

However, any of the other known photoacid generators which can activate the organopalladium compounds of formula (I) as employed herein when exposed to suitable radiation can also be used in the composition of this invention. All such compounds are part of this invention.

As noted, the composition of this invention additionally contains a photosensitizer compound which further facilitates the formation of the active catalyst when the composition is exposed to suitable radiation in the presence of the photoacid generator as employed herein. For this purpose, any suitable sensitizer compound can be employed in the compositions of the present invention, which activates the photoacid generator and/or the organopalladium compound of formula (I). Such suitable sensitizer compounds include, anthracenes, phenanthrenes, chrysenes, benzpyrenes, fluoranthenes, rubrenes, pyrenes, xanthones, indanthrenes, thioxanthen-9-ones, and mixtures thereof. In some exemplary embodiments, suitable sensitizer components include a compound of formula (XIII) or a compound of formula (XIV):

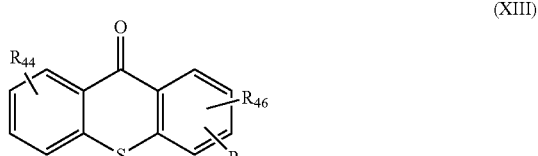

(XIII)

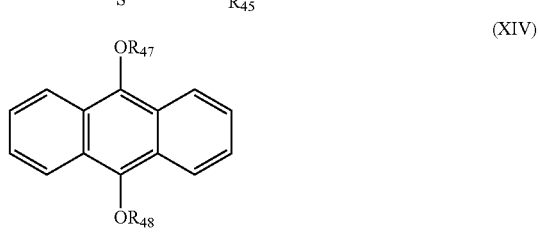

(XIV)

wherein $R_{44}$, $R_{45}$ and $R_{46}$ are the same or different and independently of each other selected from the group consisting of hydrogen, halogen, hydroxy, $NO_2$, $NH_2$, methyl, ethyl, linear or branched ($C_3$-$C_{12}$)alkyl, ($C_3$-$C_{12}$)cycloalkyl, ($C_6$-$C_{12}$) bicycloalkyl, ($C_7$-$C_{14}$)tricycloalkyl, ($C_6$-$C_{10}$)aryl, ($C_6$-$C_{10}$) aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$) aryloxy($C_1$-$C_3$)alkyl, ($C_6$-$C_{10}$)-aryloxy, C(O)($C_1$-$C_6$)alkyl, COOH, C(O)O($C_1$-$C_6$)alkyl, and $SO_2$($C_6$-$C_{10}$)aryl;

$R_{47}$ and $R_{48}$ are the same or different and independently of each other selected from the group consisting of methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl and ($C_6$-$C_{10}$)aryl($C_1$-$C_3$)alkyl.

Representative examples of the compounds of formula (XIII) or the compounds of formula (XIV) without any limitation may be listed as follows:

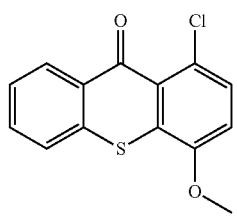

1-chloro-4-methoxy-9H-thioxanthen-9-one;

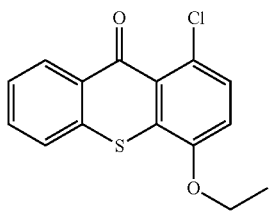 [SMILES: CCOc1ccc(Cl)c2c(=O)c3ccccc3sc12]

1-chloro-4-ethoxy-9H-thioxanthen-9-one;

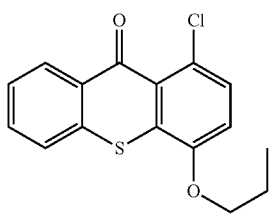 [SMILES: CCCOc1ccc(Cl)c2c(=O)c3ccccc3sc12]

1-chloro-4-propoxy-9H-thioxanthen-9-one (commercially sold under the name CPTX from Lambson);

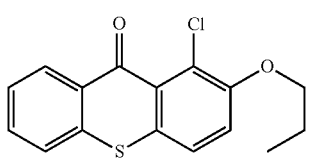

1-chloro-2-propoxy-9H-thioxanthen-9-one;

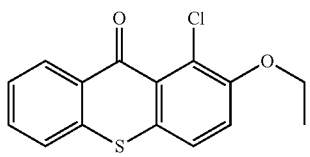 [SMILES: CCOc1ccc2sc3ccccc3c(=O)c2c1Cl]

1-chloro-2-ethoxy-9H-thioxanthen-9-one;

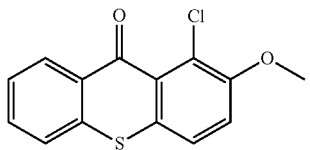 [SMILES: COc1ccc2sc3ccccc3c(=O)c2c1Cl]

1-chloro-2-methoxy-9H-thioxanthen-9-one;

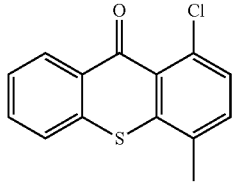 [SMILES: Cc1ccc(Cl)c2c(=O)c3ccccc3sc12]

1-chloro-4-methyl-9H-thioxanthen-9-one;

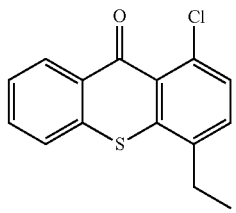 [SMILES: CCc1ccc(Cl)c2c(=O)c3ccccc3sc12]

1-chloro-4-ethyl-9H-thioxanthen-9-one;

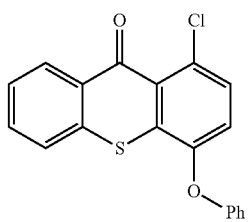 [SMILES: O=c1c2ccccc2sc2c(Oc3ccccc3)ccc(Cl)c12]

1-chloro-4-phenoxy-9H-thioxanthen-9-one;

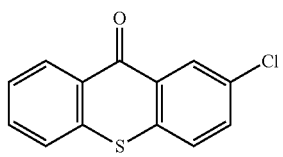 [SMILES: O=c1c2ccccc2sc2ccc(Cl)cc12]

2-chlorothioxanthen-9-one (CTX);

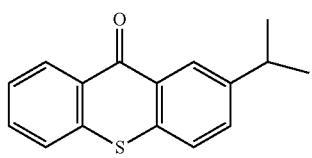 [SMILES: CC(C)c1ccc2sc3ccccc3c(=O)c2c1]

2-isopropyl-9H-thioxanthen-9-one (ITX);

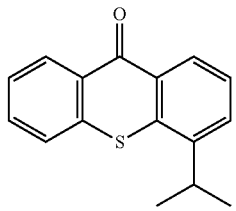 [SMILES: CC(C)c1cccc2c(=O)c3ccccc3sc12]

4-isopropyl-9H-thioxanthen-9-one;

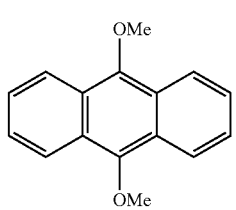 [SMILES: COc1c2ccccc2c(OC)c2ccccc12]

9,10-dimethoxyanthracene (DMA);

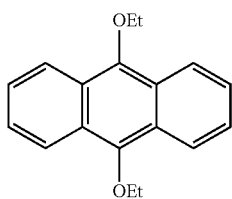 [SMILES: CCOc1c2ccccc2c(OCC)c2ccccc12]

9,10-diethoxyanthracene (DEA); and

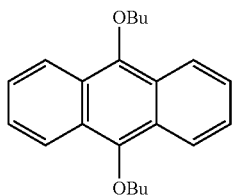

9,10-di-n-butoxyanthracene (DBA).

Other suitable photosensitizer compounds include various substituted and unsubstituted phenothiazine derivatives, such as for example:

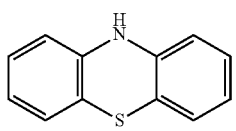 [SMILES: c1ccc2c(c1)Nc1ccccc1S2]

phenothiazine.

Generally, photosensitizers absorb energy from the radiated light source and transfers that energy to the desirable substrate/reactant, which in the present invention is the photoacid generator employed in the composition of this invention. In some embodiments the compounds of formula (II) or the compounds of formula (III) can be activated at certain wavelength of the electromagnetic radiation which can generally range from about 240 nm to 410 nm. Accordingly, any of the compounds which are active in this electromagnetic radiation can be employed in the compositions of this invention which are stable to various fabrications methods where the compositions of this invention can be used including for example OLED or the 3D fabrication methods. In some embodiments the wavelength of the radiation to activate the compounds of formulae (II) or (III) is 260 nm. In some other embodiments the wavelength of the radiation to activate the compounds of formulae (II) or (III) is 310 nm. In some other embodiments the wavelength of the radiation to activate the compounds of formulae (II) or (III) is 365 nm. In yet some other embodiments the wavelength of the radiation to activate the compounds of formulae (II) or (III) is 395 nm.

Any amount of organopalladium compound of formula (I), the photoacid generator of formulae (II) or (III) and the photosensitizer of formulae (XIII) or (XIV) can be employed in the composition of this invention which will bring about the intended result. Generally, the molar ratio of monomer of formula (IV):compound of formula (I) is in the range of 25,000:1 to 5,000:1 or lower. In some other embodiments such monomer of formula (IV):compound of formula (I) is 10,000:1, 15,000:1, 20,000:1 or higher than 30,000:1. It should be noted that monomer of formula (IV) as mentioned herein may include one or more monomers of formula (IV) distinct from each other and may additionally contain one or more monomers of formulae (XI) or (XII), and therefore, the above ratio represents combined molar amounts of all such olefinic monomers employed. Similarly, the molar ratio of organopalladium compound of formula (I):the photoacid generator of formulae (II) or (III):the photosensitizer of formulae (VIII) or (IX) is in the range of 1:1:0.5 to 1:2:2 or 1:2:1 or 1:4:1, 1:2:4, 1:1:2, 1:4:2 or such ranges which will bring about the intended benefit.

Advantageously, it has now been found that employing a suitable additive further improves the storage stability of the compositions of this invention. In some embodiments, such extension of storage stability can be twice as much without the additive being present. Suitable such additives may be selected from the group consisting of:

a compound selected from the group consisting of:

a compound of the formula (V):

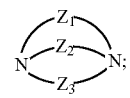

(V)

where $Z_1$, $Z_2$ and $Z_3$ are the same or different and each independently is $((CH_2)_gO)_h(CH_2)_g)$ where g and h are integers from 2 to 4;

a compound of the formula (VI):

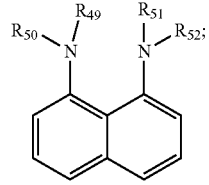

(VI)

where $R_{49}$, $R_{50}$, $R_{51}$ and $R_{52}$ are the same or different and each independently selected from the group consisting of hydrogen, methyl, ethyl and linear or branched ($C_3$-$C_{20}$) alkyl; and a compound of the formula (VII):

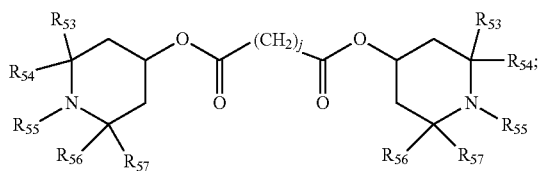

(VII)

a compound of the formula (VIII):

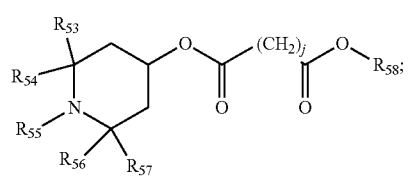

(VIII)

where j is an integer from 6 to 16;

$R_{53}$, $R_{54}$, $R_{56}$, $R_{57}$ and $R_{58}$ are the same or different and each independently selected from the group consisting of hydrogen, methyl, ethyl and linear or branched ($C_3$-$C_{20}$) alkyl;

$R_{55}$ is selected from the group consisting of methyl, ethyl, linear or branched ($C_3$-$C_{20}$)alkyl, methoxy, ethoxy and linear or branched ($C_3$-$C_{20}$)alkoxy; and a compound of the formula (IX):

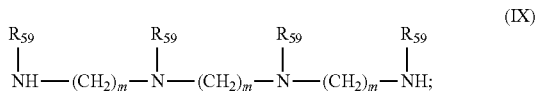

(IX)

where each m maybe same or different and is an integer from 2 to 6;

$R_{59}$ is a group of the formula:

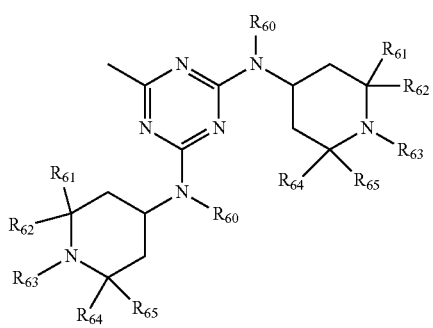

$R_{60}$, $R_{61}$, $R_{62}$, $R_{63}$, $R_{64}$ and $R_{65}$ are the same or different and each independently selected from the group consisting of hydrogen, methyl, ethyl and linear or branched ($C_3$-$C_{20}$) alkyl; and a compound of the formula (X):

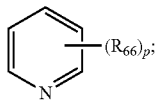

(X)

where p is an integer from 1 to 5;

each $R_{66}$ maybe the same or different and each independently selected from the group consisting of halogen, methyl, ethyl and linear or branched ($C_3$-$C_{20}$)alkyl and $NR_{67}R_{68}$, where each $R_{67}$ and $R_{68}$ are the same or different and each independently selected from the group consisting of methyl, ethyl and linear or branched ($C_3$-$C_{20}$)alkyl.

Surprisingly, it has now been found that employing small amounts of one or more of an additive of formulae (V) to (X) it is now possible to stabilize the compositions of this invention. In general, the shelf life stability of the compositions can be increased from 0 days to several days by using any of the additives of formulae (V) to (X). It has been observed that by employing as low as 0.1 molar parts of any one of the additives when compared with 2 to 4 molar parts of the photoacid generators the stability of the compositions of this invention can be improved as much as seven to fourteen days at room temperature. Although it is not clear as to how the stability of the compositions are increased it is speculated that by employing one or more additives of formulae (V) to (X) it is now possible to stabilize the photoacid generator. It is further postulated that any acid released by the photoacid generator is neutralized by the additive of formulae (V) to (X) and thereby preventing any premature polymerization of the olefinic monomers as employed herein.

The amount of the additive of formulae (V) to (X) also depends on the types of the additive employed and thus the amount may vary depending upon the specific type of additive employed in a composition of this invention. Also, mixtures of additives can be employed which may include one or more of the same types of additives of formulae (V) to (X) or a mixture of one or more of additives of formulae (V) to (X). A several of these additives are also known in the art and readily available commercially. For example, the additives of formulae (VII) and (VIII) are known commercially. For example, a mixture of a compound of formula (VII) and a compound of formula (VIII) is commercially available under the tradename TINUVIN® 292, which is a mixture of bis(1,2,2,6,6-pentamethylpiperidin-4-yl) sebacate and methyl 1,2,2,6,6-pentamethylpiperidin-4-yl sebacate. A compound of formula (VI), 1,8-bis(dimethylamino)-naphthalene, is commercially available under the tradename PROTON SPONGE®. Similarly, various other compounds of formulae (V) to (X) as described herein are commercially available, and are commonly used as light stabilizers, particularly, ultraviolet (UV) rays. Specifically, the compounds of formulae (V) to (X) operate as UV protectors by combining with oxygen when exposed to light to form stable nitroxide radicals. Accordingly, the compounds of formulae (V) to (X) provide additional benefits for the composition of this invention.

Accordingly, in some embodiments, the composition of this invention encompasses one or more compounds of formula (V), which provide increased stability to the compositions, thereby increasing their shelf life stability at room temperature from one week to two weeks or longer. The compounds of formula (V) are commonly known as cryptands and various cryptands that are suitable as an additive in the composition of this invention are further described below. The amount of the compound of formula (V) employed can vary from 0.05 molar parts to 0.5 molar parts when compared with 2 to 4 molar parts of the photoacid generator employed. In some other embodiments the amount of the compound of formula (V) employed can be higher than 0.5 molar parts, such as for example, 1 molar parts when compared with 2 to 4 molar parts of the photoacid generator employed.

In some embodiments, the composition of this invention encompasses one or more compounds of formula (VI), which provide increased stability to the compositions, thereby increasing their shelf life stability at room temperature from one week to five weeks or longer. In some embodiments the shelf life stability can be increased up to four months by employing a compound of formula (VI) as an additive in the composition of this invention. The amount of the compound of formula (VI) employed can vary from 0.005 molar parts to 0.5 molar parts when compared with 2 to 4 molar parts of the photoacid generator employed. In some other embodiments the amount of the compound of formula (VI) employed can be higher than 0.5 molar parts, such as for example, 1 molar parts when compared with 2 to 4 molar parts of the photoacid generator employed.

In some other embodiments, the composition of this invention encompasses one or more compounds of formula (VII), which provide increased stability to the compositions, thereby increasing their shelf life stability at room temperature from seven days to eighty days or longer. In some embodiments the shelf life stability can be increased up to eight months by employing a compound of formula (VII) as an additive in the composition of this invention. The amount of the compound of formula (VII) employed can vary from 0.005 molar parts to 1 molar part when compared with 2 to 4 molar parts of the photoacid generator employed. In some other embodiments the amount of the compound of formula (VII) employed can be higher than 1 molar part, such as for example, 2 molar parts when compared with 2 to 4 molar parts of the photoacid generator employed. In some embodiments the additive employed is a mixture of a compound of formula (VII) and a compound of formula (VIII.)

In some embodiments a compound of formula (IX) is used as an additive in the composition of this invention. An exemplary compound of formula (IX) is:

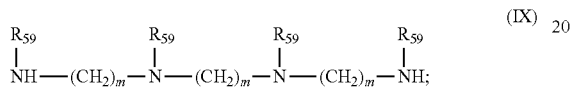

where m is 3, $R_{59}$ is a group of the formula:

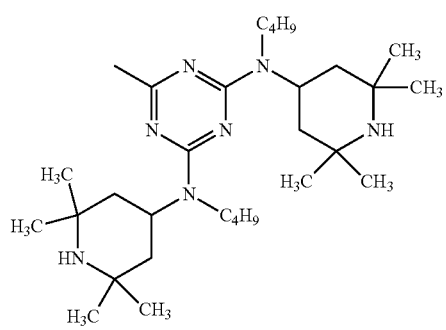

is available commercially under the tradename CHIMASSORB® 119 from BASF.

In some other embodiments, the composition of this invention encompasses one or more compounds of formula (X), which provide increased stability to the compositions, thereby increasing their shelf life stability at room temperature from seven days to eighty days or longer. The amount of the compound of formula (X) employed can vary from 0.005 molar parts to 1 molar part when compared with 2 to 4 molar parts of the photoacid generator employed. In some other embodiments the amount of the compound of formula (X) employed can be higher than 1 molar part, such as for example, 2 molar parts when compared with 2 to 4 molar parts of the photoacid generator employed.

Non-limiting examples of the compounds of formula (V) include the following:

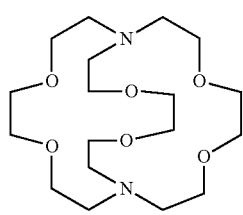 [SMILES: C1COCCN2CCOCCOCCN(CCO1)CCOCCOCC2]

4,7,13,16,21,24-hexaoxa-1,10-diazabicyclo[8.8.8]hexacosane (Cryptand 222);

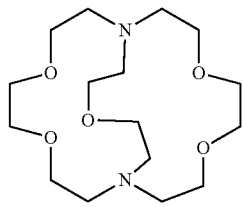 [SMILES: C1COCCN2CCOCCOCCN(CCO1)CCOCC2]

4,7,13,16,21-pentaoxa-1,10-diazabicyclo[8.8.5]tricosane (Cryptand 221); and

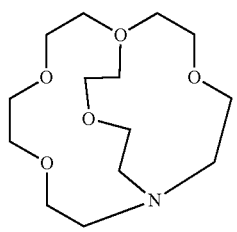

4,7,13,18-tetraoxa-1,10-diazabicyclo[8.5.5]icosane (Cryptand 211).

Non-limiting examples of the compounds of formula (VI) include the following:

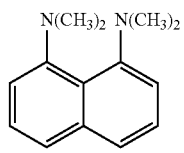 [SMILES: CN(C)c1cccc2cccc(N(C)C)c12]

1,8-bis(dimethylamino)naphthalene (Proton Sponge®); and

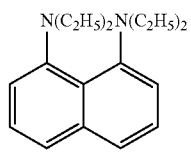

1,8-bis(diethylamino)naphthalene.

Non-limiting examples of the compounds of formula (VII) include the following:

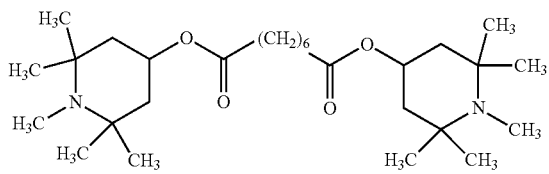

bis(1,2,2,6,6-pentamethylpiperidin-4-yl) octanedioate;

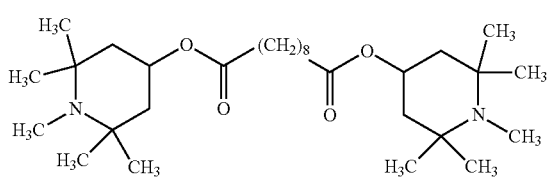

bis(1,2,2,6,6-pentamethylpiperidin-4-yl) sebacate (HALS-1);

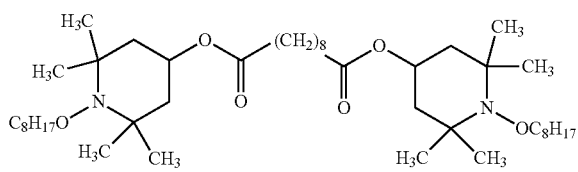

bis(2,2,6,6-tetramethyl-1-(octyloxy)piperidin-4-yl) sebacate (HALS-2); and

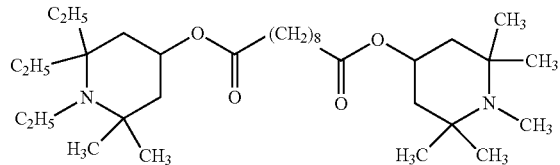

1-(1,2,2,6,6-pentamethylpiperidin-4-yl) 10-(1,2,2-triethyl-6,6-dimethylpiperidin-4-yl) decanedioate.

Non-limiting examples of the compounds of formula (VIII) include the following:

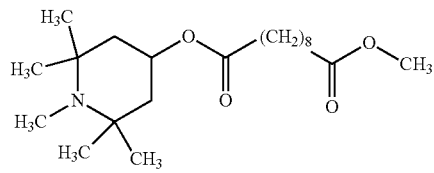

methyl (1,2,2,6,6-pentamethylpiperidin-4-yl) sebacate; and

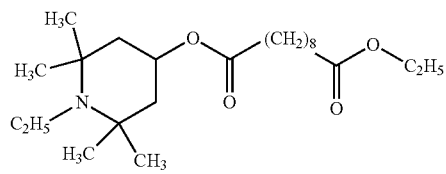

1-ethyl 10-(1-ethyl-2,2,6,6-tetramethylpiperidin-4-yl) decanedioate.

Non-limiting examples of the compounds of formula (IX) include the following:
2,6-di-tert-butylpyridine (DBP);
4-methyl-2,6-di-tert-butylpyridine;
4-dimethylaminopyridine (DMAP); and
3-bromopyridine (BP).

Advantageously, it has further been found that the composition according to this invention forms a substantially transparent film when exposed to a suitable actinic radiation (UV irradiation). That is to say that when the composition of this invention is exposed to certain actinic radiation, the monomers undergo mass polymerization to form films which are substantially transparent to visible light. That is, most of the visible light is transmitted through the film. In some embodiments such film formed from the composition of this invention exhibits a transmission of equal to or higher than 90 percent of the visible light. In some other embodiments such film formed from the composition of this invention exhibits a transmission of equal to or higher than 95 percent of the visible light. It should be further noted that any actinic radiation that is suitable to carry out this mass polymerization can be employed, such as for example, exposure to any actinic radiation in the wavelength of 200 nm to 400 nm. However, any radiation higher than 400 nm can also be employed. In some embodiments the wave length of the actinic radiation employed is 250 nm, 295 nm, 360 nm, 395 nm or higher than 400 nm.

In some other embodiments the composition of this invention undergoes mass polymerization when exposed to suitable actinic radiation and heat to form a substantially transparent film. In yet other embodiments the composition of this invention undergoes mass polymerization when exposed to suitable UV irradiation at a temperature from 50° C. to 100° C. to form a substantially transparent film.

Accordingly, exemplary compositions of this invention without any limitation may be enumerated as follows:
5-phenethyl bicyclo[2.2.1]hept-2-ene (PENB), Pd775, 4,4'-di-$C_{10}$-$C_{13}$-alkyl derivatives, tetrakis(2,3,4,5,6-pentafluorophenyl)borates (PAG1), and 2-isopropyl-9H-thioxanthen-9-one (ITX);
5-decylbicyclo[2.2.1]hept-2-ene (DecNB), Pd775, 4,4'-di-$C_{10}$-$C_{13}$-alkyl derivatives, tetrakis(2,3,4,5,6-pentafluorophenyl)borates (PAG1) and 2-isopropyl-9H-thioxanthen-9-one (ITX);
5-phenethyl bicyclo[2.2.1]hept-2-ene (PENB), Pd775, 4,4'-di-$C_{10}$-$C_{13}$-alkyl derivatives, tetrakis(2,3,4,5,6-pentafluorophenyl)borates (PAG1), 1,8-bis(dimethylamino)-naphthalene (Proton Sponge) and 2-isopropyl-9H-thioxanthen-9-one (ITX);
5-decylbicyclo[2.2.1]hept-2-ene (DecNB), Pd775, 4,4'-di-$C_{10}$-$C_{13}$-alkyl derivatives, tetrakis(2,3,4,5,6-pentafluorophenyl)borates (PAG1), 1,8-bis(dimethylamino)-naphthalene (Proton Sponge) and 2-isopropyl-9H-thioxanthen-9-one (ITX);
5-phenethyl bicyclo[2.2.1]hept-2-ene (PENB), Pd775, 4,4'-di-$C_{10}$-$C_{13}$-alkyl derivatives, tetrakis(2,3,4,5,6-pentafluorophenyl)borates (PAG1), 4,7,13,16,21,24-hexaoxa-1,10-diazabicyclo[8.8.8]hexacosane (Cryptand 222) and 2-isopropyl-9H-thioxanthen-9-one (ITX);
5-phenethyl bicyclo[2.2.1]hept-2-ene (PENB), Pd775, 4,4'-di-$C_{10}$-$C_{13}$-alkyl derivatives, tetrakis(2,3,4,5,6-pentafluorophenyl)borates (PAG1), 2,6-di-tert-butylpyridine (DBP) and 2-isopropyl-9H-thioxanthen-9-one (ITX);
5-phenethyl bicyclo[2.2.1]hept-2-ene (PENB), Pd775, 4,4'-di-$C_{10}$-$C_{13}$-alkyl derivatives, tetrakis(2,3,4,5,6-pentafluorophenyl)borates (PAG1), 4-dimethylaminopyridine (DMAP) and 2-isopropyl-9H-thioxanthen-9-one (ITX);
5-phenethyl bicyclo[2.2.1]hept-2-ene (PENB), Pd775, 4,4'-di-$C_{10}$-$C_{13}$-alkyl derivatives, tetrakis(2,3,4,5,6-pentafluorophenyl)borates (PAG1), 3-bromopyridine (BP) and 2-isopropyl-9H-thioxanthen-9-one (ITX);
5-phenethyl bicyclo[2.2.1]hept-2-ene (PENB), Pd775, 4,4'-di-$C_{10}$-$C_{13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);
5-phenylbicyclo[2.2.1]hept-2-ene (PhNB), 5-hexylbicyclo[2.2.1]hept-2-ene (HexNB), Pd775, 4,4'-di-$C_{10}$-$C_{13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);
5-decylbicyclo[2.2.1]hept-2-ene (DecNB), Pd775, 4,4'-di-$C_{10}$-$C_{13}$-alkyl derivatives, tetrakis(2,3,4,5,6-pentafluorophenyl)borates (PAG1), 2,6-di-tert-butylpyridine (DBP) and 2-isopropyl-9H-thioxanthen-9-one (ITX);

5-decylbicyclo[2.2.1]hept-2-ene (DecNB), Pd775, 4,4'-di-$C_{10}$-$C_{13}$-alkyl derivatives, tetrakis(2,3,4,5,6-pentafluorophenyl)borates (PAG1), bis(1,2,2,6,6-pentamethylpiperidin-4-yl) sebacate (HALS-1) and 2-isopropyl-9H-thioxanthen-9-one (ITX);

5-decylbicyclo[2.2.1]hept-2-ene (DecNB), Pd775, 4,4'-di-$C_{10}$-$C_{13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX); and 5-hexadecylbicyclo[2.2.1]hept-2-ene (HexadecylNB), 5-phenethyl bicyclo[2.2.1]hept-2-ene (PENB), Pd775, 4,4'-di-$C_{10}$-$C_{13}$-alkyl derivatives, tetrakis(2,3,4,5,6-pentafluorophenyl)borates (PAG1), bis(2,2,6,6-tetramethyl-1-(octyloxy)piperidin-4-yl) sebacate (HALS-2) and 2-isopropyl-9H-thioxanthen-9-one (ITX).

In a further aspect of this invention there is provided a kit for forming a substantially transparent film. There is dispensed in this kit a composition of this invention. Accordingly, in some embodiments there is provided a kit in which there is dispensed one or more olefinic monomers; an organopalladium compound of formula (I) as described herein; a photoacid generator of formulae (II) or (III) as described herein, and a photosensitizer of formulae (XIII) or (XIV). Further, the kit may optionally contain one or more compounds of formulae (V) to (X) as described herein as a stabilizer. In some embodiments the kit of this invention contains one or more monomers of formula (IV) optionally in combination with one or more monomers of formulae (XI) or (XII) so as to obtain a desirable result and/or for intended purpose.

In some embodiments, the aforementioned kit encompasses one or more monomers of formula (IV) and one or more monomers of formulae (XI) or (XII). In some other embodiments the kit of this invention encompasses at least two monomers wherein first monomer serves as a solvent for the second monomer. Any of the monomers of formulae (IV), (XI) or (XII) as described herein can be used in this embodiment. The molar ratio of such two monomers contained in these embodiments can vary and may range from 1:99 to 99:1, or 10:90 to 90:10, 20:80 to 80:20, 30:70 to 70:30, 60:40 to 40:60 or 50:50, and so on. In some other embodiments the kit may encompass a composition wherein dispensed two monomers which could be one monomer of formula (IV) and another monomer of formula (XI). Further, the monomer of formula (XI) is completely soluble in monomer of formula (IV) to form a clear solution at room temperature. In some embodiments the monomer mixture may become a clear solution at slightly elevated temperature, such as for example, 30° C. or 40° C. or 50° C., before they undergo mass polymerization.

In another aspect of this embodiment of this invention the kit of this invention undergoes mass polymerization only when exposed to suitable actinic radiation for a sufficient length of time to form a polymeric film. That is to say that the composition of this invention is poured onto a surface or onto a substrate which needs to be encapsulated and exposed to suitable radiation in order for the monomers to undergo polymerization to form a solid transparent polymer which could be in the form of a transparent film.

Generally, as already noted above, such polymerization can take place at various wavelengths of actinic radiation, such as for example, at 265 nm 315 nm 365 nm or 395 nm and so on. The mass polymerization may further be accelerated by heating, which can also be in stages, for example heating to 40° C. or 50° C. or 60° C. for 5 minutes each, and if necessary further heating to 70° C. for various lengths of time such as from 5 minutes to 15 minutes and so on. By practice of this invention it is now possible to obtain polymeric films on such substrates which are substantially transparent film. The "substantially transparent film" as used herein means that the films formed from the composition of this invention are optically clear in the visible light. Accordingly, in some embodiments of this invention such films are having at least 90 percent of visible light transmission, in some other embodiments the films formed from the composition of this invention exhibit at least 95 percent of visible light transmission.

In some embodiments of this invention the kit as described herein encompasses a composition which further contains one or more monomers selected from monomer of formula (XI) or monomer of formula (XII) as described hereinabove. Again, any of the monomers of formula (XI) or (XII) as described herein can be used in this embodiment, and in any desirable amounts depending on the nature of the intended use.

In some embodiments, the kit as described herein encompasses various exemplary compositions as described hereinabove.

In yet another aspect of this invention there is further provided a method of forming a substantially transparent film for the fabrication of a variety of optoelectronic device comprising:

forming a homogeneous clear composition comprising one or more monomers of formula (IV) optionally in combination with one or more monomers of formulae (XI) or (XII); an organopalladium compound of formula (I); a photoacid generator of formulae (II) or (III); a photosensitizer of formulae (XIII) or (XIV); and optionally one or more compounds selected from the group consisting of compounds of formulae (V) to (X);

coating a suitable substrate with the composition or pouring the composition onto a suitable substrate to form a film; and exposing the film to a suitable actinic radiation to cause polymerization of the monomers.

The coating of the desired substrate to form a film with the composition of this invention can be performed by any of the coating procedures as described herein and/or known to one skilled in the art, such as by spin coating. Other suitable coating methods include without any limitation spraying, doctor blading, meniscus coating, ink jet coating and slot coating. The mixture can also be poured onto a substrate to form a film. Suitable substrate includes any appropriate substrate as is, or may be used for electrical, electronic or optoelectronic devices, for example, a semiconductor substrate, a ceramic substrate, a glass substrate.

Next, the coated substrate is baked, i.e., heated to facilitate the mass polymerization, for example to a temperature from 50° C. to 100° C. for about 1 to 60 minutes, although other appropriate temperatures and times can be used. In some embodiments the substrate is baked at a temperature of from about 60° C. to about 90° C. for 2 minutes to 10 minutes. In some other embodiments the substrate is baked at a temperature of from about 60° C. to about 90° C. for 5 minutes to 20 minutes.

The films thus formed are then evaluated for their optical properties using any of the methods known in the art. For example, the refractive index of the film across the visible spectrum can be measured by ellipsometry. The optical quality of the film can be determined by visual observation. Quantitatively the percent transparency can be measured by visible spectroscopy. Generally, the films formed according to this invention exhibit excellent optical transparent properties and can be tailored to desirable refractive index as described herein.

Accordingly, in some of the embodiments of this invention there is also provided an optically transparent film obtained by the mass polymerization of the composition as described herein. In another embodiment there is also provided an optoelectronic device comprising the transparent film of this invention as described herein.

In yet some other embodiments the composition of this invention can also be used in a variety of photo induced nanoimprint lithography (NIL), such as for example, UV-NIL. For instance, the compositions of this invention can be used in a variety of photocurable imprint technology. Typically in such applications, the composition of this invention is suitably placed on a substrate (for example by coating or similar means), which is then covered by a suitable stamp and exposed to radiation so as to allow the composition of this invention to cure to a solid. The stamp is then released to obtain the nano-imprinted film. Such substrates can include for example a master digital video disk (DVD).

Surprisingly, in this aspect of the invention it has now been found that by judicious selection of monomers of formulae (IV) optionally in combination with one or more monomers of formulae (XI) or (XII), organopalladium compounds of formula (I), photoacid generators as described herein, the photosensitizers as described herein and optionally one or more compounds of formulae (V) to (X) it is now possible to form compositions in accordance with this aspect of the invention which feature unique properties. Accordingly, in some embodiments of this aspect of the invention the compositions thus formed exhibit longer storage stabilities, which can extend up to four months or longer at ambient temperatures or temperatures up to 60° C. The compositions of this aspect of the invention are more readily ink jettable as well as spreadable on suitable substrates using any of the known procedures including ink jetting, among other coating methods.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:
PENB—5-phenethyl bicyclo[2.2.1]hept-2-ene; DecNB-5-decylbicyclo[2.2.1]hept-2-ene;
Pd775—an example of organopalladium compound as described herein; Pd879—an example of organopalladium compound as described herein; Pd680—palladium (hexafluoroacetylacetonate)$_2$ tri-isopropylphosphine; PAG1-4,4'-di-$C_{10}$-$C_{13}$-alkyl derivatives, tetrakis(2,3,4,5,6-pentafluorophenyl)borates; ITX—4-isopropylthioxanthone; HALS-2—bis(2,2,6,6-tetramethyl-1-(octyloxy)piperidin-4-yl) sebacate; cP—centipoise; DSC—differential scanning calorimetry; TGA—thermogravimetric analysis.

Various monomers as used herein are either commercially available or can be readily prepared following the procedures as described in U.S. Pat. No. 9,944,818.

Various organopalladium compounds of formula (I) can be readily prepared following the procedures as described in Example A. Example B provides an example for preparing similar compounds of formula (I) which do not provide same benefit as compounds of formula (I).

Example A

Synthesis of Pd775

To a solution of palladium hexafluoroacetylacetone (0.5 g, 0.96 mmol) in toluene (5 mL) was added a solution of di-cyclohexyl-t-butyl phosphine (0.24 g, 0.96 mmol) in toluene (2 mL) at −70° C. The mixture was stirred for 15 mins. Then the mixture was warmed up to ambient temperature and stirred for 2 hrs. The mixture was concentrated, and the residue was washed with cold pentane to obtain red solid. Yield 0.54 g. $^1$H NMR (CDCl$_3$, 500 MHz): δ 1.28 (m, 8H), 1.48 (d, 9H), 1.75 (m, 10H), 2.23 (m, 4H), 5.96 (s, 2H), $^{19}$F NMR (CDCl$_3$, 470 MHz): −74.97, $^{31}$P NMR (CDCl$_3$, 202 MHz): δ 55.32.

Example B

Synthesis of Pd879

The procedure of Example A was substantially followed except for using di-adamantyl-n-butyl phosphine (0.34 g, 0.961 mmol). Yield 0.57 g. $^1$H NMR (CDCl$_3$, 500 MHz): δ 0.91 (t, 3H), 1.27 (m, 2H) 1.31 (m, 2H), 1.73 (m, 14H), 1.97 (s, 6H), 2.30 (s, 12H), 5.96 (s, 2H), $^{19}$F NMR (CDCl$_3$, 470 MHz): −74.97 (m), $^{31}$P NMR (CDCl$_3$, 202 MHz): δ 50.88.

The following Examples 1-4 demonstrate that the composition of this invention is quite stable at room temperature to 40° C. for at least up to ninety (90) days and yet can very readily be mass polymerized when exposed to UV radiation at suitable temperature conditions.

Example 1

Shelf Life Stability and Mass Polymerization of Compositions of the Invention

In a glass bottle, Pd775 (1 molar part) was mixed with PAG1 (4 molar parts) and ITX (2 molar parts), and then dissolved in PENB (5000 molar parts) to form a clear solution. The solution was then UV light exposed for 4 sec (395 nm, 1 J/cm$^2$) at room temperature. The solution turned into a solid in a few minutes indicating the monomer was polymerized, as also confirmed by DSC and TGA. From the TGA test, the residue percentage of solids from isothermal TGA (1 h at 100° C.) after UV exposure was >97%. Td$_5$ was determined by dynamic TGA (20° C./min), 324° C. (the temperature at which the five weight percent mass loss of the polymer). The UV-DSC studies showed that the composition exhibited an exothermic peak after UV exposure for 4 secs., which continued to release heat after the UV exposure. In five minutes reaction time, the enthalpy change was measured to be 348 J/g.

A portion of the composition was stored at room temperature and another portion was stored at 40° C. Both portions of the composition remained liquid with minimal variation in the viscosity and exhibited similar exotherm even after ninety days (90 days) of storage either at room temperature or at 40° C.

Example 2

In a glass bottle, Pd775 (1 molar part), PAG1 (4 molar parts) and ITX (1 molar part) were dissolved in DecNB (5000 molar parts) to form a clear solution. The solution was then UV light exposed for 4 sec (2 J/cm$^2$, 395 nm) at room temperature. The solution turned to a solid in 5 minutes indicating the monomer was polymerized as further confirmed by TGA and UV-DSC. The residue percentage of solids from isothermal TGA (1 h at 100° C.) after UV exposure was ~98%. The UV-DSC (2 J/cm$^2$, 400 nm, 30° C.) studies showed that the composition exhibited an exothermic peak after UV exposure for 4 secs, 328 J/g. Portions of the unexposed composition were then stored at room temperature and at 40° C. and the viscosity was monitored overtime. After fifty days (50 days) of storage at either room temperature or at 40° C., the composition remained as free-flowing liquid.

Examples 3-4

Mass Polymerization of DecNB Using Pd775 or Pd879 at 70° C.

In a glass bottle, Pd775 or Pd879 (1 molar part), PAG1 (4 molar parts) and ITX (1 molar part) were dissolved in DecNB (5000 molar parts) to form a clear solution. Each of the compositions were preheated to 70° C. for 2 mins and then UV light exposed for 4 sec (2 J/cm$^2$, 395 nm). Each of the compositions turned to hard solid in a minute indicating the monomer was polymerized, as further confirmed by TGA (isothermal 1 h at 100° C.) and UV-DSC (2 J/cm$^2$, 400 nm, 70° C.). The results are summarized in Table 1.

TABLE 1

| Example No. | Catalyst | Enthalpy Change in 5 minutes (J/g) | Residue (TGA, 1 h, 100° C.) |
|---|---|---|---|
| Example 3 | Pd775 | 377 | 99% |
| Example 4 | Pd879 | 369 | 99% |

Comparative Examples 1-2

Mass Polymerization of PENB or DecNB with Pd680

In separate glass bottles, Pd680 (1 molar part) was mixed with PAG1 (4 molar parts), ITX (either 1 molar parts for DecNB or 2 molar parts for PENB) and dissolved in PENB or DecNB (5000 molar parts) to form a clear solution. The solutions were then UV light exposed for 4 sec (395 nm, 1 or 2 J/cm$^2$) at room temperature. Both solutions turned into a solid in a few minutes (<5 minutes) indicating the monomers were polymerized, as also confirmed by DSC and TGA. From the TGA test, the residue percentage of solids from isothermal TGA (1 h at 100° C.) after UV exposure for all compositions were >96%. The UV-DSC studies showed that all of the compositions exhibited an exothermic peak after UV exposure for 4 secs., which continued to release heat after the UV exposure. In five minutes reaction time, the enthalpy change was measured to compare the reactivity of each of the compositions. The measured TGA and enthalpic data are summarized in Table 1. The compositions in each of these Comparative Examples 1 to 2 were stored at room temperature and at 40° C. and the gelling time was recorded to compare the pot life. The results are summarized in Table 2. It is evident from the data presented in Table 2, the compounds as described in the prior art, such as for example, Pd680 does not provide longer shelf life as it undergoes polymerization when stored even at room temperature as in Comparative Example 2, where the composition gelled after forty-five days when stored at room temperature and within eighteen days when stored at 40° C. In the case of Comparative Example 1, the composition appeared to be stable at room temperature even after sixty-five days but gelled within forty-three days when stored at 40° C. Thus, the compositions of this invention are much superior to those reported in the literature.

TABLE 2

| Example No. | Catalyst | Monomer | UV dose (J/cm$^2$) | Td$_5$ (° C.) | Isothermal TGA (% Residue) | Exotherm (J/g) | Shelf Life at RT | Shelf Life at 40° C. |
|---|---|---|---|---|---|---|---|---|
| Comp. Ex. 1 | Pd680 | PENB | 1 | 377 | 98 | 307 | >65 days | 43 days |
| Comp. Ex. 2 | Pd680 | DecNB | 2 | n.m. | 99 | 395 | 45 days | 18 days | n.m.—not measured

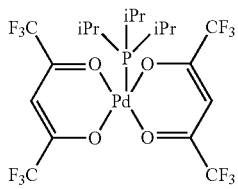

Pd680, where iPr is iso-propyl.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A composition comprising:
   a) one or more olefinic monomers;
   b) an organopalladium compound of formula (I):

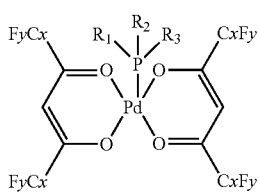

(I)

wherein:
x is from 1 to 6, inclusive;
y is 2x+1;
wherein at least one of $R_1$, $R_2$ and $R_3$ is a tertiary alkyl group selected from the group consisting of tertiary branched ($C_4$-$C_8$)alkyl, ($C_1$-$C_4$)alkyl($C_5$-$C_7$)cycloalkyl and ($C_5$-$C_{12}$)tricycloalkyl; and
the remaining $R_1$, $R_2$ and $R_3$ are the same or different and each independently selected from the group consisting of secondary branched ($C_3$-$C_8$)alkyl and ($C_5$-$C_7$)cycloalkyl; or
wherein two of $R_1$, $R_2$ and $R_3$ are the same or different and each a tertiary alkyl group independently selected from the group consisting of tertiary branched ($C_4$-$C_8$)alkyl, ($C_1$-$C_4$)alkyl($C_5$-$C_7$)cycloalkyl and ($C_8$-$C_{12}$)tricycloalkyl; and
the remaining $R_1$, $R_2$ and $R_3$ is selected from the group consisting of methyl, ethyl, linear or branched ($C_3$-$C_8$) alkyl and ($C_5$-$C_7$)cycloalkyl;
c) a photoacid generator selected from the group consisting of:
   a compound of formula (II):

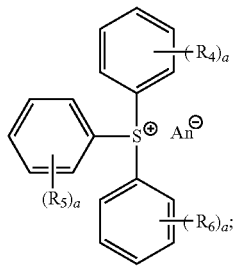

(II)

and a compound of formula (III):

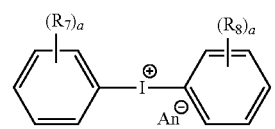

(III)

wherein:
a is an integer from 0 to 5;
An $\ominus$ is selected from the group consisting of Cl$\ominus$, Br$\ominus$, I$\ominus$, BF$_4\ominus$, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl]borate, and tetrakis[3-[2,2,2-trifluoro-1-(2,2,2-trifluoroethoxy)-1-(trifluoromethyl)-ethyl]-5-(trifluoromethyl)phenyl]borate, PF$_6\ominus$, SbF$_6\ominus$, n-C$_4$F$_9$SO$_3$$\ominus$, CF$_3$SO$_3$$\ominus$ and p-CH$_3$(C$_6$H$_4$)—SO$_3$$\ominus$;
$R_4$, $R_5$, $R_6$, $R_7$ and $R_8$ are the same or different and each independently selected from the group consisting of halogen, methyl, ethyl, linear or branched ($C_3$-$C_{20}$) alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$) bicycloalkoxy, ($C_7$-$C_{14}$)tricycloalkoxy, ($C_6$-$C_{10}$) aryloxy($C_1$-$C_3$)alkyl, ($C_6$-$C_{10}$)-aryloxy, ($C_6$-$C_{10}$) thioaryl, ($C_1$-$C_6$)alkanoyl($C_6$-$C_{10}$)thioaryl, ($C_1$-$C_6$) alkoxy($C_6$-$C_{10}$)aroyl($C_1$-$C_6$)alkyl and ($C_6$-$C_{10}$) thioaryl-($C_6$-$C_{10}$)diarylsulfonium salt; and
d) a photosensitizer.

2. The composition according to claim 1, wherein said one or more olefinic monomer is of formula (IV):

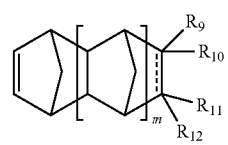

(IV)

wherein:
m is an integer 0, 1 or 2;
═════ is a single bond or a double bond;
$R_9$, $R_{10}$, $R_{11}$ and $R_{12}$ are the same or different and each independently selected from the group consisting of hydrogen, halogen, a hydrocarbyl or halohydrocarbyl group selected from methyl, ethyl, linear or branched ($C_3$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-

$C_{10}$)aryl, perfluoro($C_6$-$C_{10}$)aryl($C_1$-$C_6$)alkyl, methoxy, ethoxy, linear or branched ($C_3$-$C_{16}$)alkoxy, epoxy($C_1$-$C_{10}$)alkyl, epoxy($C_1$-$C_{10}$)alkyloxy($C_1$-$C_{10}$)alkyl, epoxy($C_3$-$C_{10}$)cycloalkyl, perfluoro($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy, ($C_6$-$C_{10}$)aryl($C_1$-$C_6$)alkoxy, perfluoro($C_6$-$C_{10}$)aryloxy, perfluoro($C_6$-$C_{10}$)aryl($C_1$-$C_3$)alkoxy, a group of formula (A):

—Z-Aryl  (A);

a group of formula (A1):

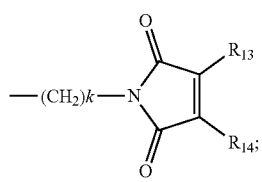

(A1)

a group of formula (A2):

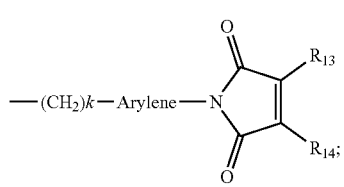

(A2)

a group of formula (A3):

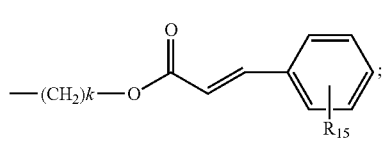

(A3)

and a group of formula (A4):

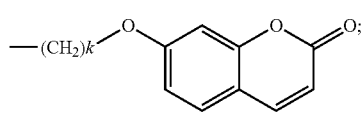

(A4)

wherein:

Z is selected from the group consisting of:
O, CO, C(O)O, OC(O), OC(O)O, S, $(CR_{17}R_{18})_b$, $O(CR_{17}R_{18})_b$, $(CR_{17}R_{18})_bO$, $C(O)(CR_{17}R_{18})_b$, $(CR_{17}R_{18})_bC(O)$, $C(O)O(CR_{17}R_{18})_b$, $(CR_{17}R_{18})_bC(O)O$, $OC(O)(CR_{17}R_{18})_b$, $(CR_{17}R_{18})_bOC(O)$, $(CR_{17}R_{18})_bOC(O)O$, $(CR_{17}R_{18})_bOC(O)O(CR_{17}R_{18})_b$, $OC(O)O(CR_{17}R_{18})_b$, $S(CR_{17}R_{18})_b$, $(CR_{17}R_{18})_bS$, $(SiR_{17}R_{18})_b$, $O(SiR_{17}R_{18})_b$, $(SiR_{17}R_{18})_bO$, where $R_{17}$ and $R_{18}$ are the same or different and each independently selected from hydrogen, methyl, ethyl, linear or branched ($C_3$-$C_{12}$)alkyl, substituted or unsubstituted ($C_6$-$C_{14}$)aryl, methoxy, ethoxy, linear or branched ($C_3$-$C_6$)alkyloxy, ($C_2$-$C_6$)acyl, ($C_2$-$C_6$)acyloxy, and substituted or unsubstituted ($C_6$-$C_{14}$)aryloxy; and b is an integer from 0 to 12, inclusive;

Aryl is selected from the group consisting of substituted or unsubstituted phenyl, substituted or unsubstituted biphenyl, substituted or unsubstituted naphthyl, substituted or unsubstituted terphenyl, substituted or unsubstituted anthracenyl, and substituted or unsubstituted fluorenyl, wherein said substituents are selected from the group consisting of halogen, methyl, ethyl, linear or branched ($C_3$-$C_6$)alkyl, perfluoro($C_1$-$C_{12}$)alkyl, ($C_3$-$C_{12}$)cycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_6$)alkyl, methoxy, ethoxy, linear or branched ($C_3$-$C_{16}$)alkoxy, perfluoro($C_1$-$C_{12}$)alkoxy, ($C_3$-$C_{12}$)cycloalkoxy, ($C_6$-$C_{10}$)aryloxy, ($C_6$-$C_{10}$)aryl($C_1$-$C_6$)alkoxy, perfluoro($C_6$-$C_{10}$)aryloxy and perfluoro($C_6$-$C_{10}$)aryl($C_1$-$C_3$)alkoxy;

k is an integer from 1 to 12;

$R_{13}$, $R_{14}$ and $R_{15}$ are the same or different and each independently selected from the group consisting of hydrogen, methyl, ethyl, linear or branched ($C_3$-$C_{12}$)alkyl, perfluoro($C_1$-$C_{12}$)alkyl, methoxy, ethoxy, linear or branched ($C_3$-$C_{12}$)alkoxy, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl and perfluoro($C_6$-$C_{10}$)aryl($C_1$-$C_6$)alkyl; or $R_{13}$ and $R_{14}$ taken together with the intervening carbon atoms to which they are attached to form a substituted or unsubstituted ($C_5$-$C_{14}$)cyclic, ($C_5$-$C_{14}$)bicyclic or ($C_5$-$C_{14}$)tricyclic ring; and Arylene is substituted or unsubstituted bivalent ($C_6$-$C_{14}$)aryl;

or one of $R_9$ and $R_{10}$ taken together with one of $R_{11}$ and $R_{12}$ and the carbon atoms to which they are attached to form a substituted or unsubstituted ($C_5$-$C_{14}$)cyclic, ($C_5$-$C_{14}$)bicyclic or ($C_5$-$C_{14}$)tricyclic ring.

3. The composition according to claim 2, wherein said composition contains two distinctive monomers of formula (IV) in a molar ratio of from 1:99 to 99:1 and is in a clear liquid state having a viscosity below 100 centipoise.

4. The composition according to claim 1, wherein said composition forms a substantially transparent film when exposed to suitable actinic radiation, and wherein said film has a transmission of equal to or higher than 90 percent of visible light.

5. The composition according to claim 1, wherein said organopalladium compound of formula (I) is selected from the group consisting of:

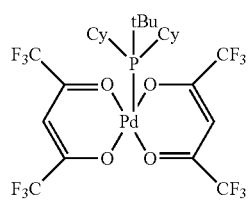

Pd775, where cy is cyclohexyl and tBu is tert-butyl;

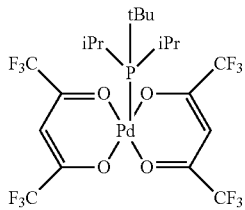

Pd694, where iPr is iso-propyl and tBu is tert-butyl;

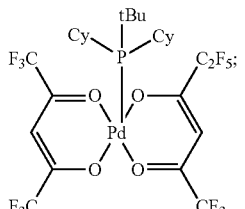
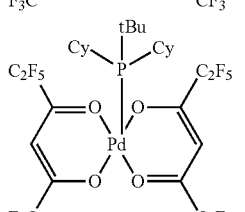
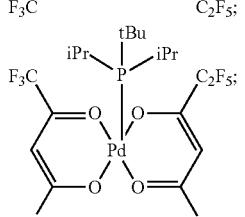

Pd879, where Ad is adamantyl, nBu is n-butyl.

6. The composition according to claim 1, which further comprises a compound selected from the group consisting of:

a compound of formula (V):

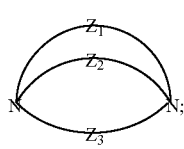
(V)

where $Z_1$, $Z_2$ and $Z_3$ are the same or different and each independently is $((CH_2)_gO)_h(CH_2)_g$ where g and h are integers from 2 to 4;

a compound of formula (VI):

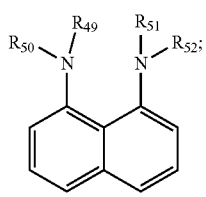
(VI)

where $R_{49}$, $R_{50}$, $R_{51}$ and $R_{52}$ are the same or different and each independently selected from the group consisting of hydrogen, methyl, ethyl and linear or branched $(C_3\text{-}C_{20})$alkyl; and a compound of formula (VII):

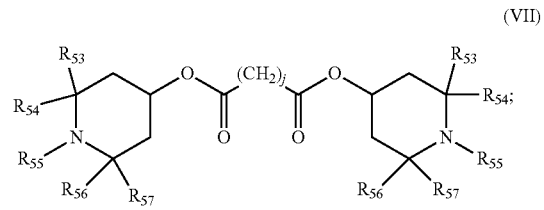
(VII)

a compound of formula (VIII):

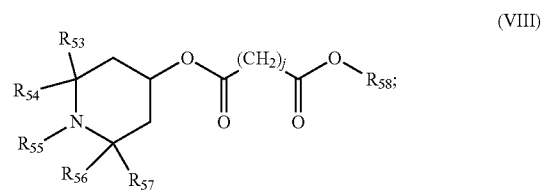
(VIII)

where j is an integer from 6 to 16;

$R_{53}$, $R_{54}$, $R_{56}$, $R_{57}$ and $R_{58}$ are the same or different and each independently selected from the group consisting of hydrogen, methyl, ethyl and linear or branched $(C_3\text{-}C_{20})$alkyl;

$R_{55}$ is selected from the group consisting of methyl, ethyl, linear or branched $(C_3\text{-}C_{20})$alkyl, methoxy, ethoxy and linear or branched $(C_3\text{-}C_{20})$alkoxy; and a compound of formula (IX):

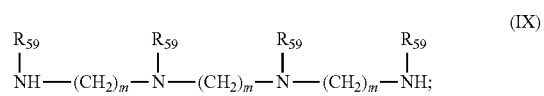
(IX)

where each m is the same or different and is an integer from 2 to 6;

$R_{59}$ is a group of formula:

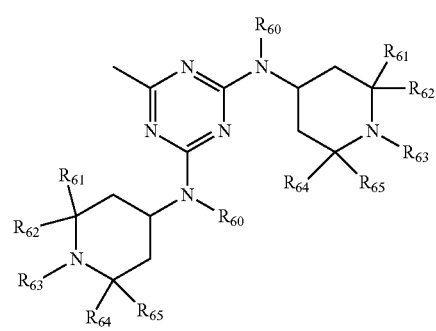

$R_{60}$, $R_{61}$, $R_{62}$, $R_{63}$, $R_{64}$ and $R_{65}$ are the same or different and each independently selected from the group consisting of hydrogen, methyl, ethyl and linear or branched $(C_3\text{-}C_{20})$alkyl; and a compound of formula (X):

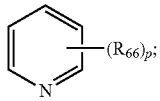

where p is an integer from 1 to 5;

each $R_{66}$ are the same or different and each independently selected from the group consisting of halogen, methyl, ethyl, and linear or branched $(C_3-C_{20})$alkyl and $NR_{67}R_{68}$, where each $R_{67}$ and $R_{68}$ are the same or different and each independently selected from the group consisting of methyl, ethyl and linear or branched $(C_3-C_{20})$alkyl.

7. The composition according to claim 1, wherein the compound of formula (V) or the compound of formula (VI) or the compound of formula (VII) or the compound of formula (VIII) or the compound of formula (IX) is selected from the group consisting of:

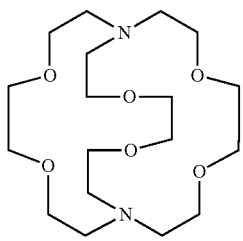 [SMILES: C1COCCN2CCOCCCOCCN(CCOC1)CCOCCOCC2]

4,7,13,16,21,24-hexaoxa-1,10-diazabicyclo[8.8.8]hexacosane (Cryptand 222);

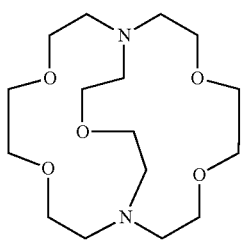 [SMILES: C1COCCN2CCOCCCOCCN(CCOC1)CCOCC2]

4,7,13,16,21-pentaoxa-1,10-diazabicyclo[8.8.5]tricosane (Cryptand 221);

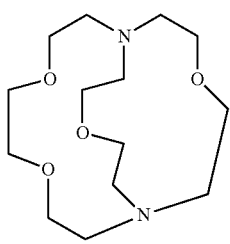 [SMILES: C1COCCN2CCOCCN(CCOC1)CCOCC2]

4,7,13,18-tetraoxa-1,10-diazabicyclo[8.5.5]icosane (Cryptand 211);

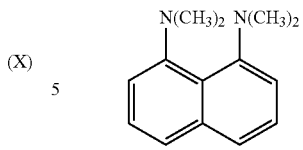

1,8-bis(dimethylamino)naphthalene;

1,8-bis(diethylamino)naphthalene;

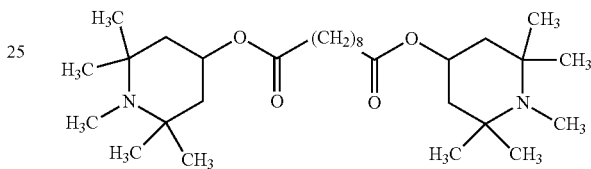

bis(1,2,2,6,6-pentamethylpiperidin-4-yl) sebacate (HALS-1);

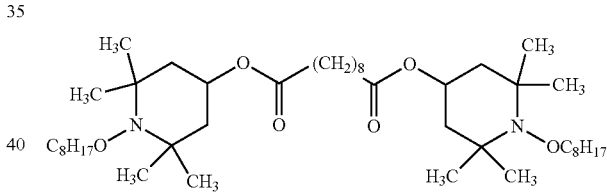

bis(2,2,6,6-tetramethyl-1-(octyloxy)piperidin-4-yl) sebacate (HALS-2);

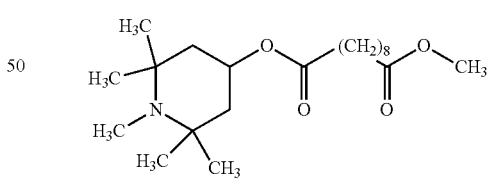

methyl (1,2,2,6,6-pentamethylpiperidin-4-yl) sebacate;

2,6-di-tert-butylpyridine (DBP);

4-methyl-2,6-di-tert-butylpyridine;

4-dimethylaminopyridine (DMAP); and 3-bromopyridine (BP).

8. The composition according to claim 2 further comprising one or more monomers selected from a monomer of formula (XI) or a monomer of formula (XII), wherein said monomer of formula (XI) is:

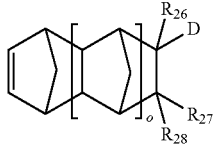
(XI)

wherein:
o is an integer from 0 to 2, inclusive;
D is SiR$_{29}$R$_{30}$R$_{31}$ or a group selected from:

—(CH$_2$)$_c$—O—SiR$_{29}$R$_{30}$R$_{31}$ (E);

—(CH$_2$)$_c$—SiR$_{29}$R$_{30}$R$_{31}$ (F); and

—(SiR$_{29}$R$_{30}$)$_c$—O—SiR$_{29}$R$_{30}$R$_{31}$ (G); wherein c is an integer from 1 to 10, inclusive, and where one or more of CH$_2$ is optionally substituted with (C$_1$-C$_{10}$)alkyl or (C$_1$-C$_{10}$)perfluoroalkyl;

R$_{26}$, R$_{27}$ and R$_{28}$ are the same or different and independently selected from hydrogen, halogen and hydrocarbyl, where hydrocarbyl is selected from methyl, ethyl, linear or branched (C$_3$-C$_{12}$)alkyl, (C$_3$-C$_{12}$)cycloalkyl, (C$_6$-C$_{12}$)bicycloalkyl, (C$_7$-C$_{14}$)tricycloalkyl, (C$_6$-C$_{10}$)aryl, (C$_6$-C$_{10}$)aryl(C$_1$-C$_3$)alkyl, (C$_1$-C$_{12}$)alkoxy, (C$_3$-C$_{12}$)cycloalkoxy, (C$_6$-C$_{12}$)bicycloalkoxy, (C$_7$-C$_{14}$)tricycloalkoxy, (C$_6$-C$_{10}$)aryloxy(C$_1$-C$_3$)alkyl or (C$_6$-C$_{10}$)aryloxy; and R$_{29}$, R$_{30}$ and R$_{31}$ are the same or different and each independently selected from methyl, ethyl, linear or branched (C$_3$-C$_9$)alkyl, substituted or unsubstituted (C$_6$-C$_{14}$)aryl, methoxy, ethoxy, linear or branched (C$_3$-C$_9$)alkoxy or substituted or unsubstituted (C$_6$-C$_{14}$)aryloxy;

said monomer of formula (XII) is:

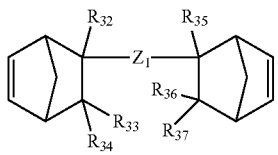
(XII)

wherein:
Z$_1$ is selected from the group consisting of substituted or unsubstituted (C$_1$-C$_{12}$)alkylene, —(CH$_2$)$_d$O(CH$_2$)$_e$—, —(CH$_2$)$_d$(SiR$_{38}$R$_{39}$)(OSiR$_{40}$R$_{41}$)$_f$(CH$_2$)$_e$—where d, e and f are independently integers from 0 to 6, inclusive, R$_{38}$, R$_{39}$, R$_{40}$ and R$_{41}$ are the same or different and independently selected from methyl, ethyl, linear or branched (C$_3$-C$_{12}$)alkyl, or an arylene selected from the following:

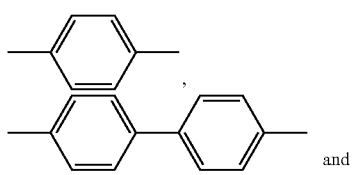
and

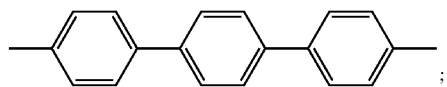
;

R$_{32}$, R$_{33}$, R$_{34}$, R$_{35}$, R$_{36}$ and R$_{37}$ are the same or different and independently selected from hydrogen, halogen or hydrocarbyl, where hydrocarbyl is selected from methyl, ethyl, linear or branched (C$_3$-C$_{12}$)alkyl, (C$_3$-C$_{12}$)cycloalkyl, (C$_6$-C$_{12}$)bicycloalkyl, (C$_7$-C$_{14}$)tricycloalkyl, (C$_6$-C$_{10}$)aryl, (C$_6$-C$_{10}$)aryl(C$_1$-C$_3$)alkyl, (C$_1$-C$_{12}$)alkoxy, (C$_3$-C$_{12}$)cycloalkoxy, (C$_6$-C$_{12}$)bicycloalkoxy, (C$_7$-C$_{14}$)tricycloalkoxy, (C$_6$-C$_{10}$)aryloxy(C$_1$-C$_3$)alkyl or (C$_6$-C$_{10}$)-aryloxy.

9. The composition according to claim 2, wherein the monomer of formula (IV) is selected from the group consisting of:

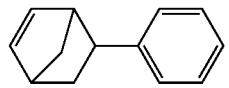

5-phenylbicyclo[2.2.1]hept-2-ene (PhNB);

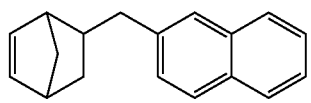

2-(bicyclo[2.2.1]hept-5-en-2-ylmethyl)naphthalene;

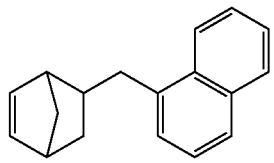 [SMILES: C1=CC2CC1CC2Cc1cccc2ccccc12]

1-(bicyclo[2.2.1]hept-5-en-2-ylmethyl)naphthalene;

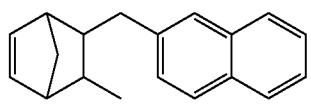 [SMILES: CC1C2C=CC(C2)C1Cc1ccc2ccccc2c1]

2-((3-methylbicyclo[2.2.1]hept-5-en-2-yl)methyl)naphthalene;

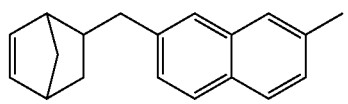 [SMILES: Cc1ccc2ccc(CC3CC4C=CC3C4)cc2c1]

2-(bicyclo[2.2.1]hept-5-en-2-ylmethyl)-7-methylnaphthalene;

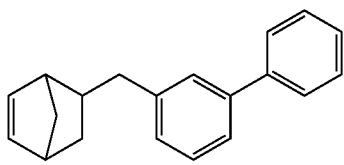 [SMILES: C1=CC2CC1CC2Cc1cccc(-c2ccccc2)c1]

5-([1,1'-biphenyl]-3-ylmethyl)bicyclo[2.2.1]hept-2-ene;

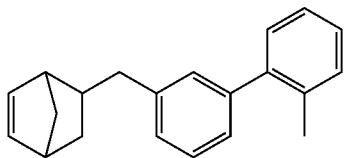 [SMILES: Cc1ccccc1-c1cccc(CC2CC3C=CC2C3)c1]

5-((2'-methyl-[1,1'-biphenyl]-3-yl)methyl)bicyclo[2.2.1]hept-2-ene;

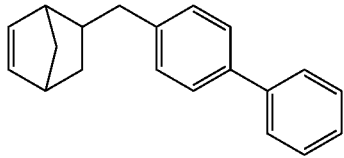 [SMILES: C1=CC2CC1CC2Cc1ccc(-c2ccccc2)cc1]

5-([1,1'-biphenyl]-4-ylmethyl)bicyclo[2.2.1]hept-2-ene;

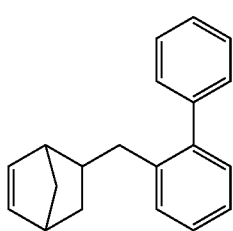 [SMILES: C1=CC2CC1CC2Cc1ccccc1-c1ccccc1]

5-([1,1'-biphenyl]-2-ylmethyl)bicyclo[2.2.1]hept-2-ene;

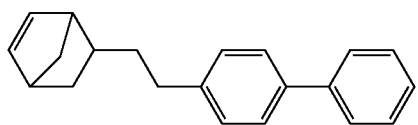 [SMILES: C1=CC2CC1CC2CCc1ccc(-c2ccccc2)cc1]

5-(2-([1,1'-biphenyl]-4-yl)ethyl)bicyclo[2.2.1]hept-2-ene (NBEtPhPh);

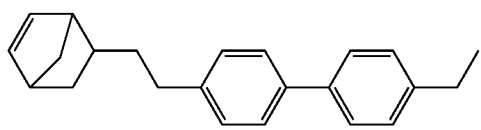 [SMILES: CCc1ccc(-c2ccc(CCC3CC4C=CC3C4)cc2)cc1]

5-(2-(4'-ethyl-[1,1'-biphenyl]-4-yl)ethyl)bicyclo[2.2.1]hept-2-ene;

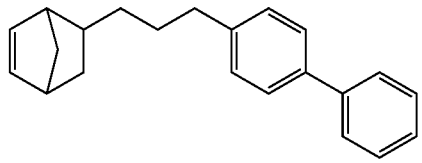 [SMILES: C1=CC2CC1CC2CCCc1ccc(-c2ccccc2)cc1]

5-(3-([1,1'-biphenyl]-4-yl)propyl)bicyclo[2.2.1]hept-2-ene;

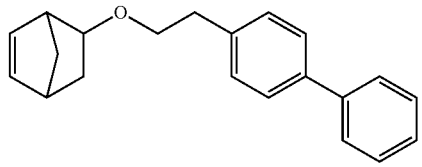 [SMILES: C1=CC2CC1CC2OCCc1ccc(-c2ccccc2)cc1]

5-(2-([1,1'-biphenyl]-4-yl)ethoxy)bicyclo[2.2.1]hept-2-ene;

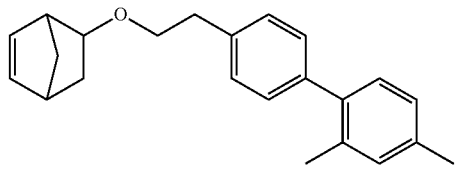 [SMILES: Cc1ccc(-c2ccc(CCOC3CC4C=CC3C4)cc2)c(C)c1]

5-(2-(2',4'-dimethyl-[1,1'-biphenyl]-4-yl)ethoxy)bicyclo[2.2.1]hept-2-ene;

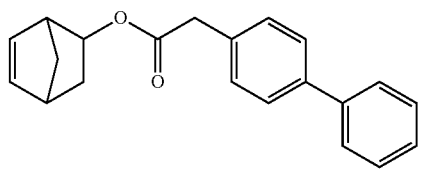 [SMILES: O=C(Cc1ccc(-c2ccccc2)cc1)OC1CC2C=CC1C2]

bicyclo[2.2.1]hept-5-en-2-yl 2-([1,1'-biphenyl]-4-yl)acetate;

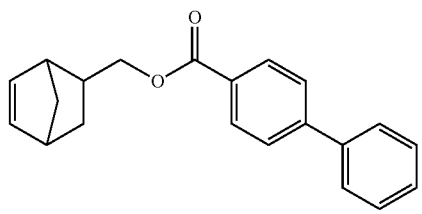 [SMILES: O=C(OCC1CC2C=CC1C2)c1ccc(-c2ccccc2)cc1]

bicyclo[2.2.1]hept-5-en-2-ylmethyl[1,1'-biphenyl]-4-carboxylate;

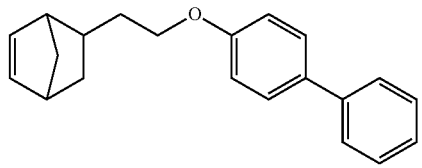 [SMILES: C1=CC2CC1CC2CCOc1ccc(-c2ccccc2)cc1]

5-(2-([1,1'-biphenyl]-4-yloxy)ethyl)bicyclo[2.2.1]hept-2-ene;

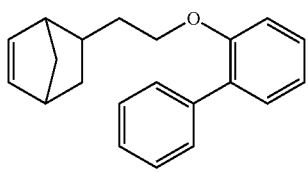 [SMILES: C1=CC2CC1CC2CCOc1ccccc1-c1ccccc1]

5-(2-([1,1'-biphenyl]-2-yloxy)ethyl)bicyclo[2.2.1]hept-2-ene (NBEtOPhPh);

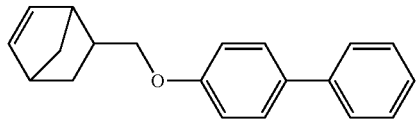

5-(2-([1,1'-biphenyl]-4-yloxy)methyl)bicyclo[2.2.1]hept-2-ene;

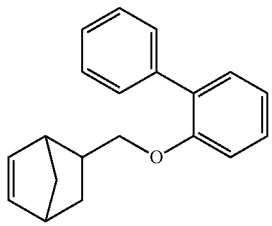 [SMILES: C1=CC2CC1CC2COc1ccccc1-c1ccccc1]

5-(2-([1,1'-biphenyl]-2-yloxy)methyl)bicyclo[2.2.1]hept-2-ene (NBMeOPhPh);

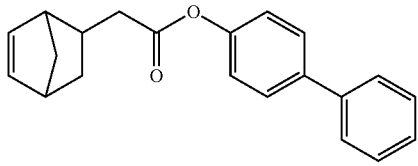 [SMILES: O=C(CC1CC2C=CC1C2)Oc1ccc(-c2ccccc2)cc1]

[1,1'-biphenyl]-4-yl 2-(bicyclo[2.2.1]hept-5-en-2-yl)acetate;

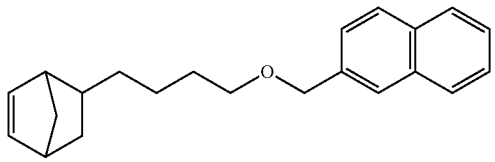 [SMILES: C1=CC2CC1CC2CCCCOCc1ccc2ccccc2c1]

2-((4-(bicyclo[2.2.1]hept-5-en-2-yl)butoxy)methyl)naphthalene;

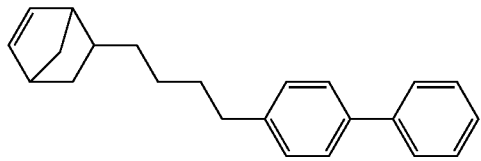 [SMILES: C1=CC2CC1CC2CCCCc1ccc(-c2ccccc2)cc1]

5-(4-([1,1'-biphenyl]-4-yl)butyl)bicyclo[2.2.1]hept-2-ene;

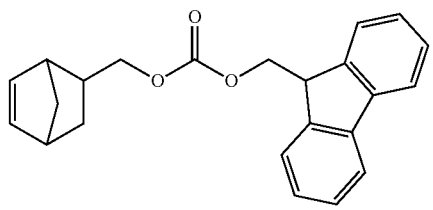 [SMILES: O=C(OCC1c2ccccc2-c2ccccc21)OCC1CC2C=CC1C2]

(9H-fluoren-9-yl)methyl (bicyclo[2.2.1]hept-5-en-2-ylmethyl) carbonate;

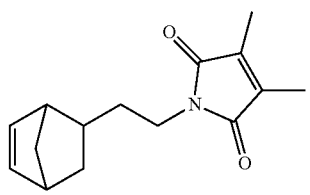 [SMILES: CC1=C(C)C(=O)N(CCC2CC3C=CC2C3)C1=O]

1-(4-bicyclo[2.2.1]hept-5-en-2-ylethyl)-3,4-dimethyl-1H-pyrrole-2,5-dione;

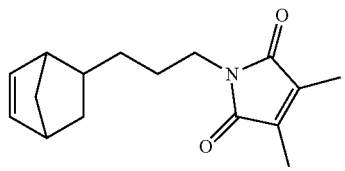 [SMILES: CC1=C(C)C(=O)N(CCCC2CC3C=CC2C3)C1=O]

1-(4-bicyclo[2.2.1]hept-5-en-2-ylpropyl)-3,4-dimethyl-1H-pyrrole-2,5-dione;

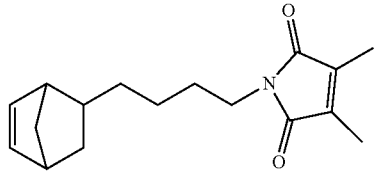 [SMILES: CC1=C(C)C(=O)N(CCCCC2CC3C=CC2C3)C1=O]

1-(4-bicyclo[2.2.1]hept-5-en-2-ylbutyl)-3,4-dimethyl-1H-pyrrole-2,5-dione;

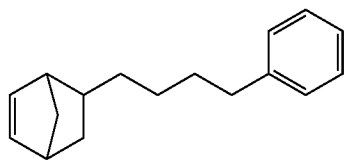 [SMILES: C1=CC2CC1CC2CCCCc1ccccc1]

5-(4-phenylbutyl)bicyclo[2.2.1]hept-2-ene;

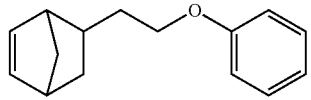 [SMILES: C1=CC2CC1CC2CCOc1ccccc1]

5-(2-phenoxyethyl)bicyclo[2.2.1]hept-2-ene;

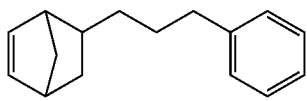 [SMILES: C1=CC2CC1CC2CCCc1ccccc1]

5-(3-phenylpropyl)bicyclo[2.2.1]hept-2-ene;

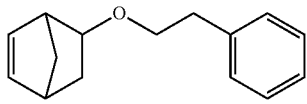

5-phenethoxybicyclo[2.2.1]hept-2-ene;

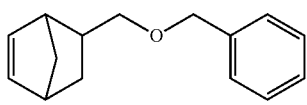

5-((benzyloxy)methyl)bicyclo[2.2.1]hept-2-ene;

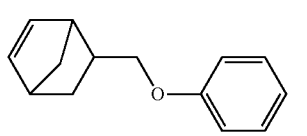 [SMILES: C1=CC2CC1CC2COc1ccccc1]

5-(phenoxymethyl)bicyclo[2.2.1]hept-2-ene;

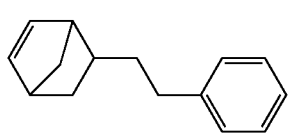 [SMILES: C1=CC2CC1CC2CCc1ccccc1]

5-phenethylbicyclo[2.2.1]hept-2-ene;

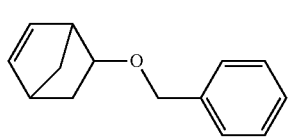 [SMILES: C1=CC2CC1CC2OCc1ccccc1]

5-(benzyloxy)bicyclo[2.2.1]hept-2-ene;

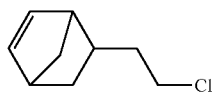

5-(2-chloroethyl)bicyclo[2.2.1]hept-2-ene (NBEtCl);

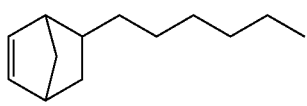

5-hexylbicyclo[2.2.1]hept-2-ene (HexNB);

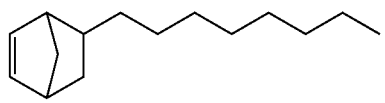

5-octylbicyclo[2.2.1]hept-2-ene (OctNB);

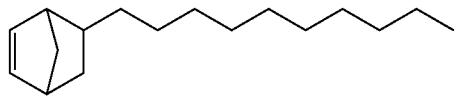 [SMILES: CCCCCCCCCCC1CC2C=CC1C2]

5-decylbicyclo[2.2.1]hept-2-ene (DecNB);

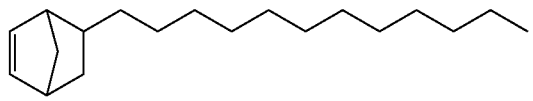 [SMILES: CCCCCCCCCCCCC1CC2C=CC1C2]

5-dodecylbicyclo[2.2.1]hept-2-ene (DoDecNB);

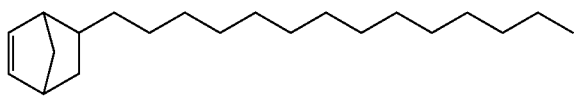 [SMILES: CCCCCCCCCCCCCCC1CC2C=CC1C2]

5-tetradecylbicyclo[2.2.1]hept-2-ene (TetraDecNB);

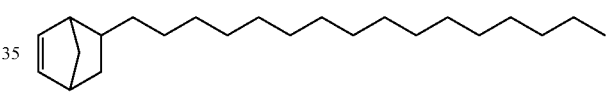

5-hexadecylbicyclo[2.2.1]hept-2-ene (HexadecylNB);

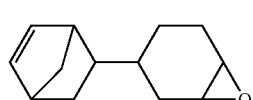

3-(bicyclo[2.2.1]hept-5-en-2-yl)-7-oxabicyclo[4.1.0]heptane (CHEpNB);

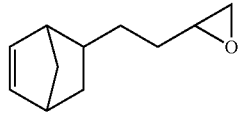 [SMILES: C1=CC2CC1CC2CCC1CO1]

2-(2-(bicyclo[2.2.1]hept-5-en-2-yl)ethyl)oxirane (EBNB);

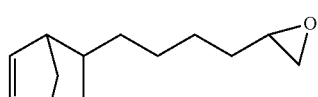

2-(4-(bicyclo[2.2.1]hept-5-en-2-yl)butyl)oxirane (EHNB);

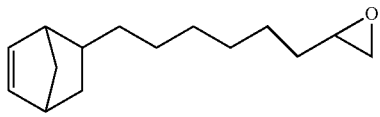 [SMILES: C1=CC2CC1CC2CCCCCCC1CO1]

2-(6-(bicyclo[2.2.1]hept-5-en-2-yl)hex 1 oxirane (EONB); and

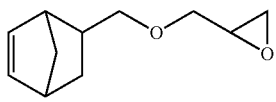 [SMILES: C1=CC2CC1CC2COCC1CO1]

2-((bicyclo[2.2.1]hept-5-en-2-ylmethoxy)methyl)oxirane (MGENB).

10. The composition according to claim 8, wherein the monomer of formula (XI) or the monomer of formula (XII) is selected from the group consisting of:

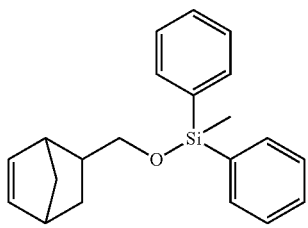 [SMILES: C[Si](OCC1CC2C=CC1C2)(c1ccccc1)c1ccccc1]

(bicyclo[2.2.1]hept-5-en-2-ylmethoxy)(methyl)diphenylsilane (NBCH$_2$OSiMePh$_2$);

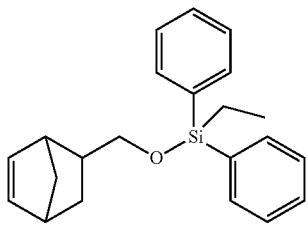 [SMILES: CC[Si](OCC1CC2C=CC1C2)(c1ccccc1)c1ccccc1]

(bicyclo[2.2.1]hept-5-en-2-ylmethoxy)(ethyl)diphenylsilane;

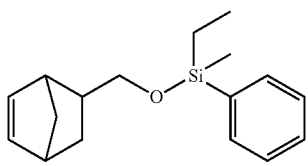 [SMILES: CC[Si](C)(OCC1CC2C=CC1C2)c1ccccc1]

(bicyclo[2.2.1]hept-5-en-2-ylmethoxy)(ethyl)(methyl)(phenyl)silane;

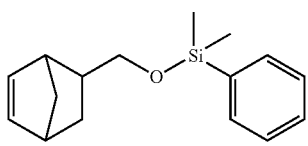 [SMILES: C[Si](C)(OCC1CC2C=CC1C2)c1ccccc1]

(bicyclo[2.2.1]hept-5-en-2-ylmethoxy)dimethyl(phenyl)silane;

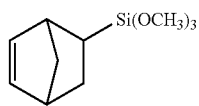

bicyclo[2.2.1]hept-5-en-2-yltrimethoxysilane;

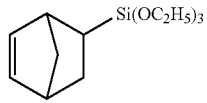

bicyclo[2.2.1]hept-5-en-2-yltriethoxysilane (NBSi(OC$_2$H$_5$)$_3$;

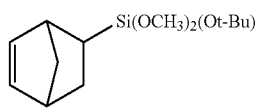

bicyclo[2.2.1]hept-5-en-2-yl(tert-butoxy)dimethoxysilane;

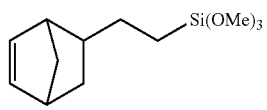

(2-(bicyclo[2.2.1]hept-5-en-2-yl)ethyl)trimethoxysilane;

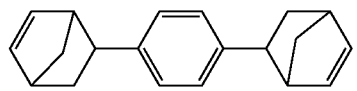

1,4-di(bicyclo[2.2.1]hept-5-en-2-yl)benzene;

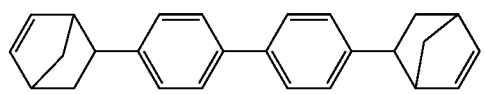

4,4'-di(bicyclo[2.2.1]hept-5-en-2-yl)-1,1'-biphenyl;

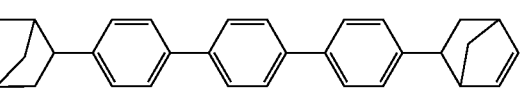

4,4''-di(bicyclo[2.2.1]hept-5-en-2-yl)-1,1':4',1''-terphenyl;

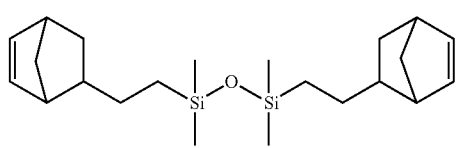 [SMILES: C[Si](C)(CCC1CC2C=CC1C2)O[Si](C)(C)CCC1CC2C=CC1C2]

1,3-bis(norbornenylethyl)-1,1,3,3-tetramethyldisiloxane; and

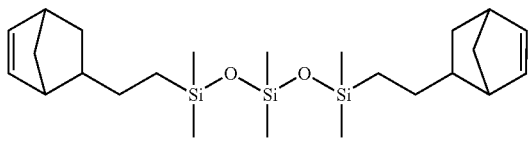 [SMILES: C[Si](C)(CCC1CC2C=CC1C2)O[Si](C)(C)O[Si](C)(C)CCC1CC2C=CC1C2]

1,5-bis(norbornenylethyl)-1,1,3,3,5,5-hexamethyltrisiloxane.

11. The composition according to claim 1, wherein the organopalladium compound of formula (I) is selected from the group consisting of:

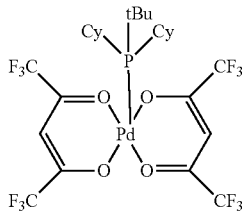

Pd775, where cy is cyclohexyl and tBu is tert-butyl;

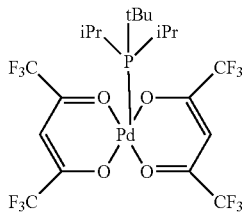

Pd694, where iPr is iso-propyl and tBu is tert-butyl; and

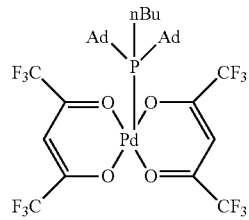

Pd879, where Ad is adamantyl, nBu is n-butyl.

12. The composition according to claim 1, wherein the compound of formula (II) or the compound of formula (III) is selected from the group consisting of:

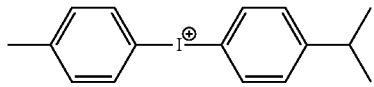

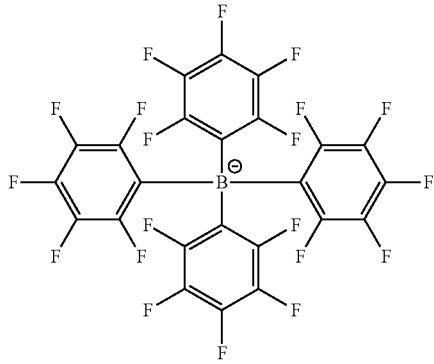

tolylcumyliodonium-tetrakis pentafluorophenylborate;

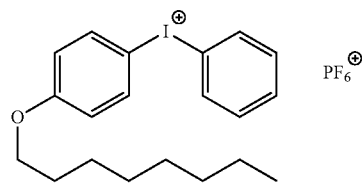

4-(octyloxy)phenyl)(phenyl)iodonium hexafluorophosphate;

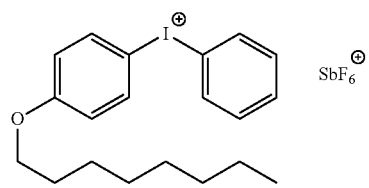

4-(octyloxy)phenyl)(phenyl)iodonium hexafluoroantimonate;

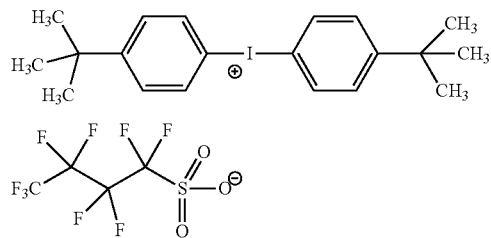

bis(4-tert-butylphenyl)iodonium perfluoro-1-butanesulfonate;

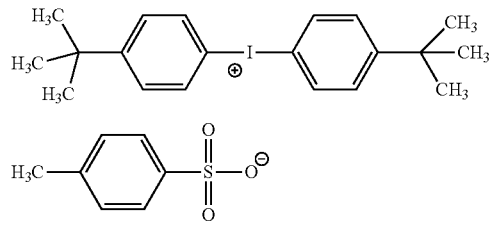

bis(4-tert-butylphenyl)iodonium p-toluenesulfonate;

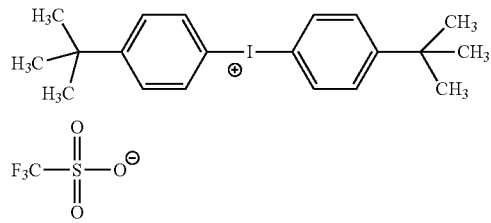

bis(4-tert-butylphenyl)iodonium triflate;

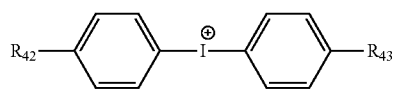

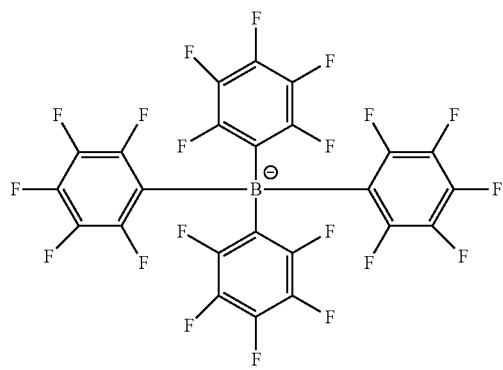

where R$_{42}$ and R$_{43}$ are the same or different and each independently selected from linear or branched (C$_{10}$-C$_{13}$)alkyl;

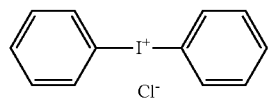

diphenyliodonium chloride;

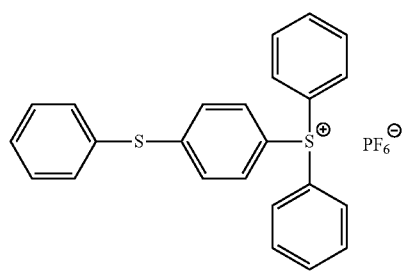

(4-thiophenyl)phenyl-diphenylsulfonium hexafluorophosphate;

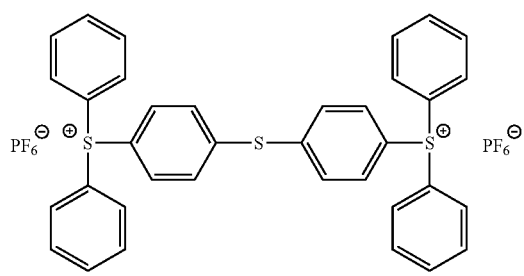

bis-(triphenylsulfonium) sulfide bis-hexafluorophosphate;

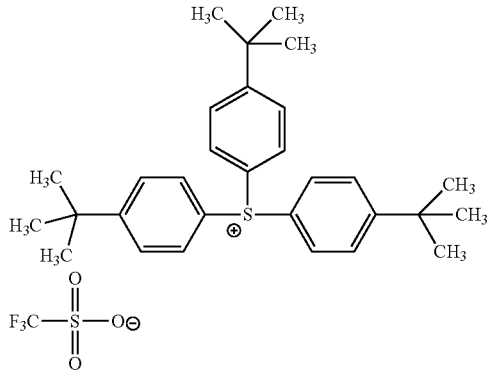

tris(4-tert-butylphenyl)sulfonium perfluoro-1-butanesulfonate;

tris(4-tert-butylphenyl)sulfonium triflate;

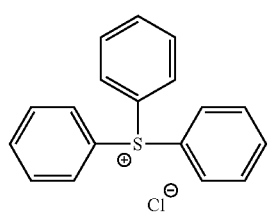 [SMILES: c1ccc([S+](c2ccccc2)c2ccccc2)cc1 ; [Cl-]]

triphenylsulfonium chloride;

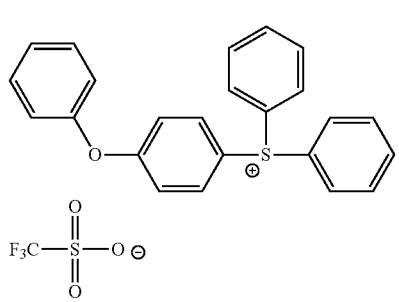

(4-phenoxyphenyl)diphenylsulfonium triflate;

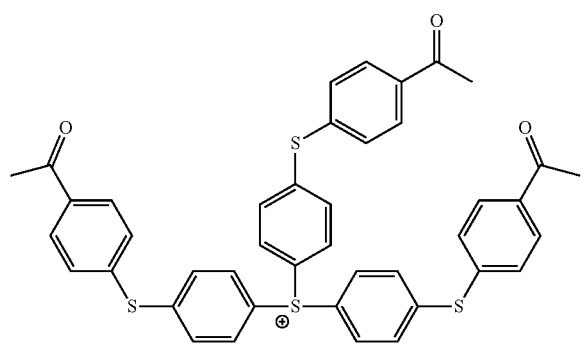

tris(4-((4-acetylphenyl)thio)phenyl)sulfonium tetrakis-pentafluorophenylborate; and

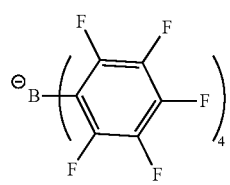

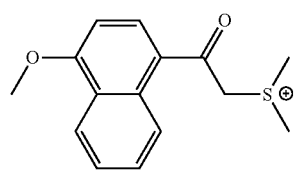

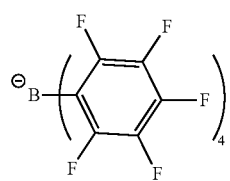

(2-(4-methoxynaphthalen-1-yl)-2-oxoethyl)dimethyl-sulfonium tetrakis-pentafluorophenylborate.

13. The composition according to claim 1, wherein the photosensitizer is a compound of formula (XIII) or a compound of formula (XIV):

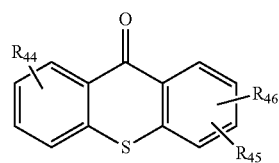 (XIII)

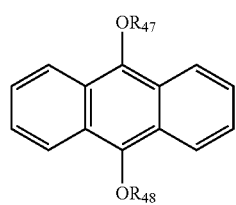 (XIV)

wherein $R_{44}$, $R_{45}$ and $R_{46}$ are the same or different and independently selected from the group consisting of hydrogen, halogen, hydroxy, $NO_2$, $NH_2$, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl, $(C_6-C_{10})$-aryloxy, $C(O)(C_1-C_6)$alkyl, COOH, $C(O)O(C_1-C_6)$alkyl, and $SO_2(C_6-C_{10})$aryl;

$R_{47}$ and $R_{48}$ are the same or different and independently selected from the group consisting of methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl and $(C_6-C_{10})$aryl$(C_1-C_3)$alkyl.

14. The composition according to claim 13, wherein the compound of formula (XIII) or the compound of formula (XIV) is selected from the group consisting of:

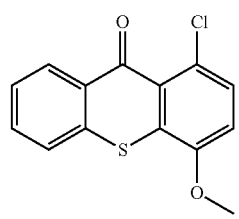 [SMILES: COc1ccc(Cl)c2c(=O)c3ccccc3sc12]

1-chloro-4-methoxy-9H-thioxanthen-9-one;

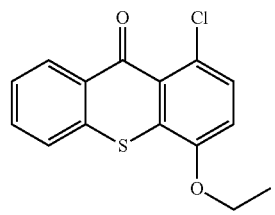 [SMILES: CCOc1ccc(Cl)c2c(=O)c3ccccc3sc12]

1-chloro-4-ethoxy-9H-thioxanthen-9-one;

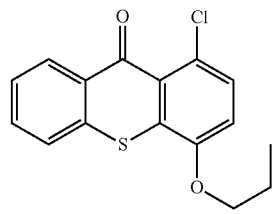 [SMILES: CCCOc1ccc(Cl)c2c(=O)c3ccccc3sc12]

1-chloro-4-propoxy-9H-thioxanthen-9-one;

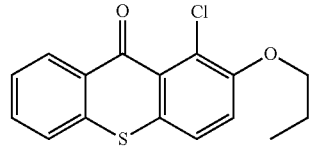 [SMILES: CCCOc1ccc2sc3ccccc3c(=O)c2c1Cl]

1-chloro-2-propoxy-9H-thioxanthen-9-one;

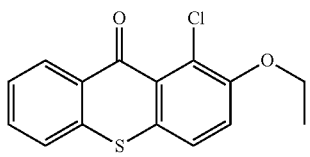 [SMILES: CCOc1ccc2sc3ccccc3c(=O)c2c1Cl]

1-chloro-2-ethoxy-9H-thioxanthen-9-one;

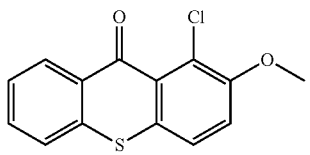 [SMILES: COc1ccc2sc3ccccc3c(=O)c2c1Cl]

1-chloro-2-methoxy-9H-thioxanthen-9-one;

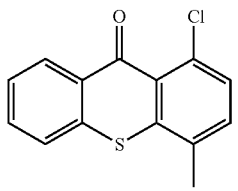 [SMILES: Cc1ccc(Cl)c2c(=O)c3ccccc3sc12]

1-chloro-4-methyl-9H-thioxanthen-9-one;

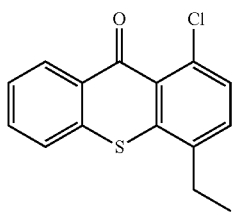 [SMILES: CCc1ccc(Cl)c2c(=O)c3ccccc3sc12]

1-chloro-4-ethyl-9H-thioxanthen-9-one;

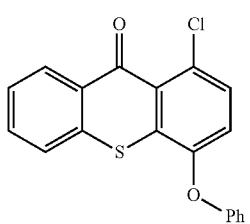 [SMILES: O=c1c2ccccc2sc2c(Oc3ccccc3)ccc(Cl)c12]

1-chloro-4-phenoxy-9H-thioxanthen-9-one;

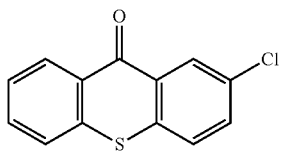 [SMILES: O=c1c2ccccc2sc2ccc(Cl)cc12]

2-chlorothioxanthen-9-one (CTX);

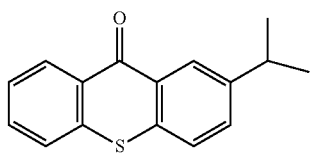 [SMILES: CC(C)c1ccc2sc3ccccc3c(=O)c2c1]

2-isopropyl-9H-thioxanthen-9-one (ITX);

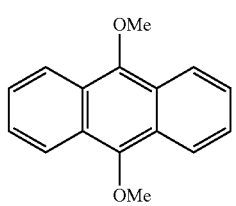

9,10-dimethoxyanthracene (DMA);

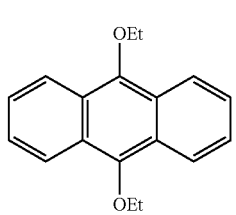 [SMILES: CCOc1c2ccccc2c(OCC)c2ccccc12]

9,10-diethoxyanthracene (DEA); and

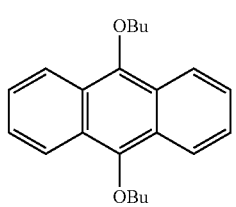

9,10-di-n-butoxyanthracene (DBA).

15. The composition according to claim 1, which is selected from the group consisting of:

5-phenethylbicyclo[2.2.1]hept-2-ene (PENB),

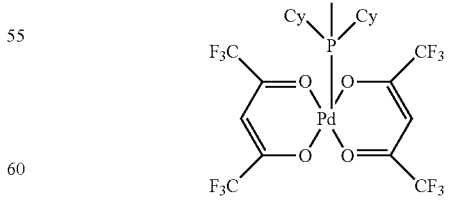

Pd775, where cy is cyclohexyl and tBu is tert-butyl, bis(4,4'-di-$C_{10}$-$C_{13}$-alkylphenyl)iodonium tetrakis(2,3,4,5,6-pentafluorophenyl)borate (PAG1) and 2-isopropyl-9H-thioxanthen-9-one (ITX); and 5-decylbicyclo[2.2.1]hept-2-ene (DecNB),

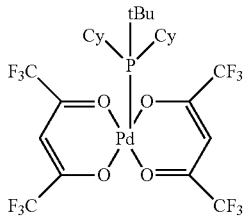

Pd775, where cy is cyclohexyl and tBu is tert-butyl, bis(4,4'-di-$C_{10}$-$C_{13}$-alkylphenyl)iodonium tetrakis(2,3,4,5,6-pentafluorophenyl)borate (PAG1) and 2-isopropyl-9H-thioxanthen-9-one (ITX).

16. A film comprising the composition of claim 1.

17. An optoelectronic device comprising the composition of claim 1.

18. A kit for forming a substantially transparent film comprising:

a) one or more olefinic monomers of formula (IV):

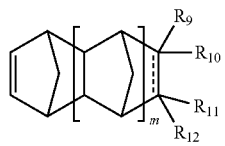

(IV)

wherein:

m is an integer 0, 1 or 2;

===== is a single bond or a double bond;

$R_9$, $R_{10}$, $R_{11}$ and $R_{12}$ are the same or different and each independently selected from the group consisting of hydrogen, halogen, a hydrocarbyl or halohydrocarbyl group selected from methyl, ethyl, linear or branched ($C_3$-$C_{16}$)alkyl, perfluoro($C_1$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_6$)alkyl, methoxy, ethoxy, linear or branched ($C_3$-$C_{16}$)alkoxy, epoxy($C_1$-$C_{10}$)alkyl, epoxy($C_1$-$C_{10}$)alkyloxy($C_1$-$C_{10}$)alkyl, epoxy($C_3$-$C_{10}$)cycloalkyl, perfluoro($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy, ($C_6$-$C_{10}$)aryl($C_1$-$C_6$)alkoxy, perfluoro($C_6$-$C_{10}$)aryloxy, perfluoro($C_6$-$C_{10}$)aryl($C_1$-$C_3$)alkoxy, a group of formula (A):

—Z-Aryl  (A);

a group of formula (A1):

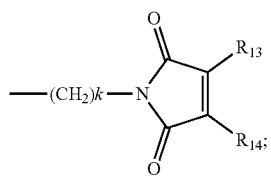

(A1)

a group of formula (A2):

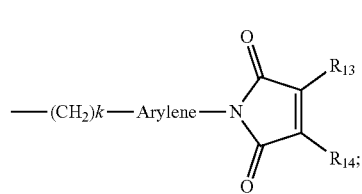

(A2)

a group of formula (A3):

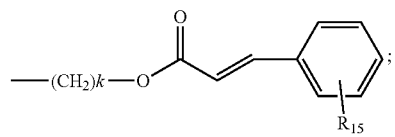

(A3)

and a group of formula (A4):

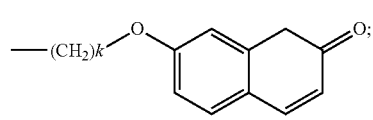

(A4)

wherein:

Z is selected from the group consisting of:

O, CO, C(O)O, OC(O), OC(O)O, S, $(CR_{17}R_{18})_b$, $O(CR_{17}R_{18})_b$, $(CR_{17}R_{18})_bO$, $C(O)(CR_{17}R_{18})_b$, $(CR_{17}R_{18})_bC(O)$, $C(O)O(CR_{17}R_{18})_b$, $(CR_{17}R_{18})_bC(O)O$, $OC(O)(CR_{17}R_{18})_b$, $(CR_{17}R_{18})_bOC(O)$, $(CR_{17}R_{18})_bOC(O)O$, $(CR_{17}R_{18})_bOC(O)O(CR_{17}R_{18})_b$, $OC(O)O(CR_{17}R_{18})_b$, $S(CR_{17}R_{18})_b$, $(CR_{17}R_{18})_bS$, $(SiR_{17}R_{18})_b$, $O(SiR_{17}R_{18})_b$, $(SiR_{17}R_{18})_bO$, where $R_{17}$ and $R_{18}$ are the same or different and each independently selected from hydrogen, methyl, ethyl, linear or branched ($C_3$-$C_{12}$)alkyl, substituted or unsubstituted ($C_6$-$C_{14}$)aryl, methoxy, ethoxy, linear or branched ($C_3$-$C_6$)alkyloxy, ($C_2$-$C_6$)acyl, ($C_2$-$C_6$)acyloxy, and substituted or unsubstituted ($C_6$-$C_{14}$)aryloxy; and b is an integer from 0 to 12, inclusive;

Aryl is selected from the group consisting of substituted or unsubstituted phenyl, substituted or unsubstituted biphenyl and substituted or unsubstituted naphthyl, substituted or unsubstituted terphenyl, substituted or unsubstituted anthracenyl substituted or unsubstituted fluorenyl, wherein said substituents are selected from the group consisting of halogen, methyl, ethyl, linear or branched ($C_3$-$C_6$)alkyl, perfluoro($C_1$-$C_{12}$)alkyl, ($C_3$-$C_{12}$)cycloalkyl, ($C_6$-$C_{10}$)aryl, ($C_6$-$C_{10}$)aryl($C_1$-$C_6$)alkyl, perfluoro($C_6$-$C_{10}$)aryl, perfluoro($C_6$-$C_{10}$)aryl($C_1$-$C_6$)alkyl, methoxy, ethoxy, linear or branched ($C_3$-$C_{16}$)alkoxy, perfluoro($C_1$-$C_{12}$)alkoxy, ($C_3$-$C_{12}$)cycloalkoxy, ($C_6$-$C_{10}$)aryloxy, ($C_6$-$C_{10}$)aryl($C_1$-$C_6$)alkoxy, perfluoro($C_6$-$C_{10}$)aryloxy and perfluoro($C_6$-$C_{10}$)aryl($C_1$-$C_3$)alkoxy;

k is an integer from 1 to 12;

$R_{13}$, $R_{14}$ and $R_{15}$ are the same or different and each independently selected from the group consisting of hydrogen, methyl, ethyl, linear or branched ($C_3$-$C_{12}$)

alkyl, perfluoro($C_1$-$C_{12}$)alkyl, methoxy, ethoxy, linear or branched ($C_3$-$C_{12}$)alkoxy, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_6$)alkyl, perfluoro($C_6$-$C_{10}$)aryl and perfluoro($C_6$-$C_{10}$)aryl($C_1$-$C_6$)alkyl; or $R_{13}$ and $R_{14}$ taken together with the intervening carbon atoms to which they are attached to form a substituted or unsubstituted ($C_5$-$C_{14}$)cyclic, ($C_5$-$C_{14}$)bicyclic or ($C_5$-$C_{14}$)tricyclic ring; and Arylene is substituted or unsubstituted bivalent ($C_6$-$C_{14}$)aryl;

or one of $R_9$ and $R_{10}$ taken together with one of Ru and Rig and the carbon atoms to which they are attached to form a substituted or unsubstituted ($C_5$-$C_{14}$)cyclic, ($C_5$-$C_{14}$)bicyclic or ($C_5$-$C_{14}$)tricyclic ring;

b) an organopalladium compound of formula (I):

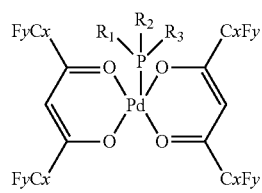

(I)

wherein:

x is from 1 to 6, inclusive;

y is 2x+1;

wherein at least one of $R_1$, $R_2$ and $R_3$ is a tertiary alkyl group selected from the group consisting of tertiary branched ($C_4$-$C_8$)alkyl, ($C_1$-$C_4$)alkyl($C_5$-$C_7$)cycloalkyl and ($C_8$-$C_{12}$)tricycloalkyl; and the remaining $R_1$, $R_2$ and $R_3$ are the same or different and each independently selected from the group consisting of secondary branched ($C_3$-$C_8$)alkyl and ($C_5$-$C_7$)cycloalkyl; or wherein two of $R_1$, $R_2$ and $R_3$ are the same or different and each a tertiary alkyl group independently selected from the group consisting of tertiary branched ($C_4$-$C_8$)alkyl, ($C_1$-$C_4$)alkyl($C_5$-$C_7$)cycloalkyl and ($C_8$-$C_{12}$)tricycloalkyl; and the remaining $R_1$, $R_2$ and $R_3$ is selected from the group consisting of methyl, ethyl, linear or branched ($C_3$-$C_8$) alkyl and ($C_5$-$C_7$)cycloalkyl;

c) a photoacid generator selected from the group consisting of:

a compound of formula (II):

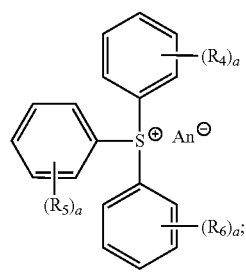

(II)

a compound of formula (III):

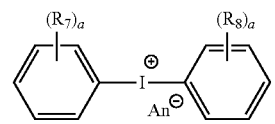

(III)

wherein:

a is an integer from 0 to 5;

An $\ominus$ is selected from the group consisting of Cl$\ominus$, Br$\ominus$, I$\ominus$, $BF_4\ominus$, tetrakis(pentafluorophenyl)borate, tetrakis(3,5-bis(trifluoromethyl)phenyl)borate, tetrakis(2-fluorophenyl)borate, tetrakis(3-fluorophenyl)borate, tetrakis(4-fluorophenyl)borate, tetrakis(3,5-difluorophenyl)borate, tetrakis(2,3,4,5-tetrafluorophenyl)borate, tetrakis(3,4,5,6-tetrafluorophenyl)borate, tetrakis(3,4,5-trifluorophenyl)borate, methyltris(perfluorophenyl)borate, ethyltris(perfluorophenyl)borate, phenyltris(perfluorophenyl)borate, tetrakis(1,2,2-trifluoroethylenyl)borate, tetrakis(4-tri-1-propylsilyltetrafluorophenyl)borate, tetrakis(4-dimethyl-tert-butylsilyltetrafluorophenyl)borate, (triphenylsiloxy)tris(pentafluorophenyl)borate, (octyloxy)tris(pentafluorophenyl)borate, tetrakis[3,5-bis[1-methoxy-2,2,2-trifluoro-1-(trifluoromethyl)ethyl]phenyl]borate, tetrakis[3-[1-methoxy-2,2,2-trifluoro-1-(trifluoromethyl)ethyl]-5-(trifluoromethyl)phenyl] borate, and tetrakis[3-[2,2,2-trifluoro-1-(2,2,2-trifluoroethoxy)-1-(trifluoromethyl)-ethyl]-5-(trifluoromethyl)phenyl]borate, $PF_6\ominus$, $SbF_6\ominus$, n-$C_4F_9SO_3\ominus$, $CF_3SO_3\ominus$ and p-$CH_3$($C_6H_4$)—$SO_3\ominus$;

$R_4$, $R_5$, $R_6$, $R_7$ and $R_8$ are the same or different and each independently selected from the group consisting of halogen, methyl, ethyl, linear or branched ($C_3$-$C_{20}$) alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_6$-$C_{10}$)-aryloxy, ($C_6$-$C_{10}$)-thioaryl, ($C_1$-$C_6$)alkanoyl($C_6$-$C_{10}$)thioaryl, ($C_1$-$C_6$) alkoxy($C_6$-$C_{10}$)aroyl($C_1$-$C_6$)alkyl and ($C_6$-$C_{10}$)-thioaryl-($C_6$-$C_{10}$)diarylsulfonium salt;

d) a compound selected from the group consisting of:

a compound of formula (V):

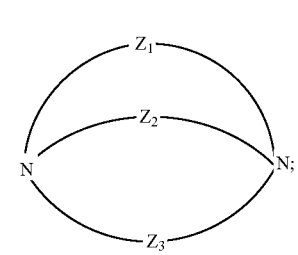

(V)

where $Z_1$, $Z_2$ and $Z_3$ are the same or different and each independently is (($CH_2$)$_g$O)$_h$($CH_2$)$_g$) where g and h are integers from 2 to 4;

a compound of formula (VI):

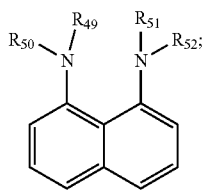
(VI)

where $R_{49}$, $R_{50}$, $R_{51}$ and $R_{52}$ are the same or different and each independently selected from the group consisting of hydrogen, methyl, ethyl and linear or branched $(C_3\text{-}C_{20})$alkyl; and
a compound of formula (VII):

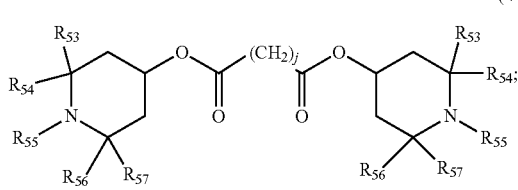
(VII)

a compound of formula (VIII):

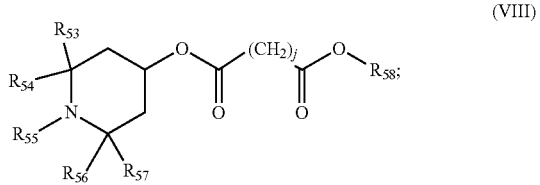
(VIII)

where j is an integer from 6 to 16;
$R_{53}$, $R_{54}$, $R_{56}$, $R_{57}$ and $R_{58}$ are the same or different and each independently selected from the group consisting of hydrogen, methyl, ethyl and linear or branched $(C_3\text{-}C_{20})$alkyl;
$R_{55}$ is selected from the group consisting of methyl, ethyl, linear or branched $(C_3\text{-}C_{20})$alkyl, methoxy, ethoxy and linear or branched $(C_3\text{-}C_{20})$alkoxy; and
a compound of formula (IX):

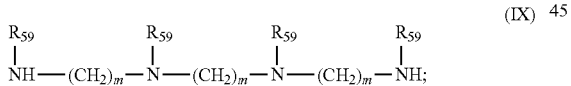
(IX)

where each m is the same or different and is an integer from 2 to 6;
$R_{59}$ is a group of formula:

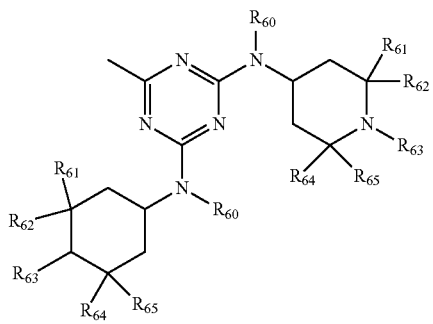

$R_{60}$, $R_{61}$, $R_{62}$, $R_{63}$, $R_{64}$ and $R_{65}$ are the same or different and each independently selected from the group consisting of hydrogen, methyl, ethyl and linear or branched $(C_3\text{-}C_{20})$alkyl; and
a compound of (X):

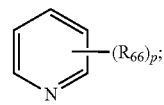
(X)

where p is an integer from 1 to 5;
each $R_{66}$ are the same or different and each independently selected from the group consisting of halogen, methyl, ethyl, and linear or branched $(C_3\text{-}C_{20})$alkyl and $NR_{67}R_{68}$, where each $R_{67}$ and $R_{68}$ are the same or different and each independently selected from the group consisting of methyl, ethyl and linear or branched $(C_3\text{-}C_{20})$alkyl; and
e) a photosensitizer.

19. The kit according to claim 18, which contains at least two distinct first and second monomers of formula (IV), wherein the first monomer is completely soluble in the second monomer, and when a composition of said kit is exposed to suitable actinic radiation for a sufficient length of time it forms a substantially transparent film having at least 90 percent of visible light transmission.

20. The kit according to claim 18 comprising a composition selected from the group consisting of:
5-phenethylbicyclo[2.2.1]hept-2-ene (PENB),

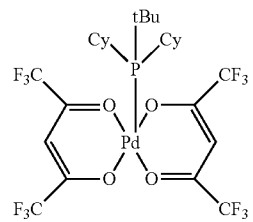

Pd775, where cy is cyclohexyl and tBu is tert-butyl, bis(4,4'-di-$C_{10}$-$C_{13}$-alkylphenyl)iodonium tetrakis(2,3,4,5,6-pentafluorophenyl)borate (PAG1) and 2-isopropyl-9H-thioxanthen-9-one (ITX); and
5-decylbicyclo[2.2.1]hept-2-ene (DecNB),

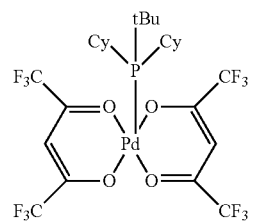

Pd775, where cy is cyclohexyl and tBu is tert-butyl, bis(4,4'-di-$C_{10}$-$C_{13}$-alkylphenyl)iodonium tetrakis(2,3,4,5,6-pentafluorophenyl)borate (PAG1) and 2-isopropyl-9H-thioxanthen-9-one (ITX).

* * * * *